United States Patent
Yin et al.

(10) Patent No.: US 12,047,760 B2
(45) Date of Patent: Jul. 23, 2024

(54) BLUETOOTH COMMUNICATION METHOD AND APPARATUS

(71) Applicant: Huawei Technologies Co., Ltd., Shenzhen (CN)

(72) Inventors: Mingjie Yin, Shanghai (CN); Haibo Miao, Shanghai (CN); Kai Tao, Shanghai (CN); Xiao Jing, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 199 days.

(21) Appl. No.: 17/788,892

(22) PCT Filed: Dec. 17, 2020

(86) PCT No.: PCT/CN2020/137366
§ 371 (c)(1),
(2) Date: Jun. 24, 2022

(87) PCT Pub. No.: WO2021/129521
PCT Pub. Date: Jul. 1, 2021

(65) Prior Publication Data
US 2023/0059427 A1      Feb. 23, 2023

(30) Foreign Application Priority Data

Dec. 25, 2019   (CN) .......................... 201911357681.6

(51) Int. Cl.
*H04R 5/04*  (2006.01)
*G10H 1/36*  (2006.01)
(Continued)

(52) U.S. Cl.
CPC .............. *H04R 5/04* (2013.01); *H04R 5/033* (2013.01); *H04W 76/15* (2018.02); *H04R 2420/07* (2013.01)

(58) Field of Classification Search
None
See application file for complete search history.

(56) References Cited

U.S. PATENT DOCUMENTS

| | | | |
|---|---|---|---|
| 6,064,860 A | 5/2000 | Ogden | |
| 7,653,344 B1 | 1/2010 | Feldman et al. | |

(Continued)

FOREIGN PATENT DOCUMENTS

| | | |
|---|---|---|
| CN | 202004941 U | 10/2011 |
| CN | 205017540 U | 2/2016 |

(Continued)

OTHER PUBLICATIONS

Gong et al., CN111770412 "Wireless earphone control method, wireless earphone and control system thereof" translation by Google Patents. 10 pages. (Year: 2019).*

(Continued)

*Primary Examiner* — Qin Zhu
(74) *Attorney, Agent, or Firm* — Conley Rose. P.C.

(57) ABSTRACT

A BLUETOOTH communications system includes a true wireless stereo (TWS) BLUETOOTH headset and a terminal device, where the TWS Bluetooth headset includes a first earbud and a second earbud. The terminal device controls the first earbud to collect a sound signal and the second earbud to play a sound signal. When an audio application on the terminal device is started, the first earbud collects a first sound signal, performs sound effect processing on the first sound signal to obtain a second sound signal, and sends the second sound signal to the second earbud. The terminal device sends accompaniment audio to the second earbud, and the second earbud performs audio mixing processing on the accompaniment audio and the second sound signal for playing.

20 Claims, 41 Drawing Sheets

(51) Int. Cl.
  *H04M 1/60*       (2006.01)
  *H04M 1/72442*    (2021.01)
  *H04R 1/10*       (2006.01)
  *H04R 5/033*      (2006.01)
  *H04W 4/80*       (2018.01)
  *H04W 76/15*      (2018.01)

(56) References Cited

U.S. PATENT DOCUMENTS

| | | |
|---|---|---|
| 2013/0337320 A1 | 12/2013 | Yukawa |
| 2017/0345406 A1 | 11/2017 | Georgiou et al. |
| 2019/0182765 A1 | 6/2019 | Newham |
| 2020/0107107 A1 | 4/2020 | Gong |
| 2021/0219041 A1 | 7/2021 | Zhang et al. |

FOREIGN PATENT DOCUMENTS

| | | | |
|---|---|---|---|
| CN | 105761727 A | 7/2016 | |
| CN | 105848025 A | 8/2016 | |
| CN | 106028208 A | 10/2016 | |
| CN | 205946096 U | 2/2017 | |
| CN | 106656276 A | 5/2017 | |
| CN | 108055605 A | 5/2018 | |
| CN | 108712697 A | 10/2018 | |
| CN | 109218882 A | 1/2019 | |
| CN | 109246672 A | 1/2019 | |
| CN | 109271131 A | 1/2019 | |
| CN | 109686351 A | 4/2019 | |
| CN | 109767777 A | 5/2019 | |
| CN | 110278501 A | 9/2019 | |
| CN | 110381485 A | 10/2019 | |
| CN | 110418236 A | 11/2019 | |
| CN | 209748761 U | 12/2019 | |
| CN | 108718467 B | 3/2020 | |
| CN | 111770412 A * | 10/2020 | ........... H04R 1/1091 |
| EP | 1715718 A2 | 10/2006 | |

OTHER PUBLICATIONS

Guowei Ma, "State-of-the-art of 3D printing technology of cementitious material—An emerging technique for construction," Nov. 7, 2016, 22 pages.

Roland Hagendorn, "Chronic kidney disease severely deteriorates the outcome of gastrointestinal bleeding: A meta-analysis," World J Gastroenterol, Dec. 21, 2017, vol. 23, Issue 47, 12 pages.

Zhu Ning-xi, "Design of the headphone Bluetooth system based on BlueCore4-ROM CSP," Foreign Electronic Components, Issue 8, 2008, 2 pages.

* cited by examiner

BLUETOOTH COMMUNICATION METHOD AND APPARATUS

CROSS-REFERENCE TO RELATED APPLICATIONS

This is a U.S. National Stage of International Patent Application No. PCT/CN2020/137366 filed on Dec. 17, 2020, which claims priority to Chinese Patent Application No. 201911357681.6 filed on Dec. 25, 2019. Both of the aforementioned applications are hereby incorporated by reference in their entireties.

TECHNICAL FIELD

This application relates to the field of communications technologies, and in particular, to a Bluetooth communication method and an apparatus.

BACKGROUND

In recent years, Bluetooth headsets have been favored by more consumers due to their advantages such as convenience to carry, free from wires, long battery life, and fashion. The Bluetooth headset applies the Bluetooth technology to a hands-free headset, so that a user can easily carry on a call in various manners without being bothered by an annoying electric wire.

Currently, a true wireless stereo (true wireless stereo, TWS) Bluetooth headset emerges. The TWS Bluetooth headset includes a primary earbud and a secondary earbud, and the primary earbud and the secondary earbud may be used simultaneously or separately. When the primary earbud and the secondary earbud are simultaneously used, a Bluetooth connection is established between the primary earbud and a terminal device (for example, a mobile phone), and a Bluetooth connection is also established between the primary earbud and the secondary earbud. Data is not directly transmitted between the secondary earbud and the terminal device, and the primary earbud forwards, to the secondary earbud, data sent by the terminal device, or the primary earbud forwards data from the secondary earbud to the terminal device.

However, an existing TWS Bluetooth headset has relatively few functions, and cannot meet a user requirement.

SUMMARY

Embodiments of this application provide a Bluetooth communication method and an apparatus, to enable a TWS Bluetooth headset to meet a high requirement of a user for sound detail pickup and implement a real-time in-ear monitoring function.

A first aspect of this application provides a Bluetooth communication method, applied to a Bluetooth communications system. The Bluetooth communications system includes a TWS Bluetooth headset and a terminal device, and the TWS Bluetooth headset includes a first earbud and a second earbud. The terminal device and the first earbud communicate through a first Bluetooth link, the terminal device and the second earbud communicate through a second Bluetooth link, and the first earbud and the second Bluetooth communicate through a third Bluetooth link. The method includes:

the terminal device controls the TWS Bluetooth headset to be in a first mode, where in the first mode, the first earbud is used to collect a sound signal, and the second earbud is used to play a sound signal;

when an audio playback application on the terminal device is started, the first earbud collects a first sound signal, performs sound effect processing on the first sound signal to obtain a second sound signal, and sends the second sound signal to the second earbud;

the terminal device sends accompaniment audio to the second earbud;

the second earbud performs audio mixing processing on the accompaniment audio and the second sound signal to obtain a third sound signal; and the second earbud plays the third sound signal.

In an example manner, the method further includes: The first earbud sends the first sound signal to the terminal device; and the terminal device stores the first sound signal.

A second aspect of this application provides a Bluetooth communication method, applied to a Bluetooth communications system. The Bluetooth communications system includes a TWS Bluetooth headset and a terminal device, and the TWS Bluetooth headset includes a first earbud and a second earbud. The terminal device and the first earbud communicate through a first Bluetooth link, and the terminal device and the second earbud communicate through a second Bluetooth link. The method includes:

the terminal device controls the TWS Bluetooth headset to be in a first mode, where in the first mode, the first earbud is used to collect a sound signal, and the second earbud is used to play a sound signal;

when an audio playback application on the terminal device is started, the first earbud collects a first sound signal, performs sound effect processing on the first sound signal to obtain a second sound signal, and sends the second sound signal to the terminal device;

the terminal device performs audio mixing processing on accompaniment audio and the second sound signal to obtain a third sound signal;

the terminal device sends the third sound signal to the second earbud; and the second earbud plays the third sound signal.

In an example manner, the method further includes: The first earbud sends the first sound signal to the terminal device; and the terminal device stores the first sound signal.

A third aspect of this application provides a Bluetooth communication method, applied to a Bluetooth communications system. The Bluetooth communications system includes a true wireless stereo TWS Bluetooth headset and a terminal device, and the TWS Bluetooth headset includes a first earbud and a second earbud. The terminal device and the first earbud communicate through a first Bluetooth link, and the terminal device and the second earbud communicate through a second Bluetooth link. The method includes:

the terminal device controls the TWS Bluetooth headset to be in a first mode, where in the first mode, the first earbud is used to collect a sound signal, and the second earbud is used to play a sound signal;

when an audio playback application on the terminal device is started, the first earbud collects a first sound signal, and sends the first sound signal to the terminal device;

the terminal device performs sound effect processing on the first sound signal to obtain a second sound signal;

the terminal device performs audio mixing processing on accompaniment audio and the second sound signal to obtain a third sound signal;

the terminal device sends the third sound signal to the second earbud; and the second earbud plays the third sound signal.

In an example manner, the method further includes: The terminal device stores the first sound signal.

In any one of the first aspect to the third aspect of this application, the controlling, by the terminal device, the TWS Bluetooth headset to be in a first mode includes: When the first mode is enabled, the terminal device allocates audio roles to the first earbud and the second earbud, where an audio role of the first earbud is a sound collection role, and an audio role of the second earbud is a sound playback role.

In any manner of the first aspect to the third aspect of this application, before the allocating, by the terminal device, audio roles to the first earbud and the second earbud, the method further includes: The terminal device receives an instruction for enabling the first mode, and enables the first mode in response to the enable instruction.

In any manner of the first aspect to the third aspect of this application, optionally, the allocating, by the terminal device, audio roles to the first earbud and the second earbud includes:
 the terminal device detects wearing status information of the TWS Bluetooth headset, where the wearing status information is used to indicate whether the TWS Bluetooth headset is in a worn state or an unworn state; and
 the terminal device allocates the audio roles to the second earbud and the second earbud based on the wearing status information, where an audio role of an earbud in the unworn state is the sound collection role, and an audio role of an earbud in the worn state is the sound playback role.

In any manner of the first aspect to the third aspect of this application, optionally, the allocating, by the terminal device, audio roles to the first earbud and the second earbud includes:
 the terminal device displays a role selection interface, where audio role options for the first earbud and the second earbud are displayed in the role selection interface, and the audio role options include a sound collection option and a sound playback option;
 the terminal device receives a selection instruction entered by a user in the role selection interface; and
 the terminal device allocates the audio roles to the first earbud and the second earbud according to the selection instruction.

In any manner of the first aspect to the third aspect of this application, optionally, the allocating, by the terminal device, audio roles to the first earbud and the second earbud includes:
 the terminal device displays a role selection interface, where audio role options for the first earbud or the second earbud are displayed in the role selection interface, and the audio role options include a sound collection option and a sound playback option;
 the terminal device receives a selection instruction entered by a user in the role selection interface;
 the terminal device allocates an audio role to the first earbud or the second earbud according to the selection instruction; and
 the terminal device allocates an audio role to the other earbud in the TWS Bluetooth headset based on the audio role allocated to the first earbud or the second earbud.

In any manner of the first aspect to the third aspect of this application, optionally, the allocating, by the terminal device, audio roles to the first earbud and the second earbud includes:
 the terminal device allocates the audio roles to the first earbud and the second earbud based on stored historical data of audio roles of the TWS Bluetooth headset.

In any manner of the first aspect to the third aspect of this application, optionally, the allocating, by the terminal device, audio roles to the first earbud and the second earbud includes:
 the terminal device allocates the audio roles to the first earbud and the second earbud based on audio roles, configured by the system, of the TWS Bluetooth headset in the first mode.

A fourth aspect of this application provides a terminal device, including:
 a link establishment module, configured to establish a first Bluetooth link with a first earbud, and establish a second Bluetooth link with a second earbud, where the first earbud and the second earbud are single earbuds in a true wireless stereo TWS Bluetooth headset, and a third Bluetooth link is established between the first earbud and the second earbud;
 a control module, configured to control the TWS Bluetooth headset to be in a first mode, where in the first mode, the first earbud is used to collect a sound signal, and the second earbud is used to play a sound signal; and
 a sending module, configured to: when an audio playback application on the terminal device is started, send accompaniment audio to the second earbud through the second Bluetooth link.

In a possible implementation, the terminal device further includes:
 a receiving module, configured to receive a first sound signal sent by the first earbud through the first Bluetooth link, where the first sound signal is collected by the first earbud; and
 a storage module, configured to store the first sound signal.

A fifth aspect of this application provides a terminal device, including:
 a link establishment module, configured to establish a first Bluetooth link with a first earbud, and establish a second Bluetooth link with a second earbud, where the first earbud and the second earbud are single earbuds in a true wireless stereo TWS Bluetooth headset;
 a control module, configured to control the TWS Bluetooth headset to be in a first mode, where in the first mode, the first earbud is used to collect a sound signal, and the second earbud is used to play a sound signal;
 a receiving module, configured to: when an audio playback application on the terminal device is started, receive a second sound signal sent by the first earbud through the first Bluetooth link, where the second sound signal is obtained by the first earbud by performing sound effect processing on a collected first sound signal;
 an audio mixing module, configured to perform audio mixing processing on accompaniment audio and the second sound signal to obtain a third sound signal; and
 a sending module, configured to send the third sound signal to the second earbud through the second Bluetooth link.

In a possible implementation, the terminal device further includes a storage module, where
 the receiving module is further configured to receive the first sound signal sent by the first earbud through the first Bluetooth link, where the first sound signal is collected by the first earbud; and the storage module is configured to store the first sound
signal.

A sixth aspect of this application provides a terminal device, including:
- a link establishment module, configured to establish a first Bluetooth link with a first earbud, and establish a second Bluetooth link with a second earbud, where the first earbud and the second earbud are single earbuds in a true wireless stereo TWS Bluetooth headset;
- a control module, configured to control the TWS Bluetooth headset to be in a first mode, where in the first mode, the first earbud is used to collect a sound signal, and the second earbud is used to play a sound signal;
- a receiving module, configured to: when an audio playback application on the terminal device is started, receive a first sound signal sent by the first earbud through the first Bluetooth link, where the first sound signal is collected by the first earbud;
- a sound effect processing module, configured to perform sound effect processing on the first sound signal to obtain a second sound signal;
- an audio mixing module, configured to perform audio mixing processing on accompaniment audio and the second sound signal to obtain a third sound signal; and
- a sending module, configured to send the third sound signal to the second earbud through the second Bluetooth link.

In a possible implementation, the terminal device further includes a storage module, where
- the receiving module is further configured to receive the first sound signal sent by the first earbud through the first Bluetooth link, where the first sound signal is collected by the first earbud; and
- the storage module is configured to store the first sound signal.

In any one of the third aspect to the sixth aspect of this application, the control module is specifically configured to:
- when the first mode is enabled, allocate audio roles to the first earbud and the second earbud, where an audio role of the first earbud is a sound collection role, and an audio role of the second earbud is a sound playback role.

In any one of the third aspect to the sixth aspect of this application, the terminal device further includes an enabling module, where
- the receiving module is further configured to receive an instruction for enabling the first mode; and
- the enabling module is configured to enable the first mode according to the enable instruction.

In any one of the third aspect to the sixth aspect of this application, optionally, the control module is specifically configured to:
- detect wearing status information of the TWS Bluetooth headset, where the wearing status information is used to indicate whether the TWS Bluetooth headset is in a worn state or an unworn state; and
- allocate the audio roles to the second earbud and the second earbud based on the wearing status information, where an audio role of an earbud in the unworn state is the sound collection role, and an audio role of an earbud in the worn state is the sound playback role.

In any one of the third aspect to the sixth aspect of this application, optionally, the control module is specifically configured to:
- display a role selection interface, where audio role options for the first earbud and the second earbud are displayed in the role selection interface, and the audio role options include a sound collection option and a sound playback option;
- receive a selection instruction entered by a user in the role selection interface; and
- allocate the audio roles to the first earbud and the second earbud according to the selection instruction.

In any one of the third aspect to the sixth aspect of this application, optionally, the control module is specifically configured to:
- display a role selection interface, where audio role options for the first earbud or the second earbud are displayed in the role selection interface, and the audio role options include a sound collection option and a sound playback option;
- receive a selection instruction entered by a user in the role selection interface;
- allocate an audio role to the first earbud or the second earbud according to the selection instruction; and
- allocate an audio role to the other earbud in the TWS Bluetooth headset based on the audio role allocated to the first earbud or the second earbud.

In any one of the third aspect to the sixth aspect of this application, optionally, the control module is specifically configured to:
- allocate the audio roles to the first earbud and the second earbud based on stored historical data of audio roles of the TWS Bluetooth headset.

In any one of the third aspect to the sixth aspect of this application, optionally, the control module is specifically configured to:
- allocate the audio roles to the first earbud and the second earbud based on audio roles, configured by a system, of the TWS Bluetooth headset in the first mode.

A seventh aspect of this application provides a TWS Bluetooth headset, including a first earbud and a second earbud, where
- the first earbud is configured to establish a first Bluetooth link with a terminal device, and establish a third Bluetooth link with the second earbud;
- the second earbud is configured to establish a second Bluetooth link with the terminal device;
- when the TWS Bluetooth headset is in a first mode and an audio playback application on the terminal device is started, the first earbud is further configured to: collect a first sound signal, perform sound effect processing on the first sound signal to obtain a second sound signal, and send the second sound signal to the second earbud through the third Bluetooth link; and
- the second earbud is further configured to: receive accompaniment audio sent by the terminal device through the second Bluetooth link, perform audio mixing processing on the accompaniment audio and the second sound signal to obtain a third sound signal, and play the third sound signal.

In a possible implementation, the first earbud is further configured to send the first sound signal to the terminal device.

An eighth aspect of this application provides a TWS Bluetooth headset, including a first earbud and a second earbud, where
- the first earbud is configured to establish a first Bluetooth link with a terminal device;
- the second earbud is configured to establish a second Bluetooth link with the terminal device;
- when the TWS Bluetooth headset is in a first mode and an audio playback application on the terminal device is started, the first earbud is further configured to: collect a first sound signal, perform sound effect processing on the first sound signal to obtain a second sound signal, and send the second sound signal to the terminal device through the first Bluetooth link; and the second earbud is further configured to: receive a third sound signal sent by the terminal device through the second Bluetooth link, and play the third sound signal, where the third sound signal is obtained after the terminal device performs audio mixing processing on accompaniment audio and the second sound signal.

In a possible implementation, the first earbud is further configured to send the first sound signal to the terminal device.

A ninth aspect of this application provides a TWS Bluetooth headset, including a first earbud and a second earbud, where the first earbud is configured to establish a first Bluetooth link with a terminal device;

the second earbud is configured to establish a second Bluetooth link with the terminal device;

when the TWS Bluetooth headset is in a first mode and an audio playback application on the terminal device is started, the first earbud is further configured to: collect a first sound signal, and send the first sound signal to the terminal device through the first Bluetooth link; and the second earbud is further configured to: receive a third sound signal sent by the terminal device through the second Bluetooth link, and play the third sound signal, where the third sound signal is obtained after the terminal device performs audio mixing processing on accompaniment audio and a second sound signal, and the second sound signal is obtained after the terminal device performs sound effect processing on the first sound signal.

In a possible implementation, the first earbud is further configured to send the first sound signal to the terminal device.

A tenth aspect of this application provides a Bluetooth communication method, applied to a Bluetooth communications system. The Bluetooth communications system includes a TWS Bluetooth headset and a terminal device, and the TWS Bluetooth headset includes a first earbud and a second earbud. The terminal device and the first earbud communicate through a first Bluetooth link, and the terminal device and the second earbud communicate through a second Bluetooth link. The method includes:

when the TWS Bluetooth headset is in a second mode, and an audio playback application on the terminal device is started, the first earbud collects a first sound signal, and the second earbud collects a fourth sound signal;

the terminal device sends accompaniment audio to the first earbud and the second earbud;

the first earbud performs sound effect processing on the first sound signal to obtain a second sound signal, and performs audio mixing processing on the second sound signal and the accompaniment audio to obtain a third sound signal;

the second earbud performs sound effect processing on the fourth sound signal to obtain a fifth sound signal, and performs audio mixing processing on the fifth sound signal and the accompaniment audio to obtain a sixth sound signal; and the first earbud plays the third sound signal, and the second earbud plays the sixth sound signal.

In a possible implementation, the method further includes: The first earbud sends the first sound signal to the terminal device, and the terminal device stores the first sound signal.

In a possible implementation, the method further includes: The second earbud sends the fourth sound signal to the terminal device, and the terminal device stores the fourth sound signal.

An eleventh aspect of this application provides a Bluetooth communication method, applied to a Bluetooth communications system. The Bluetooth communications system includes a true wireless stereo TWS Bluetooth headset and a terminal device, and the TWS Bluetooth headset includes a first earbud and a second earbud. The terminal device and the first earbud communicate through a first Bluetooth link, and the terminal device and the second earbud communicate through a second Bluetooth link. The method includes:

when the TWS Bluetooth headset is in a second mode, and an audio playback application on the terminal device is started, the first earbud collects a first sound signal and sends the first sound signal to the terminal device, and the second earbud collects a fourth sound signal and sends the fourth sound signal to the terminal device;

the terminal device obtains, based on the first sound signal and/or the fourth sound signal, a sound signal to be played;

the terminal device sends the to-be-played sound signal to the first earbud and the second earbud; and the first earbud and the second earbud play the to-be-played sound signal.

In a possible implementation, that the terminal device obtains, based on the first sound signal and/or the fourth sound signal, a sound signal to be played includes:

the terminal device performs sound effect processing on the first sound signal to obtain a second sound signal, and performs audio mixing processing on the second sound signal and accompaniment audio to obtain a to-be-played third sound signal;

the terminal device performs sound effect processing on the fourth sound signal to obtain a fifth sound signal, and performs audio mixing processing on the fifth sound signal and the accompaniment audio to obtain a to-be-played sixth sound signal;

the terminal device sends the to-be-played third sound signal to the first earbud; and the terminal device sends the to-be-played sixth sound signal to the second earbud.

In a possible implementation, that the terminal device obtains, based on the first sound signal and/or the fourth sound signal, a sound signal to be played includes:

the terminal device selects one signal from the first sound signal and the fourth sound signal as a to-be-processed signal;

the terminal device performs sound effect processing on the to-be-processed signal to obtain a second sound signal; and the terminal device performs audio mixing processing on the second sound signal and accompaniment audio to obtain the to-be-played sound signal.

In a possible implementation, that the terminal device selects one signal from the first sound signal and the fourth sound signal as a to-be-processed signal includes:

the terminal device selects, as the to-be-processed signal from the first sound signal and the fourth sound signal, a sound signal collected by a primary earbud.

In a possible implementation, the method further includes: The terminal device stores the first sound signal or the fourth sound signal.

A twelfth aspect of this application provides a Bluetooth communication method, applied to a Bluetooth communications system. The Bluetooth communications system includes a true wireless stereo TWS Bluetooth headset and a terminal device, and the TWS Bluetooth headset includes a first earbud and a second earbud. The terminal device and the first earbud communicate through a first Bluetooth link, the terminal device and the second earbud communicate through a second Bluetooth link, and the first earbud and the second Bluetooth communicate through a third Bluetooth link. The method includes:
- when the TWS Bluetooth headset is in a second mode, and an audio playback application on the terminal device is started, the first earbud collects a first sound signal and sends the first sound signal to the terminal device, and the second earbud collects a fourth sound signal and sends the fourth sound signal to the terminal device;
- the terminal device performs sound effect processing on the first sound signal or the fourth sound signal to obtain a second sound signal;
- the terminal device performs audio mixing processing on the second sound signal and accompaniment audio to obtain a third sound signal;
- the terminal device sends the third sound signal to a primary earbud of the TWS Bluetooth headset;
- the primary earbud sends the third sound signal to a secondary earbud of the TWS Bluetooth headset; and
- the primary earbud and the secondary earbud play the third sound signal.

In a possible implementation, that the terminal device performs sound effect processing on the first sound signal or the fourth sound signal to obtain a second sound signal includes:
- the terminal device selects, as the to-be-processed signal from the first sound signal and the fourth sound signal, a sound signal collected by the primary earbud; and
- the terminal device performs sound effect processing on the to-be-processed signal to obtain the second sound signal.

In a possible implementation, the method further includes:
- the terminal device stores the first sound signal or the fourth sound signal.

A thirteenth aspect of this application provides a Bluetooth communication method, applied to a Bluetooth communications system. The Bluetooth communications system includes a true wireless stereo TWS Bluetooth headset and a terminal device, and the TWS Bluetooth headset includes a first earbud and a second earbud. The terminal device and the first earbud communicate through a first Bluetooth link, the terminal device and the second earbud communicate through a second Bluetooth link, and the first earbud and the second Bluetooth communicate through a third Bluetooth link. The method includes:
- when the TWS Bluetooth headset is in a second mode, and an audio playback application on the terminal device is started, the first earbud collects a first sound signal;
- the terminal device sends accompaniment audio to the first earbud;
- the first earbud performs sound effect processing on the first sound signal to obtain a second sound signal, and performs audio mixing processing on the second sound signal and the accompaniment audio to obtain a third sound signal;
- the first earbud sends the third sound signal to the second earbud; and
- the first earbud and the second earbud play the third sound signal.

In a possible implementation, the method further includes: The first earbud sends the first sound signal to the terminal device, and the terminal device stores the first sound signal.

In a possible implementation, the first earbud is a primary earbud of the TWS Bluetooth headset.

A fourteenth aspect of this application provides a Bluetooth communication method, applied to a Bluetooth communications system. The Bluetooth communications system includes a true wireless stereo TWS Bluetooth headset and a terminal device, and the TWS Bluetooth headset includes a first earbud and a second earbud. The terminal device and the first earbud communicate through a first Bluetooth link, and the terminal device and the second earbud communicate through a second Bluetooth link. The method includes:
- when the TWS Bluetooth headset is in a second mode and an audio playback application on the terminal device is started, the first earbud collects a first sound signal, and sends the first sound signal to the terminal device;
- the terminal device performs sound effect processing on the first sound signal to obtain a second sound signal;
- the terminal device performs audio mixing processing on the second sound signal and accompaniment audio to obtain a third sound signal;
- the terminal device sends the third sound signal to the first earbud and the second earbud; and
- the first earbud and the second earbud play the third sound signal.

In a possible implementation, the method further includes: The terminal device stores the first sound signal.

In a possible implementation, the first earbud is a primary earbud of the TWS Bluetooth headset.

A fifteenth aspect of this application provides a Bluetooth communication method, applied to a Bluetooth communications system. The Bluetooth communications system includes a true wireless stereo TWS Bluetooth headset and a terminal device, and the TWS Bluetooth headset includes a first earbud and a second earbud. The terminal device and the first earbud communicate through a first Bluetooth link, the terminal device and the second earbud communicate through a second Bluetooth link, and the first earbud and the second Bluetooth communicate through a third Bluetooth link. The method includes:
- when the TWS Bluetooth headset is in a second mode and an audio playback application on the terminal device is started, the first earbud collects a first sound signal, and sends the first sound signal to the terminal device;
- the terminal device performs sound effect processing on the first sound signal to obtain a second sound signal;
- the terminal device performs audio mixing processing on the second sound signal and accompaniment audio to obtain a third sound signal;
- the terminal device sends the third sound signal to the first earbud;
- the first earbud sends the third sound signal to the second earbud; and
- the first earbud and the second earbud play the third sound signal.

In a possible implementation, the method further includes: The terminal device stores the first sound signal.

In a possible implementation, the first earbud is a primary earbud of the TWS Bluetooth headset.

A sixteenth aspect of this application provides a TWS headset, including a first earbud and a second earbud, where
- the first earbud is configured to establish a first Bluetooth link with a terminal device;
- the second earbud is configured to establish a second Bluetooth link with the terminal device;
- when the TWS Bluetooth headset is in a second mode, and an audio playback application on the terminal device is started, the first earbud is further configured to collect a first sound signal, and the second earbud is further configured to collect a fourth sound signal;
- the first earbud is further configured to: receive accompaniment audio sent by the terminal device through the first Bluetooth link, perform sound effect processing on the first sound signal to obtain a second sound signal, perform audio mixing processing on the accompaniment audio and the second sound signal to obtain a third sound signal, and play the third sound signal.
- the first earbud is further configured to: receive the accompaniment audio sent by the terminal device through the second Bluetooth link, perform sound effect processing on the fourth sound signal to obtain a fifth sound signal, perform audio mixing processing on the accompaniment audio and the fifth sound signal to obtain a sixth sound signal, and play the sixth sound signal.

In a possible implementation, the first earbud is further configured to send the first sound signal to the terminal device.

In a possible implementation, the second earbud is further configured to send the fourth sound signal to the terminal device.

A seventeenth aspect of this application provides a terminal device, where the terminal device includes:
- a link establishment module, configured to establish a first Bluetooth link with a first earbud, and establish a second Bluetooth link with a second earbud, where the first earbud and the second earbud are single earbuds in a TWS Bluetooth headset;
- a receiving module, configured to: when the TWS Bluetooth headset is in a second mode and an audio playback application on the terminal device is started, receive a first sound signal that is sent by the first earbud through the first Bluetooth link, and receive a fourth sound signal that is sent by the second earbud through the second Bluetooth link, where the first sound signal is collected by the first earbud, and the fourth sound signal is collected by the second earbud;
- a processing module, configured to obtain, based on the first sound signal and/or the fourth sound signal, a sound signal to be played;
- a sending module, configured to send the to-be-played sound signal to the first earbud through the first Bluetooth link, and send the to-be-played sound signal to the second earbud through the second Bluetooth link.

In a possible implementation, the processing module is specifically configured to:
- perform sound effect processing on the first sound signal to obtain a second sound signal, and perform audio mixing processing on the second sound signal and accompaniment audio to obtain a to-be-played third sound signal;
- perform sound effect processing on the fourth sound signal to obtain a fifth sound signal, and perform audio mixing processing on the fifth sound signal and the accompaniment audio to obtain a to-be-played sixth sound signal;
- send the to-be-played third sound signal to the first earbud through the first Bluetooth link; and
- send the to-be-played sixth sound signal to the second earbud through the second Bluetooth link.

In a possible implementation, the processing module is specifically configured to:
- select one signal from the first sound signal and the fourth sound signal as a to-be-processed signal;
- perform sound effect processing on the to-be-processed signal to obtain a second sound signal; and
- perform audio mixing processing on the second sound signal and the accompaniment audio to obtain the to-be-played sound signal.

In a possible implementation, the selecting one signal from the first sound signal and the fourth sound signal as a to-be-processed signal includes:
- selecting, as the to-be-processed signal from the first sound signal and the fourth sound signal, a sound signal collected by a primary earbud.

In a possible implementation, the terminal device further includes a storage module, configured to store the first sound signal or the fourth sound signal.

An eighteenth aspect of this application provides a terminal device, where the terminal device includes:
- a link establishment module, configured to establish a first Bluetooth link with a first earbud, and establish a second Bluetooth link with a second earbud, where the first earbud and the second earbud are single earbuds in a TWS Bluetooth headset, and a third Bluetooth link is established between the first earbud and the second earbud;
- a receiving module, configured to: when the TWS Bluetooth headset is in a second mode and an audio playback application on the terminal device is started, receive a first sound signal that is sent by the first earbud through the first Bluetooth link, and receive a fourth sound signal that is sent by the second earbud through the second Bluetooth link, where the first sound signal is collected by the first earbud;
- a sound effect processing module, configured to perform sound effect processing on the first sound signal or the fourth sound signal to obtain a second sound signal;
- an audio mixing module, configured to perform audio mixing processing on accompaniment audio and the second sound signal to obtain a third sound signal; and
- a sending module, configured to send the third sound signal to a primary earbud of the TWS Bluetooth headset.

In a possible implementation, the sound effect processing module is specifically configured to select, from the first sound signal and the fourth sound signal, a sound signal collected by the primary earbud as the to-be-processed signal, and perform sound effect processing on the to-be-processed signal to obtain the second sound signal.

In a possible implementation, the terminal device further includes a storage module, configured to store the first sound signal or the fourth sound signal.

A nineteenth aspect of this application provides a TWS headset, including a first earbud and a second earbud, where
- the first earbud is configured to establish a first Bluetooth link with a terminal device, and establish a third Bluetooth link with the second earbud;
- the second earbud is configured to establish a second Bluetooth link with the terminal device;

when the TWS Bluetooth headset is in a second mode, and an audio playback application on the terminal device is started, the first earbud is configured to collect a first sound signal;

the first earbud is further configured to: receive accompaniment audio sent by the terminal device, perform sound effect processing on the first sound signal to obtain a second sound signal, perform audio mixing processing on the accompaniment audio and the second sound signal to obtain a third sound signal, and send the third sound signal to the second earbud;

the first earbud is further configured to play the third sound signal; and the second earbud is further configured to play the third sound signal.

In a possible implementation, the first earbud is further configured to send the first sound signal to the terminal device.

In a possible implementation, the first earbud is a primary earbud of the TWS Bluetooth headset.

A twentieth aspect of this application provides a terminal device, where the terminal device includes:

a link establishment module, configured to establish a first Bluetooth link with a first earbud, and establish a second Bluetooth link with a second earbud, where the first earbud and the second earbud are single earbuds in a TWS Bluetooth headset;

a receiving module, configured to: when the TWS Bluetooth headset is in a second mode and an audio playback application on the terminal device is started, receive a first sound signal sent by the first earbud through the first Bluetooth link, where the first sound signal is collected by the first earbud;

a sound effect processing module, configured to perform sound effect processing on the first sound signal to obtain a second sound signal;

an audio mixing module, configured to perform audio mixing processing on accompaniment audio and the second sound signal to obtain a third sound signal; and a sending module, configured to send the third sound signal to the first earbud through the first Bluetooth link.

In a possible implementation, the sending module is further configured to send the third sound signal to the second earbud through the second Bluetooth link.

In a possible implementation, the terminal device further includes a storage module, configured to store the first sound signal.

In a possible implementation, the first earbud is a primary earbud of the TWS Bluetooth headset.

A twenty-first aspect of this application provides a TWS headset, including a first earbud and a second earbud, where the first earbud is configured to establish a first Bluetooth link with a terminal device, and establish a third Bluetooth link with the second earbud;

the second earbud is configured to establish a second Bluetooth link with the terminal device;

when the TWS Bluetooth headset is in a second mode and an audio playback application on the terminal device is started, the first earbud is further configured to: collect a first sound signal, and send the first sound signal to the terminal device through the first Bluetooth link;

the first earbud is further configured to: receive a third sound signal sent by the terminal device through the first Bluetooth link, and send the third sound signal to the second earbud through the third Bluetooth link, where the third sound signal is obtained after the terminal device performs sound effect processing and audio mixing processing on the first sound signal;

the first earbud is further configured to play the third sound signal; and the second earbud is further configured to play the third sound signal.

A twenty-second aspect of this application provides a TWS headset, including a first earbud and a second earbud, where the first earbud is configured to establish a first Bluetooth link with a terminal device;

the second earbud is configured to establish a second Bluetooth link with the terminal device;

when the TWS Bluetooth headset is in a second mode and an audio playback application on the terminal device is started, the first earbud is further configured to collect a first sound signal, and send the first sound signal to the terminal device through the first Bluetooth link;

the first earbud is further configured to: receive a third sound signal sent by the terminal device through the first Bluetooth link, and play the third sound signal, where the third sound signal is obtained after the terminal device performs sound effect processing and audio mixing processing on the first sound signal; and the second earbud is further configured to: receive the third sound signal sent by the terminal device through the second Bluetooth link, and play the third sound signal.

A twenty-third aspect of this application provides a terminal device, including a processor, a memory, and a transceiver. The memory is configured to store instructions, the transceiver is configured to communicate with another device, and the processor is configured to execute the instructions stored in the memory, so that the terminal device performs method steps performed by a terminal device in any possible implementation of the first aspect to the third aspect and the tenth aspect to the fifteenth aspect of this application.

A twenty-fourth aspect of this application provides a TWS Bluetooth headset, including a processor, a memory, and a transceiver. The memory is configured to store instructions, the transceiver is configured to communicate with another device, and the processor is configured to execute the instructions stored in the memory, so that the terminal device performs method steps performed by a first earbud and a second earbud in any possible implementation of the first aspect to the third aspect and the tenth aspect to the fifteenth aspect of this application.

A twenty-fifth aspect of this application provides a computer readable storage medium, where the computer readable storage medium stores instructions, and when the instructions are executed, a computer is enabled to perform method steps performed by a terminal device in any possible implementation of the first aspect to the third aspect and the tenth aspect to the fifteenth aspect of this application.

A twenty-sixth aspect of this application provides a computer readable storage medium, where the computer readable storage medium stores instructions, and when the instructions are executed, a computer is enabled to perform method steps performed by a first earbud or a second earbud in any possible implementation of the first aspect to the third aspect and the tenth aspect to the fifteenth aspect of this application.

The embodiments of this application provide the Bluetooth communication method and the apparatus, applied to the Bluetooth communications system. The Bluetooth communications system includes the TWS Bluetooth headset and the terminal device. The TWS Bluetooth headset includes the first earbud and the second earbud. The terminal device controls the TWS Bluetooth headset to be in the first mode, and in the first mode, the first earbud is used to collect a sound signal, and the second earbud is used to play a sound signal. The first earbud is held on a hand of the user, and the second earbud is worn on an ear of the user. When an audio app on the terminal device is started, the first earbud collects the first sound signal, performs sound effect processing on the first sound signal to obtain the second sound signal, and sends the second sound signal to the second earbud. The terminal device sends the accompaniment audio to the second earbud, and the second earbud performs audio mixing processing on the accompaniment audio and the second sound signal for playing. The first earbud held by the user on the hand can be closer to the mouth of the user, so that a high requirement of the user for sound detail pickup can be met. One earbud is held on the hand, and the other is worn on the ear. The hand-held earbud is dedicated to sound pickup, and the earbud worn on the ear is dedicated to return ear. This conforms to a user's habit of holding a microphone in a normal karaoke situation, and can implement a real-time in-ear monitoring function.

DESCRIPTION OF EMBODIMENTS

Figure 1:
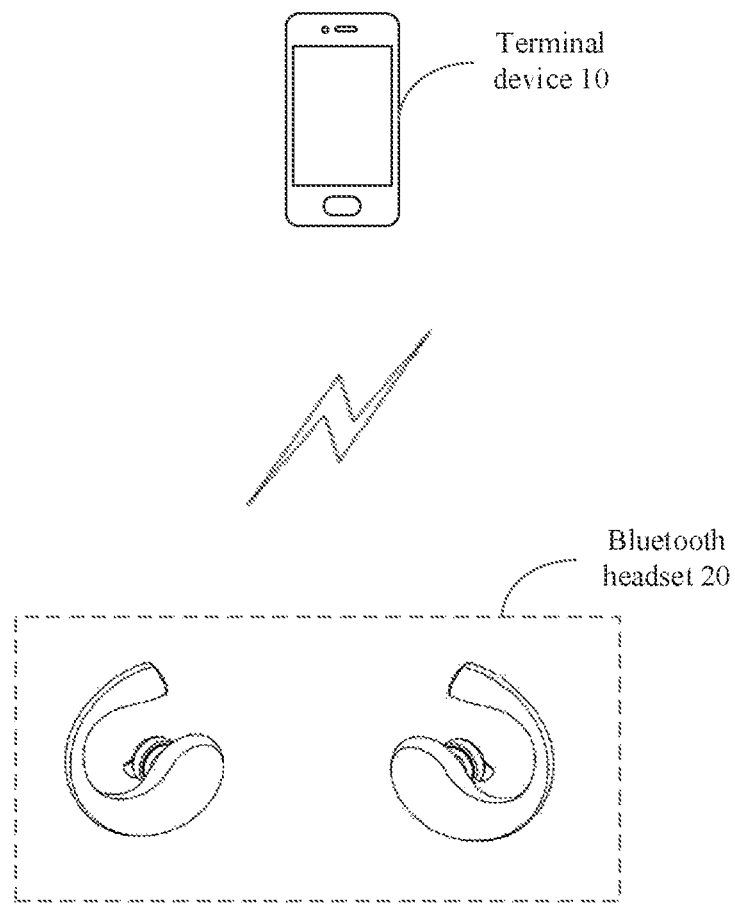
FIG. 1 is a schematic architectural diagram of a Bluetooth communications system to which embodiments of this application are applicable.

The embodiments of this application provide a Bluetooth communication method. FIG. 1 is a schematic architectural diagram of a Bluetooth communications system to which the embodiments of this application are applicable. Referring to FIG. 1, the Bluetooth communications system includes a terminal device 10 and a Bluetooth headset 20. The terminal device 10 and the Bluetooth headset communicate through a Bluetooth link.

In the embodiments of this application, the Bluetooth headset is a headset supporting a Bluetooth communications protocol. The Bluetooth communications protocol may be a conventional Bluetooth protocol, and the conventional Bluetooth protocol is also referred to as the classic Bluetooth protocol. Alternatively, the Bluetooth communications protocol may be the Bluetooth low energy (Bluetooth low energy, BLE) Bluetooth protocol. With evolution of Bluetooth protocols, the Bluetooth communications protocol may also be another Bluetooth protocol that is to be released in the future. With development of Bluetooth technologies, a version of the Bluetooth communications protocol keeps changing. The version of the Bluetooth communications protocol in the embodiments of this application may be any one of the following versions: version 1.0, version 2.0, version 3.0, or version 4.0.

The Bluetooth headset in the embodiments of this application is a TWS Bluetooth headset. The TWS Bluetooth headset includes two earbuds: a first earbud and a second earbud. The first earbud and the second earbud are also referred to as a primary earbud and a secondary earbud. Different from another Bluetooth headset, in the TWS Bluetooth headset, the primary earbud and the secondary earbud may perform data transmission by using a Bluetooth protocol, and the primary earbud sends data to the secondary earbud through a Bluetooth link between the primary earbud and the secondary earbud. There is no connection cable between the primary earbud and the secondary earbud, and the two earbuds communicate with each other in a wireless manner, so that the headset is more convenient to carry and use. There are two types of Bluetooth headsets: a head-mounted type and an in-ear type. The TWS Bluetooth headset in the embodiments of this application is the in-ear type.

Figure 2:
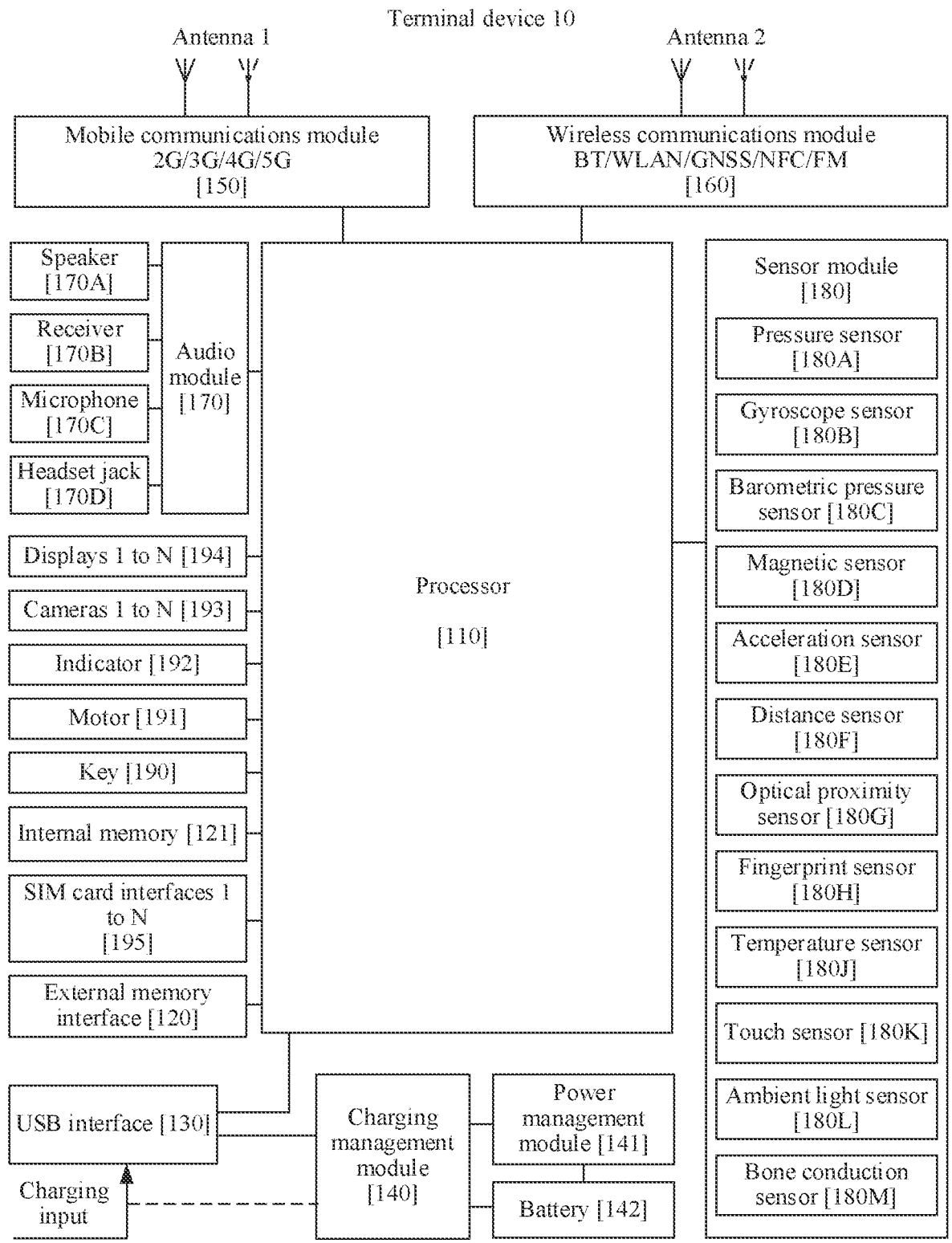
FIG. 2 is a schematic structural diagram of a terminal device to which the embodiments of this application are applicable.

In the embodiments of this application, the terminal device 10 may be a mobile phone, a computer, a smart television, a vehicle-mounted device, a wearable device, an industrial device, or the like. FIG. 2 is a schematic structural diagram of a terminal device to which the embodiments of this application are applicable. Referring to FIG. 2, the terminal device 10 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor 180, a key 190, a motor 191, an indicator 192, a camera 193, a display 194, a subscriber identification module (subscriber identification module, SIM) card interface 195, and the like. It may be understood that the structure shown in this embodiment does not constitute a specific limitation on the terminal device 10. In some other embodiments of this application, the terminal device 10 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor. DSP), a baseband processor, and/or a neural-network processing unit (neural-network processing unit, NPU). Different processing units may be independent devices, or may be integrated into one or more processors. In some embodiments, the terminal device 10 may alternatively include one or more processors 110. The controller may be a nerve center and a command center of the terminal device 10. The controller may generate an operation control signal based on an instruction operation code and a time sequence signal, to complete control of instruction fetching and instruction execution. A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110, thereby improving system efficiency of the terminal device 10.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like. The USB interface 130 is an interface that conforms to a USB standard specification, and may be specifically a mini USB interface, a micro USB interface, a USB Type-C interface, or the like. The USB interface 130 may be configured to connect to a charger to charge the terminal device 10, or may be configured to transmit data between the terminal device 10 and a peripheral device, or may be configured to connect to a headset to play audio by using the headset.

It may be understood that an interface connection relationship between the modules that is shown in this embodiment of the present invention is merely an example for description, and does not constitute a limitation on the structure of the terminal device 10. In some other embodiments of this application, the terminal device 10 may alternatively use an interface connection mode different from that in the foregoing embodiment, or use a combination of a plurality of interface connection modes.

The charging management module 140 is configured to receive charging input from the charger. The charger may be a wireless charger or a wired charger. In some embodiments of wired charging, the charging management module 140 may receive charging input from a wired charger through the USB interface 130. In some embodiments of wireless charging, the charging management module 140 may receive wireless charging input by using a wireless charging coil of the terminal device 10. The charging management module 140 supplies power to the terminal device 10 by using the power management module 141 while charging the battery 142.

The power management module 141 is configured to connect the battery 142, the charging management module 140, and the processor 110. The power management module 141 receives input of the battery 142 and/or input of the charging management module 140, and supplies power to the processor 110, the internal memory 121, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the terminal device 10 may be implemented by using the antenna 1, the antenna 2, the mobile communications module 150, the wireless communications module 160, the modem processor, the baseband processor, and the like. The antenna 1 and the antenna 2 are configured to transmit and receive electromagnetic wave signals. Each antenna in the terminal device 10 may be configured to cover one or more communication frequency bands. Different antennas may further be multiplexed, to improve antenna utilization. For example, the antenna 1 may be multiplexed as a diversity antenna of a wireless local area network. In some other embodiments, the antenna may be used in combination with a tuning switch.

The mobile communications module 150 may provide a solution used for wireless communication including 2G, 3G, 4G, 5G, and the like in the terminal device 10. The mobile communications module 150 may include at least one filter, a switch, a power amplifier, a low noise amplifier, and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some function modules of the mobile communications module 150 and at least some modules of the processor 110 may be disposed in a same device.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transmitted to the application processor. The application processor outputs a sound signal by using an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communications module 150 or another function module.

The wireless communications module 160 may provide wireless communication solutions, applied to the terminal device 10, that include a wireless local area network (wireless local area networks, WLAN), Bluetooth, a global navigation satellite system (global navigation satellite system, GNSS), frequency modulation (frequency modulation, FM), NFC, an infrared (infrared, IR) technology, and the like. The wireless communications module 160 may be one or more devices that integrate at least one communication processing module. The wireless communications module 160 receives an electromagnetic wave through the antenna 2, performs frequency modulation and filtering on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, the antenna 1 of the terminal device 10 is coupled to the mobile communications module 150, and the antenna 2 is coupled to the wireless communications module 160, so that the terminal device 10 can communicate with a network and another device by using a wireless communications technology. The wireless communications technology may include GSM, GPRS. CDMA, WCDMA, TD-SCDMA, LTE, GNSS, WLAN, NFC. FM, an IR technology, and/or the like. The GNSS may include a global positioning system (global positioning system, GPS), a global navigation satellite system (global navigation satellite system. GLONASS), a beidou navigation satellite system (beidou navigation satellite system. BDS), a quasi-zenith satellite system (quasi-zenith satellite system, QZSS), and/or a satellite based augmentation system (satellite based augmentation systems, SBAS).

The electronic device 10 may implement a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs, which execute an instruction to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a MicroLed, a MicrooLed, quantum dot light emitting diodes (quantum dot light emitting diodes, QLED), or the like. In some embodiments, the terminal device 10 may include one or N displays 194, where N is a positive integer greater than 1.

The terminal device 10 may implement a photographing function by using the ISP, one or more cameras 193, the video codec, the GPU, one or more displays 194, the application processor, and the like.

The NPU is a neural-network (neural-network, NN) computing processor, quickly processes input information by referring to a structure of a biological neural network, for example, by referring to a transfer mode between human brain neurons, and may further continuously perform self-learning. Applications such as intelligent cognition, for example, image recognition, facial recognition, speech recognition, and text understanding of the terminal device 10 may be implemented through the NPU.

The external memory interface 120 may be configured to connect to an external storage card, for example, a micro SD card, to extend a storage capability of the terminal device 10. The external storage card communicates with the processor 110 through the external memory interface 120, to implement a data storage function. For example, data files such as music, a photo, and a video are stored in the external memory card.

The internal memory 121 may be configured to store one or more computer programs, where the one or more computer programs include instructions. The processor 110 may run the instructions stored in the internal memory 121, so that the terminal device 10 performs the voice switching method provided in some embodiments of this application, various function applications, data processing, and the like. The internal memory 121 may include a program storage area and a data storage area. The program storage area may store an operating system. The program storage area may further store one or more applications (for example, Gallery and Contacts), and the like. The data storage area may store data (for example, a photo and a contact) created during use of the terminal device 10, and the like. In addition, the internal memory 121 may include a high-speed random access memory, and may further include a nonvolatile memory, for example, at least one magnetic disk storage device, a flash storage device, or a universal flash storage (universal flash storage, UFS). In some embodiments, the processor 110 may run the instructions stored in the internal memory 121 and/or the instructions stored in the memory that is disposed in the processor 110, to enable the terminal device 10 to perform the voice switching method provided in the embodiments of this application, various function applications, and data processing.

The terminal device 10 may implement audio functions, for example, music playback and recording, by using the audio module 170, the speaker 170A, the receiver 170B, the microphone 170C, the headset jack 170D, the application processor, and the like. The audio module 170 is configured to convert digital audio information into analog audio signal output, and is also configured to convert analog audio input into a digital audio signal. The audio module 170 may be further configured to code and decode an audio signal. In some embodiments, the audio module 170 may be disposed in the processor 110, or some function modules of the audio module 170 are disposed in the processor 110. The speaker 170A, also referred to as a "horn", is configured to convert an electrical audio signal into a sound signal. The terminal device 10 may be used to listen to music or answer a call in a hands-free mode over the speaker 170A. The receiver 170B, also referred to as an "earpiece", is configured to convert an electrical audio signal into a sound signal. When a call is answered or speech information is received by using the terminal device 10, the receiver 170B may be put close to a human ear to receive a speech. The microphone 170C, also referred to as a "mike" or a "microphone", is configured to convert a sound signal into an electrical signal. When making a call or sending speech information, the user may make a sound by moving a human mouth close to the microphone 170C to input a sound signal to the microphone 170C. At least one microphone 170C may be disposed in the terminal device 10. In some other embodiments, two microphones 170C may be disposed in the terminal device 10, to implement a noise reduction function, in addition to collecting a sound signal. In some other embodiments, three, four, or more microphones 170C may alternatively be disposed in the terminal device 10, to collect a sound signal, reduce noise, identify a sound source, implement a directional recording function, and the like. The headset jack 170D is configured to connect to a wired headset. The headset jack 170D may be the USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The sensor 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates including conductive materials. When force is applied to the pressure sensor 180A, capacitance between electrodes changes. The terminal device 10 determines pressure intensity based on a capacitance change. When a touch operation is performed on the display 194, the terminal device 10 detects intensity of the touch operation by using the pressure sensor 180A. The terminal device 10 may further calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messaging application icon, an instruction for viewing an SMS message is executed. When a touch operation whose touch operation intensity is greater than or equal to the first pressure threshold is performed on the Messaging application icon, an instruction for creating a new SMS message is executed.

The gyroscope sensor 180B may be configured to determine a motion posture of the terminal device 10. In some embodiments, an angular velocity of the terminal device 10 around three axes (namely, axes x, y, and z) may be determined by using the gyroscope sensor 180B. The gyroscope sensor 180B may be configured to implement image stabilization during photographing. For example, when the shutter is pressed, the gyroscope sensor 180B detects an angle at which the terminal device 10 jitters, obtains, through calculation based on the angle, a distance for which a lens module needs to compensate, and allows the lens to cancel jitter of the terminal device 10 through reverse motion, to implement image stabilization. The gyroscope sensor 180B may be further used in a navigation scenario, a motion-sensing game scenario, and the like.

The acceleration sensor 180E may detect accelerations in various directions (usually on three axes) of the terminal device 10, and may detect a value and a direction of gravity when the terminal device 10 is still. The acceleration sensor 180E may be further configured to identify a posture of the electronic device, and is used in switching between a landscape mode and a portrait mode, and applications such as a pedometer.

The distance sensor 180F is configured to measure a distance. The terminal device 10 may measure a distance in an infrared manner or a laser manner. In some embodiments, in a photographing scenario, the terminal device 10 may measure a distance by using the distance sensor 180F, to implement quick focusing.

The optical proximity sensor 180G may include, for example, a light-emitting diode (LED) and an optical detector, for example, a photodiode. The light-emitting diode may be an infrared light-emitting diode. The terminal device 10 emits infrared light by using the light-emitting diode. The terminal device 10 detects infrared reflected light from a nearby object by using the photodiode. When detecting sufficient reflected light, it may be determined that there is an object near the terminal device 10. When detecting insufficient reflected light, the terminal device 10 may determine that there is no object near the terminal device 10. The terminal device 10 may detect, by using the optical proximity sensor 180G, that the user holds the terminal device 10 close to an ear for a call, so that the terminal device 10 automatically turns off the screen to save power. The optical proximity sensor 180G may also be used in a smart cover mode or a pocket mode to automatically perform screen unlocking or locking.

The ambient optical sensor 180L is configured to sense ambient light brightness. The terminal device 10 may adaptively adjust brightness of the display 194 based on the sensed ambient light brightness. The ambient optical sensor 180L may further be configured to automatically adjust white balance during photographing. The ambient optical sensor 180L may further cooperate with the proximity sensor 180G to detect whether the terminal device 10 is in a pocket, to avoid an accidental touch.

The fingerprint sensor 180H (also referred to as a fingerprint recognizer) is configured to collect a fingerprint. The terminal device 10 may use a feature of the collected fingerprint to implement fingerprint-based unlocking, application lock access, fingerprint-based photographing, fingerprint-based call answering, and the like.

The touch sensor 180K may also be referred to as a touch panel or a touch-sensitive surface. The touch sensor 180K may be disposed on the display 194. The touch sensor 180K and the display 194 form a touchscreen, and the touchscreen is also referred to as a "touch control screen". The touch sensor 180K is configured to detect a touch operation performed on or near the touch sensor 180K. The touch sensor may transfer the detected touch operation to the application processor, to determine a type of a touch event. Visual output related to the touch operation may be provided by using the display 194. In some other embodiments, the touch sensor 180K may alternatively be disposed on a surface of the terminal device 10 at a location different from a location of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, to receive a blood pressure beating signal. In some embodiments, the bone conduction sensor 180M may alternatively be disposed in a headset to form a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The key 190 includes a power key, a volume key, and the like. The key 190 may be a mechanical button or a touch-sensitive key. The terminal device 10 may receive key input, and generate key signal input related to a user setting and function control of the terminal device 10.

The SIM card interface 195 is configured to connect to a SIM card. The SIM card may be inserted into the SIM card interface 195 or removed from the SIM card interface 195, to implement contact with or separation from the terminal device 10. The terminal device 10 can support one or N SIM card interfaces, where N is a positive integer greater than 1. The SIM card interface 195 may support a nano SIM card, a micro SIM card, a SIM card, and the like. A plurality of cards may be simultaneously inserted into a same SIM card interface 195. The plurality of cards may be of a same type or of different types. The SIM card interface 195 may be compatible with different types of SIM cards. The SIM card interface 195 may also be compatible with an external memory card. The terminal device 10 interacts with a network through the SIM card, to implement functions such as calling and data communication. In some embodiments, the terminal device 10 uses an eSIM, namely, an embedded SIM card. The eSIM card may be embedded in the terminal device 10, and cannot be separated from the terminal device 10.

Currently, TWS Bluetooth headsets generally have only basic functions of listening to music and making and receiving a call, and functions of the Bluetooth headset are relatively simple. To enrich application scenarios of a TWS Bluetooth headset and meet a multi-function requirement of a user for the TWS Bluetooth headset, the embodiments of this application provide a Bluetooth communication method. The Bluetooth communication method enables the user to use a mobile phone to perform karaoke, live broadcast, short video recording, Vlog recording, and the like. In the foregoing scenario, sound pickup and/or sound recording need to be performed. Sound pickup is to collect a user sound signal, and sound recording is to store a sound signal.

In recent years, Bluetooth headsets and Bluetooth microphones have attracted much attention from the society due to their advantages such as convenience to carry, free from wires, long battery life, and fashion. Generally, the Bluetooth headset can be used for both sound pickup and sound playback. For example, a microphone on the Bluetooth headset may be used for sound pickup, and a speaker on the Bluetooth headset may be used for sound playback.

In an existing solution, a head-mounted Bluetooth headset may be used to perform karaoke. It may be understood that the head-mounted Bluetooth headset is different from the in-ear TWS Bluetooth headset in this embodiment of this application. The head-mounted Bluetooth headset uses a private solution, can only be bound to a dedicated application (application, APP), and cannot be highly adapted to another third-party app that requires sound pickup or recording. In addition, the head-mounted Bluetooth headset further has the following problems when performing sound pickup: (1) Because a microphone of the Bluetooth headset is relatively far away from a user mouth, a high requirement of the user for sound detail pickup cannot be met. (2) Both Bluetooth headphones are worn on the ears to pick up sound, which does not comply with the user's habit of holding the microphone when the user is singing a song. (3) The Bluetooth headset cannot support real-time in-ear monitoring.

To resolve the problems in the conventional technology, an embodiment of the present invention provides a Bluetooth communication method. In the communication method, an operating mode, for example, a first mode, needs to be added for a TWS Bluetooth headset. In the first mode, a first earbud is used to collect a sound signal, a second earbud is used to play a sound signal, the first earbud may be held on a hand of a user, and the second earbud may be worn on an ear of the user. The first earbud held by the user on the hand can be closer to the mouth of the user, so that a high requirement of the user for sound detail pickup can be met. One earbud is held on the hand, and the other is worn on the ear. The hand-held earbud is dedicated to sound pickup, and the earbud worn on the ear is dedicated to listen back. This conforms to a user's habit of holding a microphone in a normal karaoke situation, and can implement a real-time in-ear monitoring function.

An in-ear monitor is very important in a karaoke scenario. For a user or a singer, the user or singer probably cannot hear his/her own voice during singing, and therefore an in-ear monitor needs to be used to monitor whether his/her voice is out of tone or out of tune. In addition, the user or singer probably cannot hear accompaniment or the accompaniment is delayed, and the in-ear monitor can send the accompaniment to the singer's ear. In this embodiment of this application, the in-ear monitor can transmit the accompaniment and the sound of the user to the user by using an earphone worn on the ear, so that the user can hear the sound of the user and the accompaniment.

The collected voice signal in this embodiment of this application may be high-definition voice. The high-definition voice is also referred to as broadband voice, and is an audio technology that can transmit high-definition and natural voice in a cellular network, a mobile phone, and a wireless headset. Compared with the conventional narrowband telephone, the HD voice greatly improves voice quality and reduces auditory burden. By using an improved subband codec (subband codec, mSBC) voice encoding and decoding technology, a wireless Bluetooth headset also starts to support high-definition voice, and combines hands-free calling and high voice quality. Therefore, the TWS Bluetooth headset in this embodiment of this application can support high-definition voice transmission.

In this embodiment of this application, a sampling frequency of high-definition voice may be 32 KHz or 48 KHz, and a bandwidth used for transmission may reach 16 KHz or 32 KHz. In other words, a transmission bandwidth of a Bluetooth link between the headset and a terminal device is 16 KHz or 32 KHz. A coding scheme of Bluetooth headset data transmission may be mSBC. High-definition voice data enables a delay of a voice signal, collected by the first earbud, in arriving at the second headset after being processed to be less than 55 ms, so that a requirement of an in-ear monitor for a low delay can be met.

It should be noted that the first mode may also be referred to as a "karaoke mode" or another mode. A name of the first mode is not limited in this embodiment of this application. All modes in which the first earbud is used to collect a sound signal and the second earbud is used to play a sound signal fall within the protection scope of this application. In the first mode, a user not only can perform karaoke, but also can perform live broadcasting, short video recording, Vlog recording, a voice call, and the like.

In some embodiments of this application, both the first earbud and the second earbud need to establish Bluetooth links with the terminal device to perform service connection, and a Bluetooth link also needs to be established between the first earbud and the second earbud. In some other embodiments, both the first earbud and the second earbud need to establish Bluetooth links with the terminal device to perform service connection, but no Bluetooth link needs to be established between the first earbud and the second earbud. In another embodiment, the terminal device needs to establish a Bluetooth link only with the first earbud, and does not need to establish a Bluetooth link with the second earbud, and communication is performed between the first earbud and the second earbud in a data forwarding manner. For example, the terminal device sends audio data to the first earbud, and after receiving the audio data, the first earbud forwards the audio data to the second earbud, so as to implement synchronous vocalization between the two earbuds. In this scenario, the first earbud is used as a primary earbud, and the second earbud is used as a secondary earbud.

For ease of understanding, the following describes a process of establishing a service connection between a terminal device and a Bluetooth headset by using an example in which the terminal is a mobile phone. A process of establishing a service connection between the terminal device and the Bluetooth headset includes three phases; a scanning phase, a pairing phase, and a service connection establishment phase. The following provides detailed descriptions with reference to FIG. 3A to FIG. 3E.

Figure 3A:
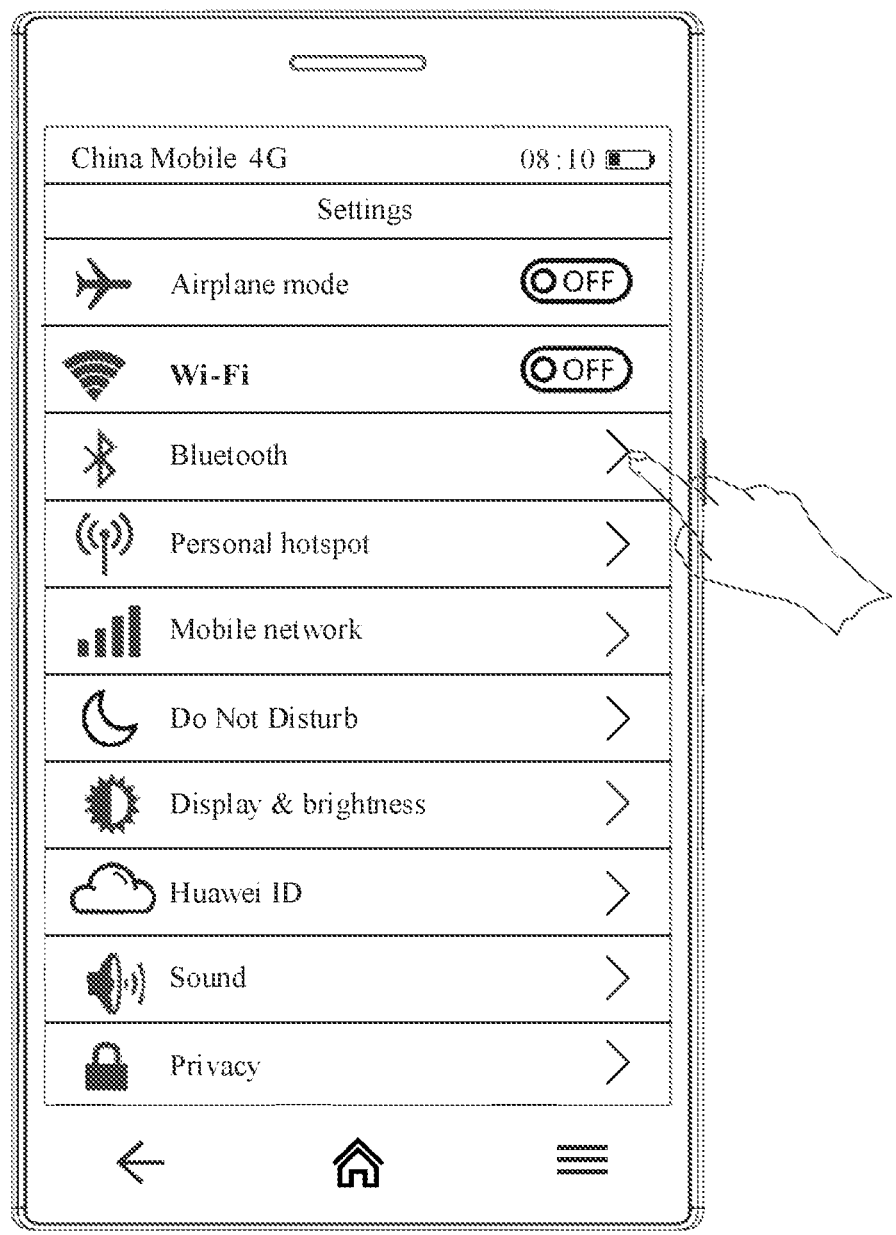
FIG. 3A to FIG. 3E are schematic diagrams of terminal interfaces in an application scenario according to an embodiment of this application.
Figure 3B:
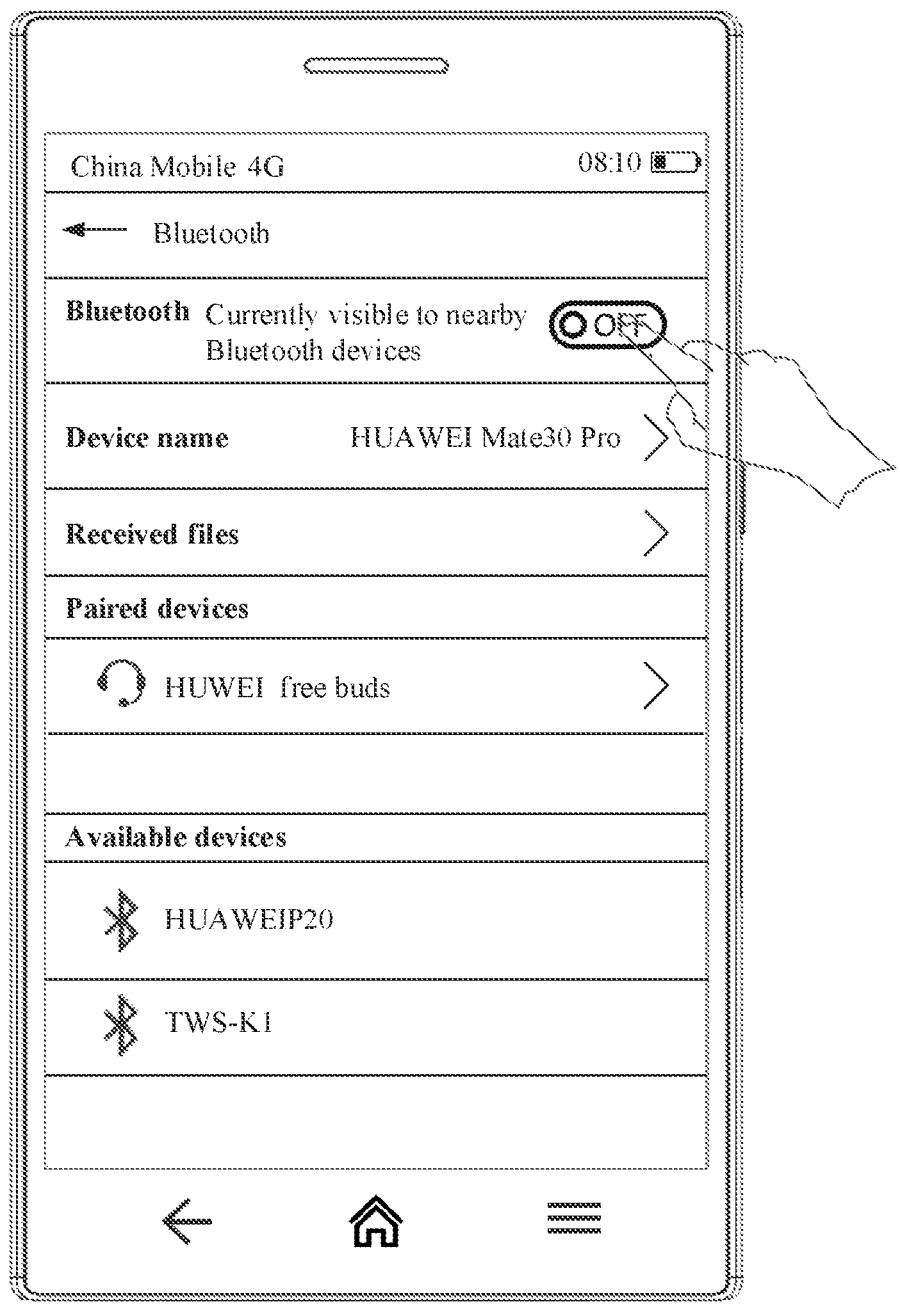

FIG. 3A to FIG. 3E are schematic diagrams of terminal interfaces in an application scenario according to an embodiment of this application. For example, as shown in FIG. 3A, "Bluetooth" is selected in a setting interface of the terminal device to enter a Bluetooth setting interface, and the Bluetooth setting interface is shown in FIG. 3B. Referring to FIG. 3B, when the terminal device receives an instruction corresponding to an operation performed by a user on the Bluetooth enabling option, the terminal enables a Bluetooth function.

The user may tap a "Settings" app in the terminal device to enter the setting interface shown in FIG. 3A. Certainly, in some terminal devices, the user may further open a Bluetooth setting interface by using a quick entry. For example, on a home screen of the mobile phone, the user may slide down from the top of the screen to open a quick setting interface. A "Bluetooth" icon is displayed in the quick setting interface, and the user may touch and hold the "Bluetooth" icon to enter the Bluetooth setting interface shown in FIG. 3B.

In some scenarios, after the Bluetooth function is enabled on the terminal, a nearby Bluetooth device that can be paired can be found, and a Bluetooth device detected through scanning is displayed in a list of "Available devices". For example, FIG. 3B shows a case in which the current terminal device HUAWEI Mate30 Pro detects, through scanning, a Bluetooth device HUAWEIP20 and a first earbud: TWS-K1, and the first earbud is displayed as TWS-K1 in the Bluetooth setting interface. This phase is called the scanning phase.

Figure 3C:
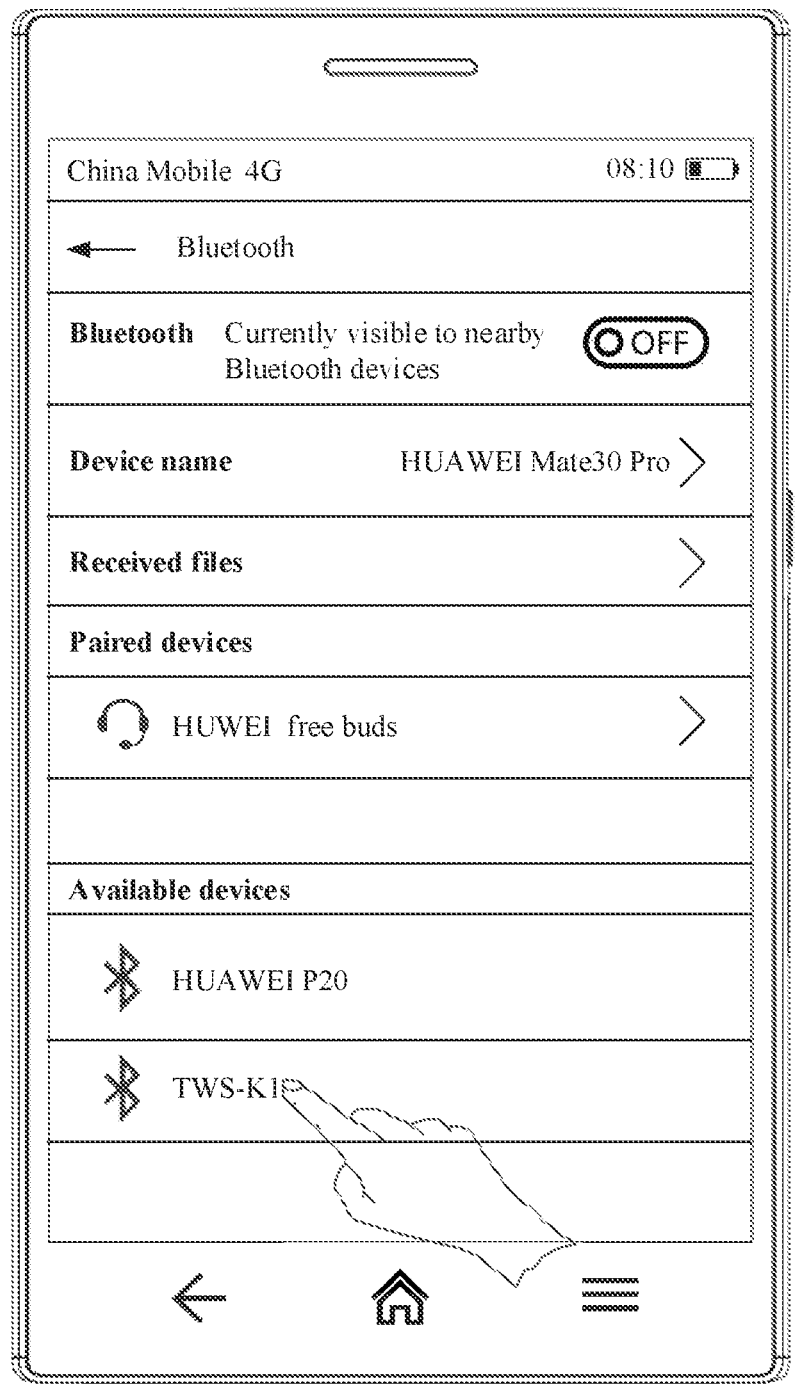
Figure 3D:
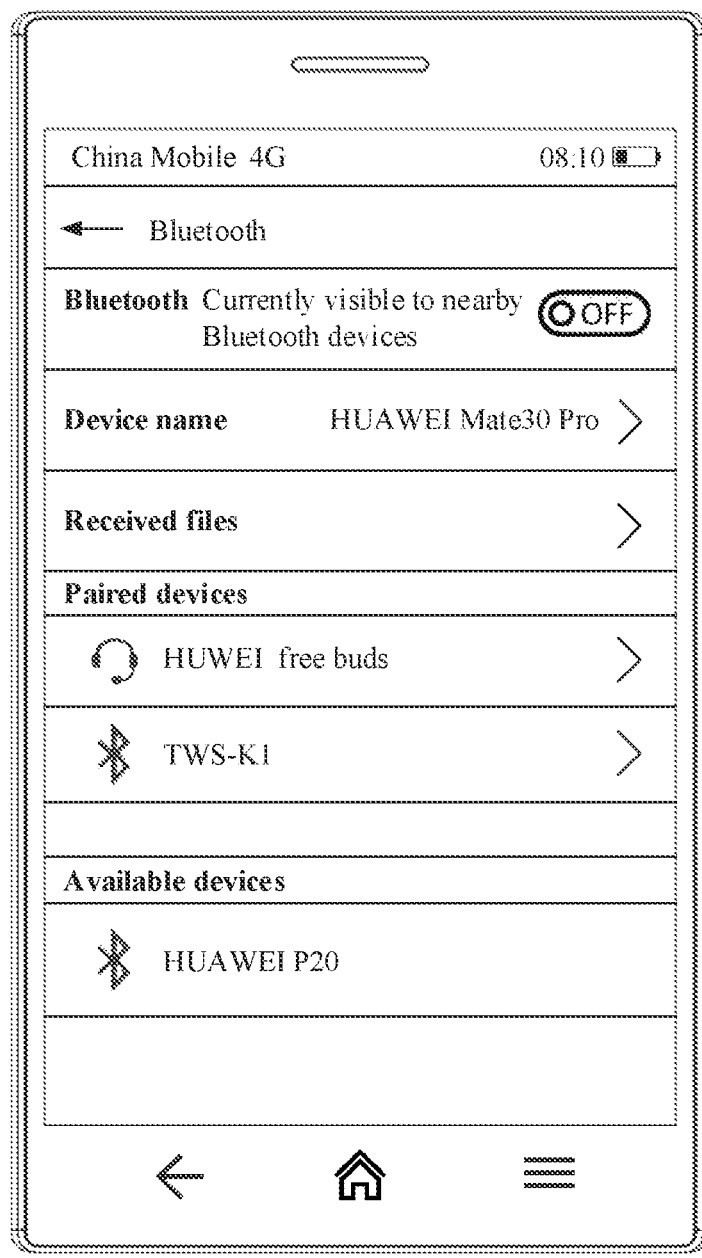

In some scenarios, when the terminal device detects that the user taps a Bluetooth device in the list of "Available devices", the terminal device performs pairing with the Bluetooth device. For example, as shown in FIG. 3C, when the terminal device detects that the user taps "TWS-K1" in the list of "Available devices", the terminal device performs pairing with TWS-K1, and if the pairing succeeds, "TWS-K1" is displayed in a list of "Paired devices". As shown in FIG. 3D, this phase is referred to as the pairing phase.

In some scenarios, if the terminal device has previously established a service connection to another Bluetooth device, the terminal device displays, in the list of "Paired devices", the Bluetooth device to which the terminal device has established the service connection. Referring to FIG. 3D, the list of "Paired devices" further displays a Bluetooth device HUAWEI free buds to which the terminal device has established a service connection.

Figure 3E:
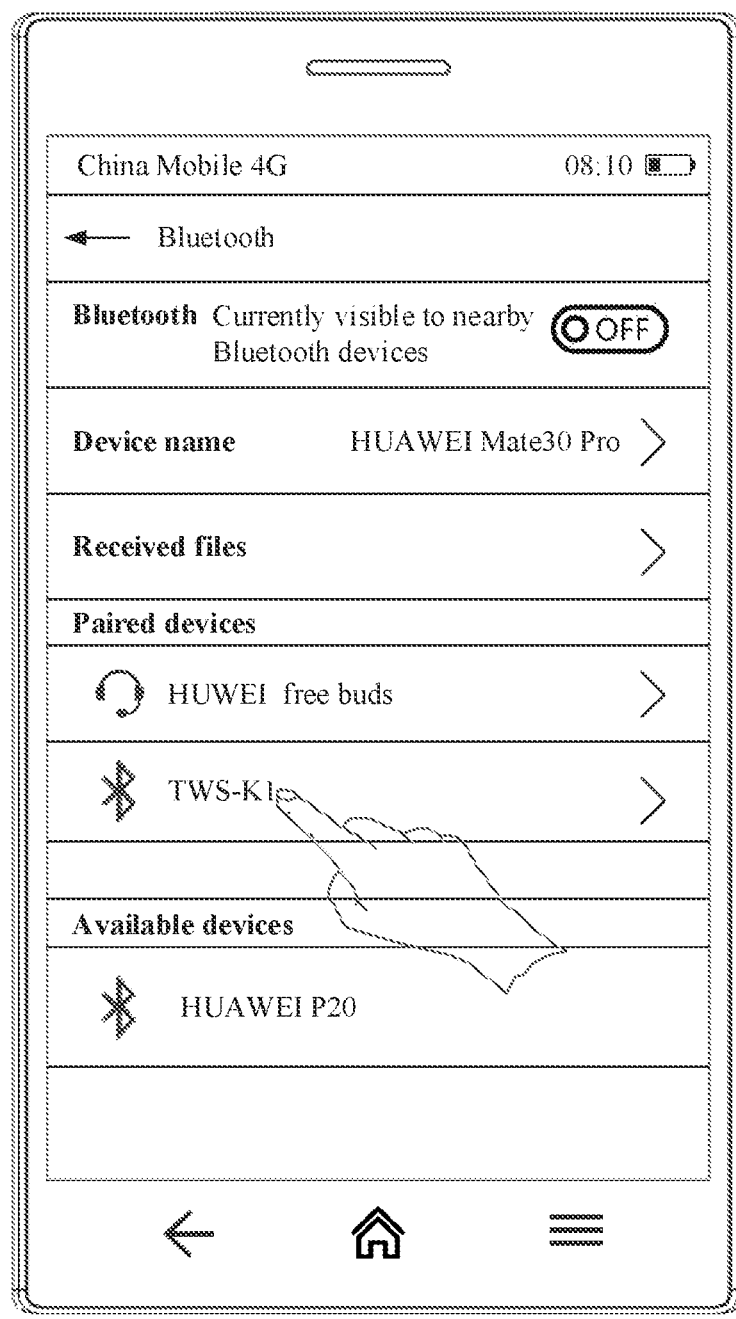

In some scenarios, when the terminal device detects that the user taps a Bluetooth device in the list of "Paired devices", the terminal device establishes a service connection to the Bluetooth device. As shown in FIG. 3E, when the terminal device detects that the user taps "TWS-K1" in the list of "Paired devices", the terminal device establishes a Bluetooth connection to TWS-K1. If the Bluetooth connection is successfully established, audio data may be transmitted between the terminal device and TWS-K1. This phase is referred to as the service connection establishment phase. An interaction process between the terminal device and the TWS Bluetooth headset described in subsequent embodiments is performed after the terminal establishes a service connection to the Bluetooth headset.

The foregoing uses an example of establishing a Bluetooth connection between the first earbud and the terminal device for description. Similarly, the second earbud may also establish a Bluetooth connection to the terminal device in the foregoing three phases: the scanning phase, the pairing phase, and the service connection establishment phase, and the second earbud is displayed as TWS-K2 in the Bluetooth configuration interface. It may be understood that, when the first earbud and the second earbud establish the Bluetooth connections to the terminal device for the first time, the foregoing three phases need to be went through. In a subsequent use process, the first earbud and the second earbud only need to go through the service connection establishment phase to establish the Bluetooth connections.

It should be noted that the schematic diagrams of the terminal interfaces shown in FIG. 3A to FIG. 3E are merely examples. Different terminal devices may correspond to different setting interfaces and operation manners.

After the terminal device establishes the connection to the TWS Bluetooth headset, audio data may be transmitted between the terminal device and the first earbud and between the terminal device and the second earbud. Bluetooth physical links between the terminal and the TWS Bluetooth headset are classified into two types: an asynchronous connection-less (asynchronous connection less, ACL) link and a synchronous connection oriented (synchronous connection oriented, SCO) link.

The ACL link is a basic Bluetooth connection, and is usually used to transmit connectivity negotiation signaling and maintain a Bluetooth connection. The ACL link further supports unidirectional transmission of audio data. For example, when the terminal device sends audio data to the primary earbud through the ACL link, the primary earbud cannot simultaneously send audio data to the terminal device.

The SCO link is a connection technology supported by a Bluetooth baseband, and is used to transmit data by using a reserved slot. The SCO link supports bidirectional transmission of audio data. For example, when the terminal device sends audio data to the primary earbud through the SCO link, the primary earbud can also send audio data to the terminal device through the SCO link.

The following describes the technical solutions of this application in detail with reference to specific embodiments. It should be noted that the following specific embodiments may be independent or may be combined with each other, and same or similar content is not described repeatedly in different embodiments.

Figure 4:
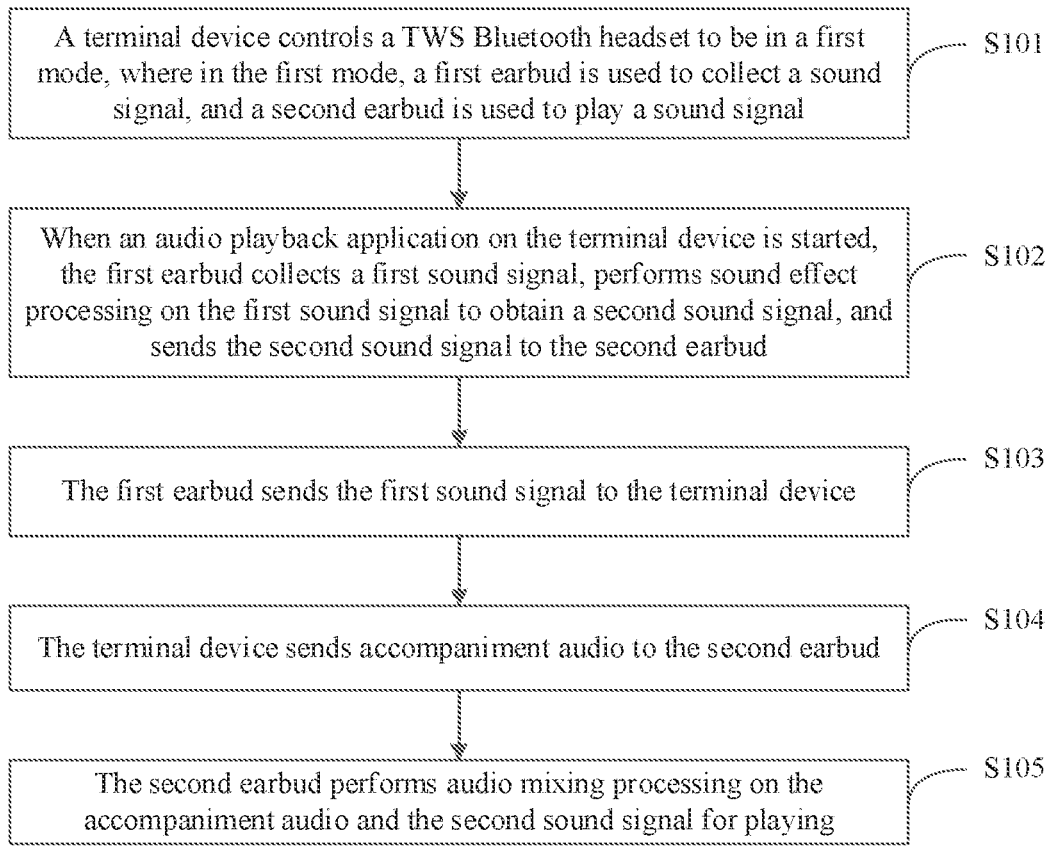
FIG. 4 is a schematic flowchart of a Bluetooth communication method according to Embodiment 1 of this application.
Figure 5:
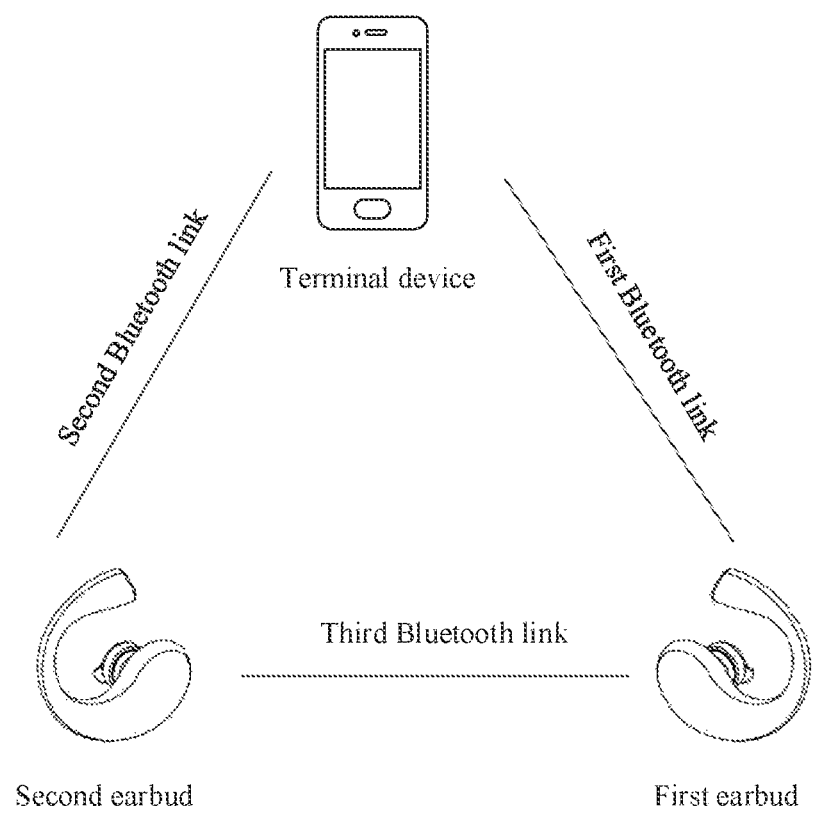
FIG. 5 is a schematic diagram of Bluetooth links between a terminal device and a TWS Bluetooth headset to which the Bluetooth communication method according to Embodiment 1 of this application is applicable.
Figure 6:
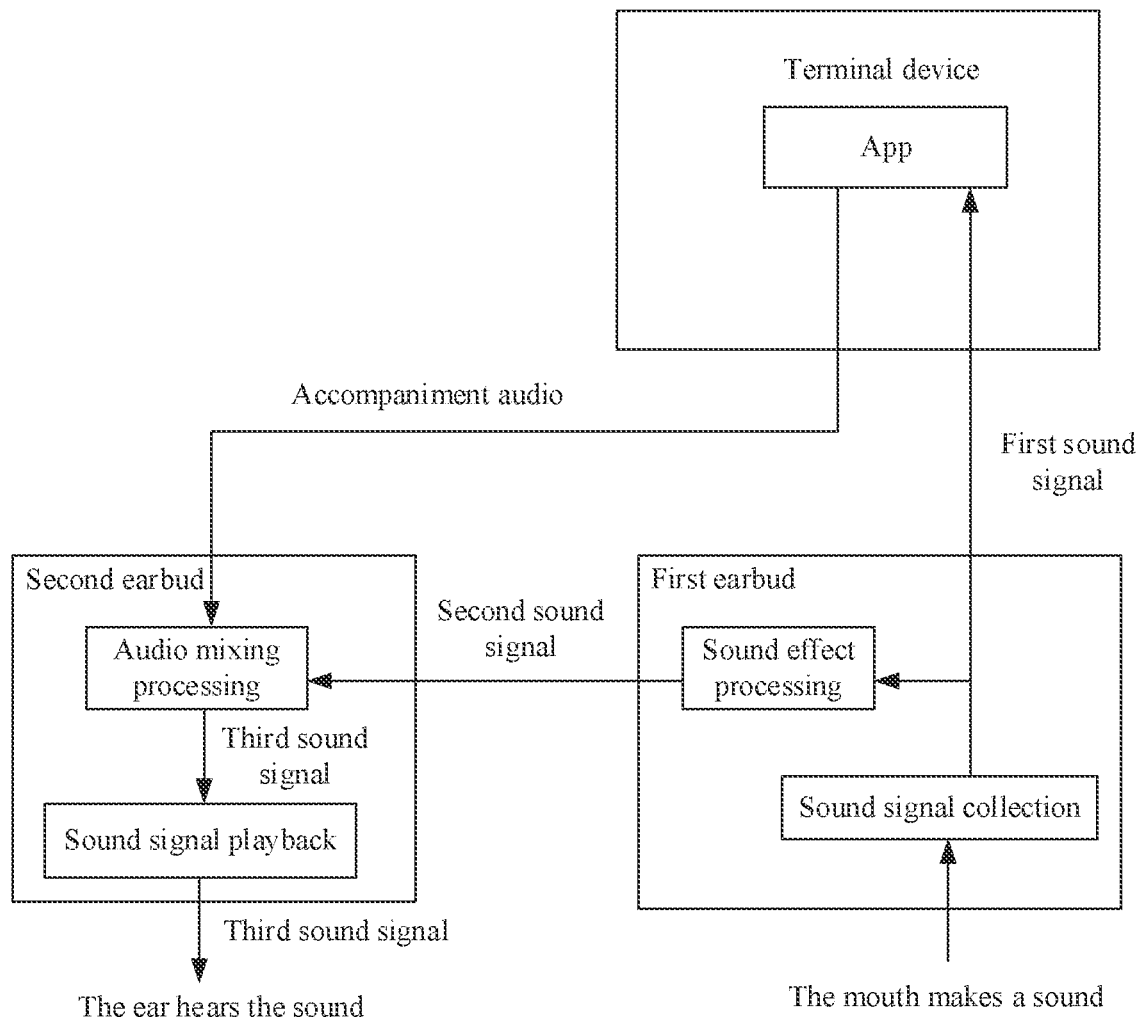
FIG. 6 is a schematic diagram of data transmission between a terminal device and a TWS Bluetooth headset to which the Bluetooth communication method according to Embodiment 1 of this application is applicable.

FIG. 4 is a schematic flowchart of a Bluetooth communication method according to Embodiment 1 of this application. FIG. 5 is a schematic diagram of Bluetooth links between a terminal device and a TWS Bluetooth headset to which the Bluetooth communication method according to Embodiment 1 of this application is applicable. FIG. 6 is a schematic diagram of data transmission between the terminal device and the TWS Bluetooth headset to which the Bluetooth communication method according to Embodiment 1 of this application is applicable. The data transmission process shown in FIG. 6 is performed on the Bluetooth links shown in FIG. 5. Referring to FIG. 4 to FIG. 6, the method includes the following steps.

S101: The terminal device controls the TWS Bluetooth headset to be in a first mode, where in the first mode, a first earbud is used to collect a sound signal, and a second earbud is used to play a sound signal.

Referring to FIG. 5, in this embodiment, a first Bluetooth link is established between the terminal device and the first earbud, a second Bluetooth link is established between the terminal device and the second earbud, and a third Bluetooth link is established between the first earbud and the second Bluetooth.

In some scenarios, the terminal device receives an instruction for enabling the first mode that is entered by a user, and enables the first mode in response to the enable instruction. After the first mode is enabled, the terminal device allocates audio roles to the first earbud and the second earbud. An audio role of the first earbud is a sound collection role (that is, a sound pickup role), and an audio role of the second earbud is a sound playback role (that is, an in-ear monitor role).

Figure 7A:
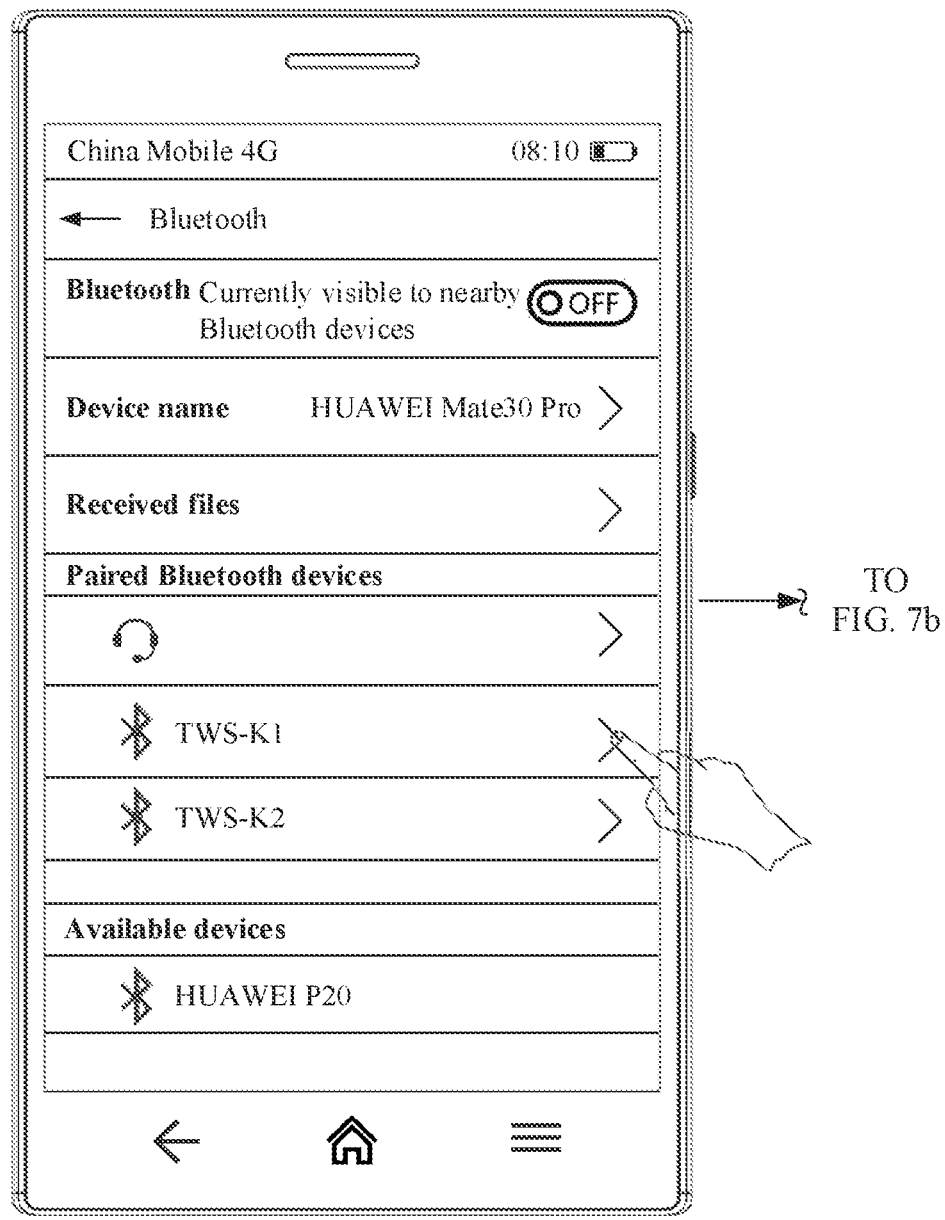
FIG. 7a to FIG. 7c are a schematic diagram of enabling a first mode by a user.
Figure 7B:
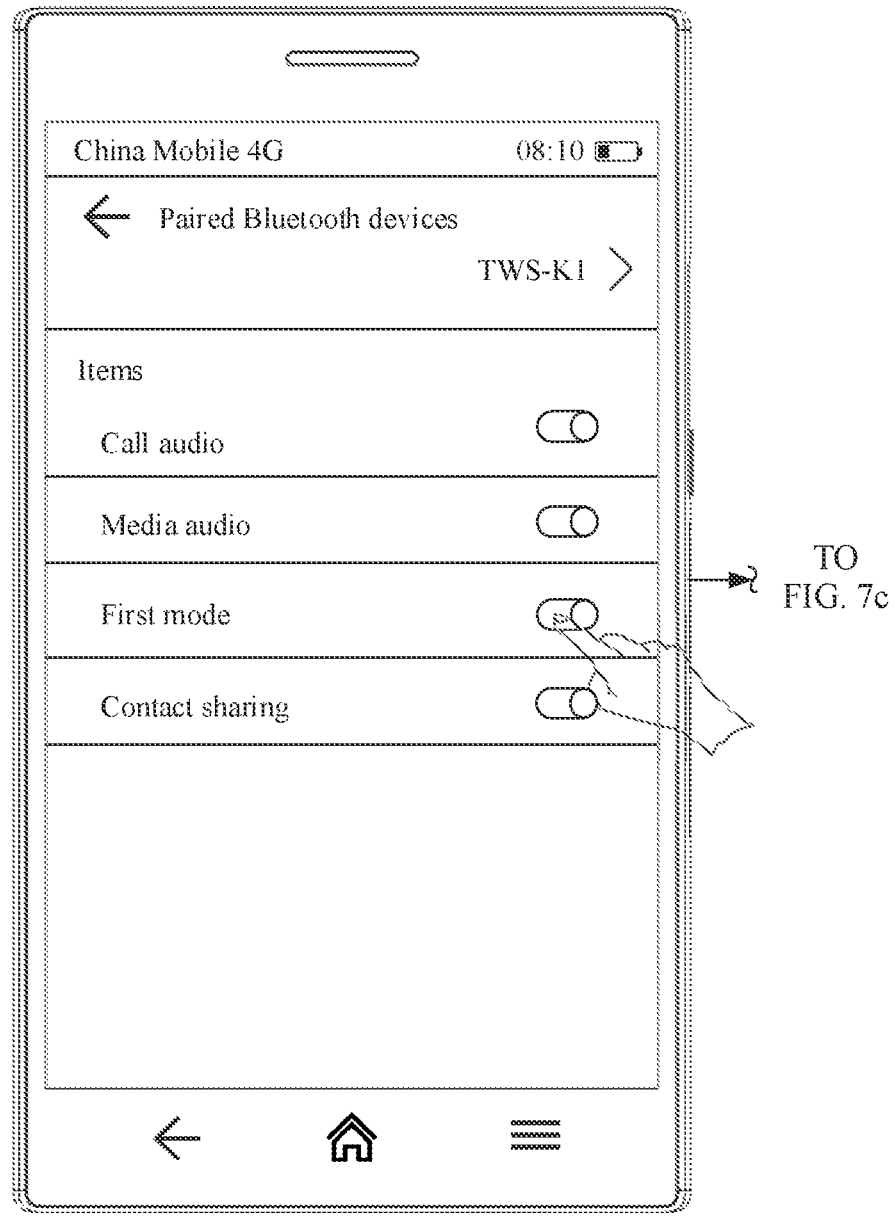
Figure 7C:
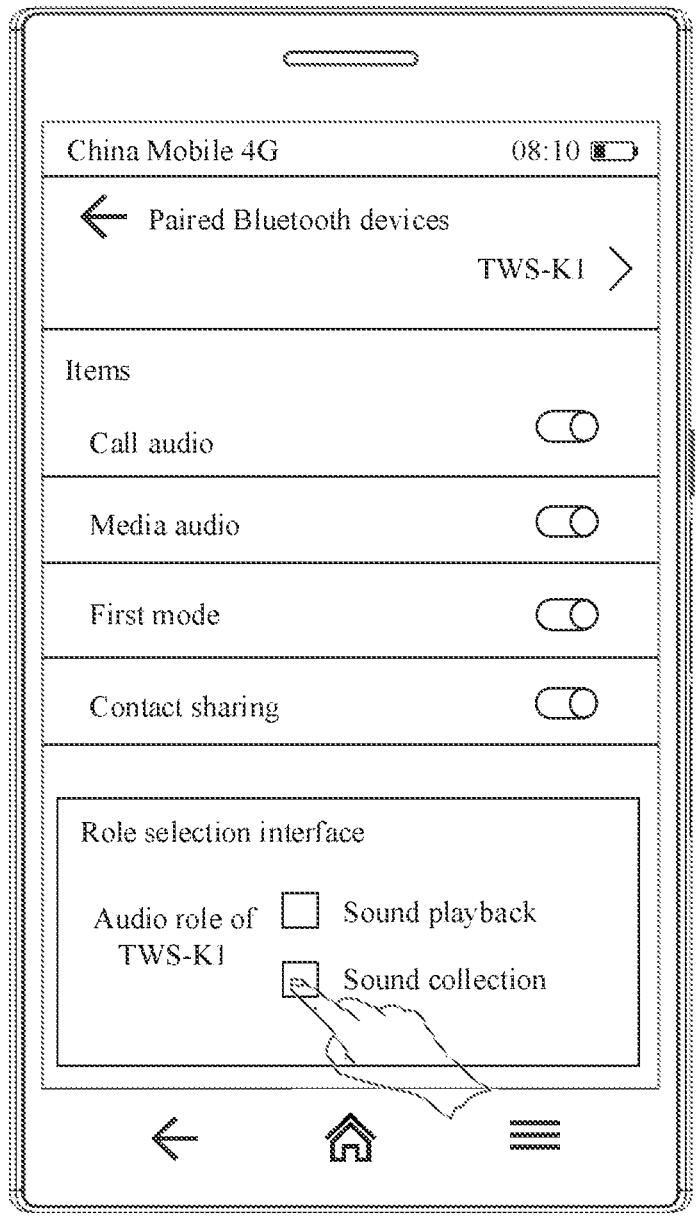

The enable instruction may be entered by the user by using a Bluetooth setting interface. FIG. 7a to FIG. 7c are a schematic diagram of enabling the first mode by the user. As shown in FIG. 7a to FIG. 7c, both the first earbud (TWS-K1) and the second earbud (TWS-K2) are displayed in the list of "Paired devices". After the user taps a setting key of TWS-K1 in FIG. 7a, a setting interface of TWS-K1 is displayed. The setting interface of TWS-K1 is shown in FIG. 7b. The setting interface of TWS-K1 includes a plurality of configuration items: a call item, Media audio, Contact sharing, and First mode. An on/off key is correspondingly provided on a right side of each configuration item, and the user may perform a sliding operation on an on/off key corresponding to a configuration item, to enable or disable the configuration item. Optionally, an icon corresponding to each configuration item is further displayed on the left of each configuration item. The icon is not shown in the figure.

Some configuration items in the plurality of configuration items are enabled by default after the TWS Bluetooth headset establishes a Bluetooth connection to the terminal device for the first time, and some other configuration items are disabled by default. For example, the call item and Media audio are enabled by default, and Contact sharing and First mode are disabled by default. Alternatively, the call item, Media audio, and First mode are enabled by default, and Contact sharing is disabled by default.

The user can manually enable a configuration item that is disabled by default. In this embodiment, First mode may be a configuration item enabled by default, or may be a configuration item disabled by default, which is not limited in this embodiment. When First mode is a configuration item that is disabled by default, the user may slide or tap the on/off key corresponding to First mode, to generate an enable instruction, so that the first mode is enabled.

In this embodiment, the first earbud may be held on a hand of the user to pick up sound, and the second earbud is worn on an ear of the user for listen back. Therefore, the first mode may be considered as a mode in which one earbud is used for sound pickup and one earbud is used for listen back.

After the TWS Bluetooth headset enables the first mode, the terminal device may allocate the audio roles to the first earbud and the second earbud in the following manners.

Manner 1: The terminal device displays a role selection interface. Audio role options for the first earbud or the second earbud are displayed in the role selection interface, and the audio role options include a sound collection option and a sound playback option. The terminal device receives a selection instruction entered by the user in the role selection interface, allocates an audio role to the first earbud or the second earbud according to the selection instruction, and allocates an audio role to the other earbud of the TWS Bluetooth headset according to the audio role allocated to the first earbud or the second earbud.

The user may enter an earbud setting interface by using a setting key for the first earbud or a setting key for the second earbud, and the role selection interface is further displayed according to a user operation. For example, the user opens a role selection interface by using the setting key for the first earbud. Correspondingly, audio role options for the first earbud are displayed in the role selection interface. The role selection interface is shown in FIG. 7c. The audio role options for the first earbud TWS-K1 include a sound collection option and a sound playback option. The user may select an audio role of the first earbud TWS-K1 based on a requirement of the user.

In this manner, after the user enables the first mode of the other earbud, a role selection interface is not displayed in the setting interface of the other earbud. For example, if the user first enables the first mode of TWS-K1 and selects an audio role for TWS-K1, the role selection interface is not displayed in the setting interface of TWS-K2.

It may be understood that regardless of whether the user first selects the audio role of the first earbud or the second earbud, the terminal device allocates a role to the other earbud according to the first selected role of the earbud.

Optionally, after the user selects the audio role for the first earbud or the second earbud in the manner shown in FIG. 7a to FIG. 7c, the user may select an audio role for the other earbud of the TWS Bluetooth headset in the same manner. In this manner, the role selection interface is displayed in each of the settings interfaces of the two earbuds.

Manner 2: The terminal device displays a role selection interface. Audio role options for the first earbud and the second earbud are displayed in the role selection interface, and the audio role options include a sound collection option and a sound playback option. The terminal device receives a selection instruction entered by the user in the role selection interface, and the terminal device allocates the audio roles to the first earbud and the second earbud according to the selection instruction.

Figure 8:
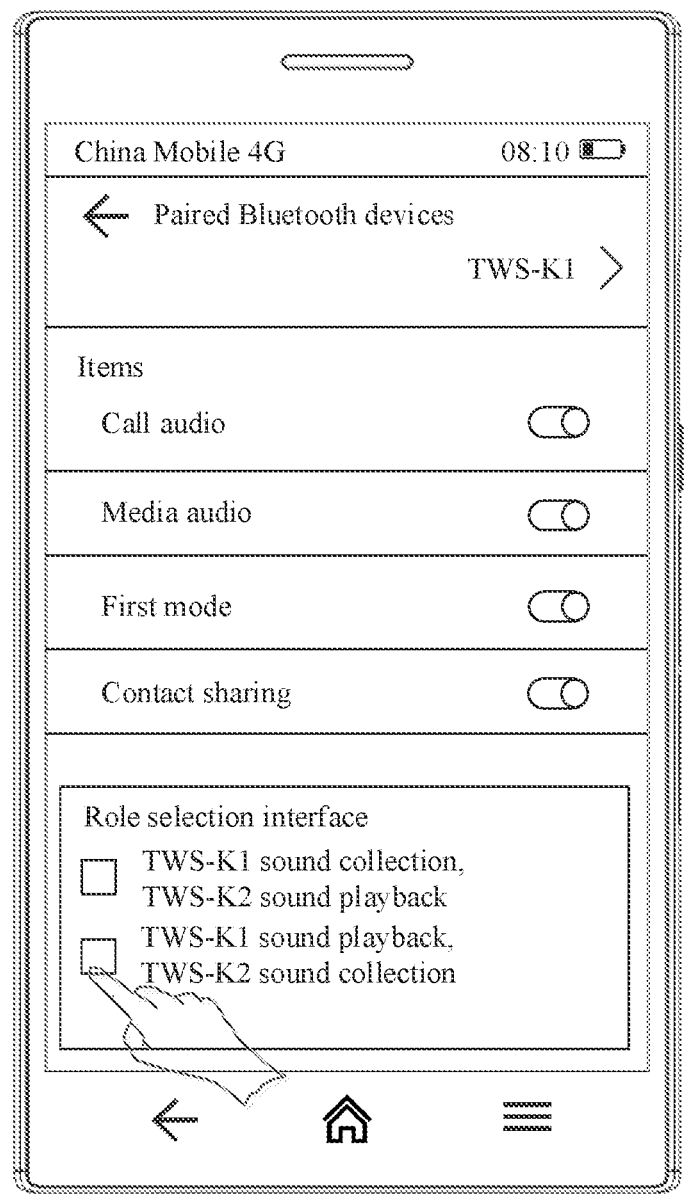
FIG. 8 is another schematic diagram of a role selection interface of a TWS Bluetooth headset.

FIG. 8 is another schematic diagram of a role selection interface of the TWS Bluetooth headset. Different from FIG. 7c in which the role selection interface displays the audio role options for the first earbud and does not display the audio role options for the second earbud, the role selection interface in FIG. 8 displays audio role options for both the earbuds: Option 1: TWS-K1 for audio collection and TWS-K2 for audio playback; and Option 2: TWS-K1 for sound playback and TWS-K2 for sound collection. The user selects one of the two options.

Similarly, in this manner, the user may enter an earbud setting interface by using a setting key for the first earbud or a setting key for the second earbud, and the role selection interface is further displayed according to a user operation.

Manner 3: The terminal device detects wearing status information of the TWS Bluetooth headset after enabling the first mode, where the wearing status information is used to indicate whether the TWS Bluetooth headset is in a worn state or an unworn state; and the terminal device allocates the audio roles to the second earbud and the second earbud based on the wearing status information of the TWS Bluetooth headset. An audio role of an earbud in the unworn state is the sound collection role, and an audio role of an earbud in the worn state is the sound playback role.

Being in the worn state means that the TWS Bluetooth headset is worn on an ear, and being in the unworn state means that the TWS Bluetooth headset is not worn on an ear, and the TWS Bluetooth headset may be held by the user on a mobile phone. In this embodiment, in the first mode, the user usually holds an earbud for collecting sound, and an earbud used for sound playback is worn on an ear. Therefore, the terminal device may allocate the audio roles to the first earbud and the second earbud based on the wearing status information of the TWS Bluetooth headset.

When the first earbud is in the unworn state and the second earbud is in the worn state, the terminal device determines that the audio role of the first earbud is the sound collection role, and the audio role of the second earbud is the sound playback role. When the second earbud is in the unworn state and the first earbud is in the worn state, the terminal device determines that the audio role of the second earbud is the sound collection role, and the audio role of the first earbud is the sound playback role.

Wearing statuses of the first earbud and the second earbud may be detected in a plurality of detection manners. For example, a sensor-based wearing detection technology may be used. To be specific, sensors are disposed in the first earbud and the second earbud, and the sensors are configured to collect wearing status signals. Whether the first earbud or the second earbud is in the worn state may be determined based on the wearing status signal collected by the optical proximity sensor. The foregoing sensor may be one or more of an optical proximity sensor, a pressure sensor, a thermal sensor, or a moisture sensor.

Manner 4: The terminal device allocates the audio roles to the first earbud and the second earbud based on stored historical data of audio roles of the TWS Bluetooth headset.

For example, the historical data of audio roles of the TWS Bluetooth headset may be information about audio roles of the TWS Bluetooth headset when the TWS Bluetooth headset is in the first mode last time. The terminal device may set the audio roles of the TWS Bluetooth headset when the TWS Bluetooth headset is in the first mode last time to audio roles of the TWS Bluetooth headset when the TWS Bluetooth headset is in the first mode this time.

For example, when the TWS Bluetooth headset is in the first mode last time, an audio role of the first earbud is a sound collection role, and an audio role of the second earbud is a sound collection role. In this case, it is determined that when the TWS Bluetooth headset is in the first mode this time, the audio role of the first earbud is the sound collection role, and the audio role of the second headset is the sound collection role.

The historical data of audio roles of the TWS Bluetooth headset may be audio roles selected by the user in Manner 1 and Manner 2. Therefore. Manner 4 may be used in combination with any one of Manner 1 to Manner 3. In other words, when the user uses the TWS Bluetooth headset in the first mode for the first time, any one of Manner 1 to Manner 3 is used to allocate audio roles to the TWS Bluetooth headset. The user does not need to select audio roles subsequently, and the terminal device allocates the audio roles to the TWS Bluetooth headset based on historical data of the audio roles of the TWS Bluetooth headset.

Certainly, the historical data of audio roles of the TWS Bluetooth headset is not limited to information about the audio roles of the TWS Bluetooth headset when the TWS Bluetooth headset is in the first mode last time, and the terminal device may record a use habit of the user for a long time, and allocate the audio roles to the first earbud and the second earbud based on audio roles of the TWS Bluetooth headset used by the user for a long time.

For example, the terminal device records audio roles of the TWS Bluetooth headset used by the user in the first mode within a month, and collects, based on recorded data, statistics on a first quantity of times that the first earbud acts as the sound collection role and the second earbud acts as the sound playback role within the month and a second quantity of times that the second earbud acts as the sound collection role and the first earbud acts as the sound playback role within the month. The terminal device compares the first quantity of times with the second quantity of times, and selects audio roles corresponding to a larger quantity of times between the first quantity of times and the second quantity of times as the audio roles of the first earbud and the second earbud when the TWS Bluetooth headset is in the first mode this time.

Manner 5: The terminal device allocates the audio roles to the first earbud and the second earbud based on audio roles, configured by a system, of the TWS Bluetooth headset in the first mode.

In this manner, the audio roles of the first earbud and the second earbud are preconfigured by the system and stored in the terminal device. After the first mode is enabled, the terminal device uses, by default, the audio roles configured by the system.

Optionally, Manner 5 may be used in combination with any one of Manner 1 to Manner 3. After the terminal device enables the first mode, the audio roles configured by the system are used by default. Subsequently, the user may switch the audio roles of the TWS Bluetooth headset in any one of Manner 1 to Manner 3.

A combination of Manner 3 and Manner 5 is used as an example. After the terminal device enables the first mode, the audio roles configured by the system are used by default. For example, the first earbud is used to collect sound, and the second earbud is used to play sound. When the user wears the first earbud on an ear and holds the second earbud on a hand, the terminal device switches the audio roles of the first earbud and the second earbud based on wearing status information of the first earbud and the second earbud to the following: The second earbud is used to collect a sound signal, and the first earbud is used to play a sound signal.

A combination of Manner 1 and Manner 5 is used as an example. After the terminal device enables the first mode, the audio roles configured by the system are used by default. For example, the first earbud is used to collect a sound signal, and the second earbud is used to play a sound signal. When it is detected that the user sets the audio role of the second earbud to the sound collection role and sets the audio role of the first earbud to the sound playback role in Manner 1, the terminal device switches the audio roles of the first earbud and the second earbud to the following: The second earbud is used to collect a sound signal, and the first earbud is used to play a sound signal.

Figure 9:
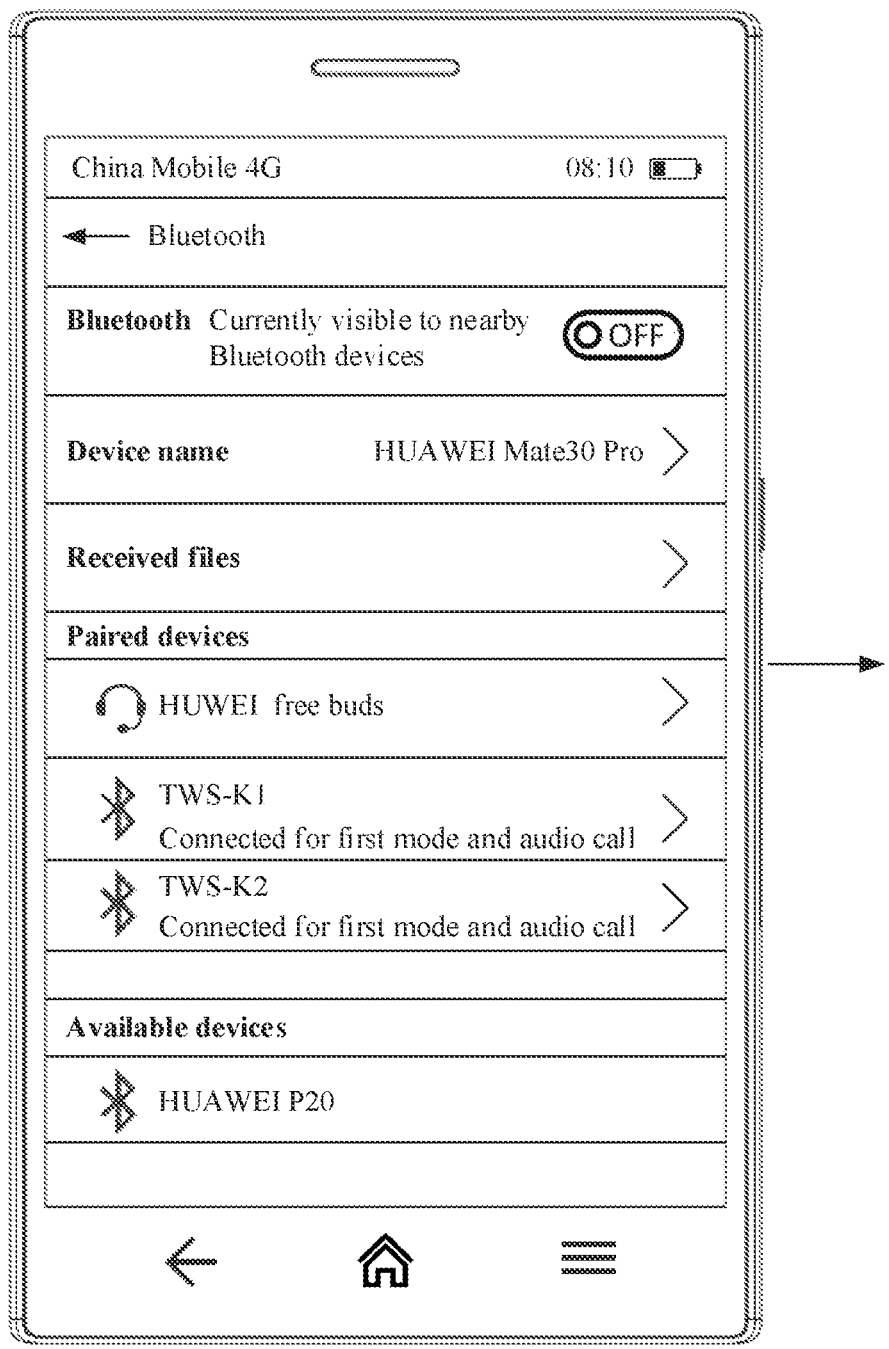
FIG. 9 is a schematic diagram of a Bluetooth setting interface after a first earbud and a second earbud establish Bluetooth connections to a terminal device.

FIG. 9 is a schematic diagram of a Bluetooth setting interface after the first earbud and the second earbud establish the Bluetooth connections to the terminal device. As shown in FIG. 9, in a list of paired devices in the Bluetooth setting interface, "Connected for first mode and audio calls" is displayed at the TWS-K1 position, and "Connected for first mode and audio calls" is displayed at the TWS-K2 position.

Figure 10:
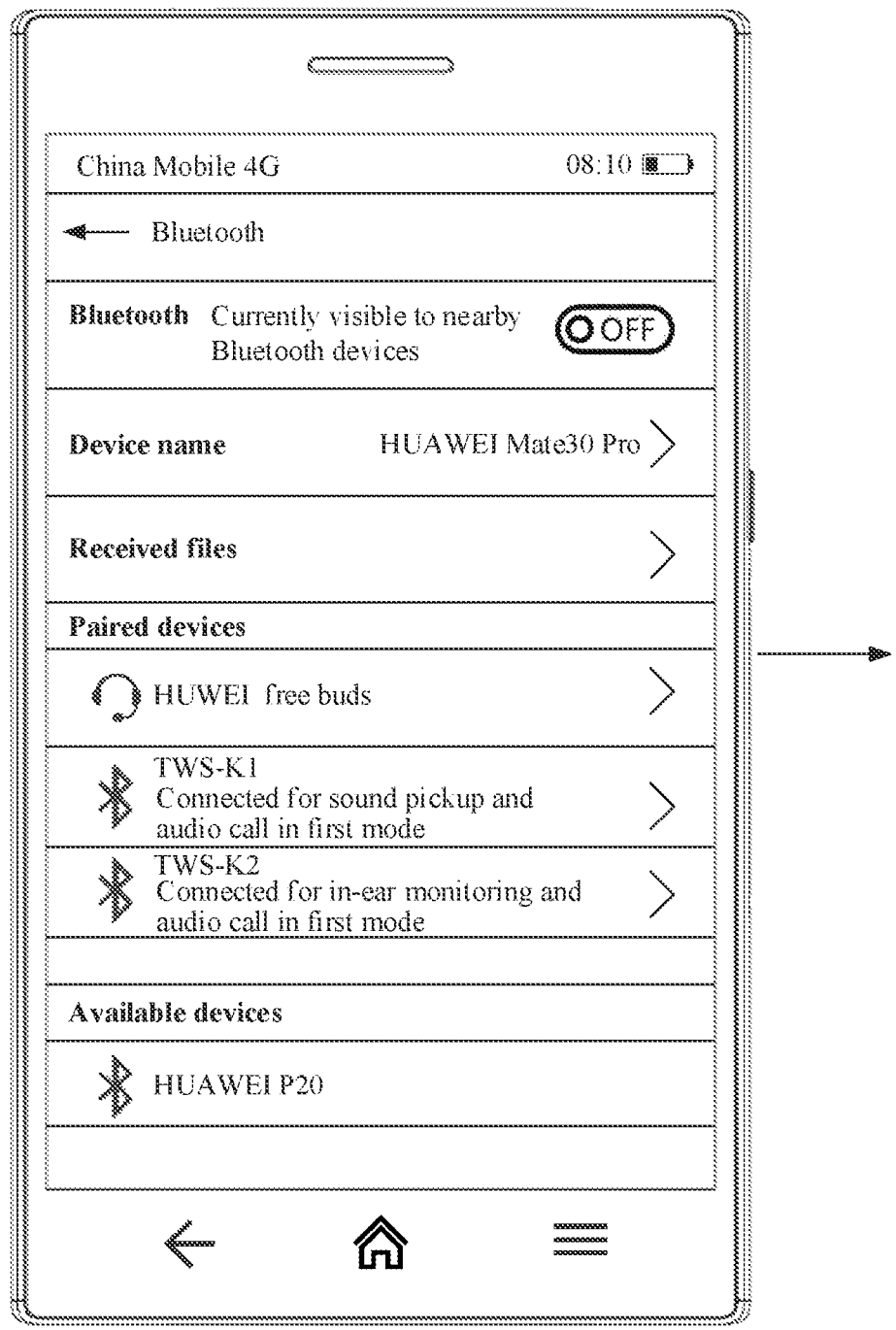
FIG. 10 is another schematic diagram of a Bluetooth setting interface after a first earbud and a second earbud establish Bluetooth connections to a terminal device.

FIG. 10 is another schematic diagram of a Bluetooth setting interface after the first earbud and the second earbud establish the Bluetooth connections to the terminal device. As shown in FIG. 10, in a list of paired devices in the Bluetooth setting interface, "Connected for sound pickup and audio calls in first mode" is displayed at the TWS-K1 position, and "Connected for in-ear monitoring and audio calls in first mode" is displayed at the TWS-K2 position. In this manner, the audio roles of the second earbud and the second earbud in the first mode: a sound pickup role and an in-ear monitoring role are further displayed in the Bluetooth setting interface, so that the user can learn of the audio roles of the two earbuds. The sound pickup role is also referred to as a sound collection role in this embodiment of this application, and the in-ear monitoring role is also referred to as a sound playback role in this embodiment of this application.

It may be understood that, when the user uses the first mode for the first time, the user may need to enter an enable instruction to enable the first mode. Subsequently, after the TWS Bluetooth headset is powered on, the TWS Bluetooth headset automatically establishes a Bluetooth connection to the terminal device, and after the TWS Bluetooth headset establishes the Bluetooth connection to the terminal device, the first mode is enabled by default. Using the configuration items shown in FIG. 7*a* to FIG. 7*c* as an example, if the user enables the call item, Media audio, and First mode in the configuration items of the first earbud, after the TWS Bluetooth headset establishes the Bluetooth connection to the terminal device, the three functions, namely the call item, Media audio, and First mode, are all enabled accordingly.

In a case in which the user does not need to use the enable instruction to enable the first mode, after detecting that the TWS Bluetooth headset establishes the connection to the terminal device, the terminal device may allocate the audio roles to the first earbud and the second earbud in any one of Manner 1 to Manner 5.

S102: When an audio playback application on the terminal device is started, the first earbud collects a first sound signal, performs sound effect processing on the first sound signal to obtain a second sound signal, and sends the second sound signal to the second earbud.

The audio playback application may be a third-party app installed on the terminal device, for example, a karaoke app, a live broadcast app, or an app that has a video and/or audio recording function, for example, a photographing app installed on the mobile phone before delivery.

Using a karaoke or live broadcast scenario as an example, after the user starts a karaoke app to start singing, or after the user starts a live broadcast app to start live broadcast, the first earbud starts to collect a first sound signal, and the first earbud performs sound effect processing on the collected sound signal. The sound effect processing may include human voice beautification processing such as reverberation, equalization (Equaliser, EQ), and human voice enhancement. The first earbud converts the first sound signal into the second sound signal through sound effect processing, and sends the second sound signal to the second earbud through the third Bluetooth link.

S103: The first earbud sends the first sound signal to the terminal device.

The terminal device stores the first sound signal, so as to complete a recording function in a karaoke scenario and a live broadcast scenario. Step S103 is an optional step. If recording is not required, the first earbud does not need to send the first sound signal to the terminal device.

S104: The terminal device sends accompaniment audio to the second earbud.

In the karaoke scenario and the live broadcast scenario, after the karaoke or live broadcast starts, the terminal device continuously sends accompaniment audio to the second earbud through the second Bluetooth link.

S105: The second earbud performs audio mixing processing on the accompaniment audio and the second sound signal for playing.

The second earbud performs audio mixing processing on the accompaniment audio and the second sound signal to obtain a third sound signal, and plays the third sound signal, so as to implement an in-ear monitoring function.

It may be understood that, in the karaoke scenario, the terminal device delivers accompaniment audio to the second earbud. In the live broadcast scenario, the terminal device may deliver accompaniment audio, or may not deliver accompaniment audio. Whether the terminal device delivers accompaniment audio depends on selection by the user or a live broadcast mode selected by the user. Similarly, in a video recording scenario and/or an audio recording scenario, the terminal device may deliver accompaniment audio, or may not deliver accompaniment audio, and the user may choose whether accompaniment audio is required.

In this embodiment of this application, the user may further perform a voice call in the first mode. In a call process, the first earbud may be used to collect a first sound signal, and send the first sound signal to the terminal device. The terminal device transmits the first sound signal to a peer device on the call, a voice signal sent by the peer device on the call is sent by the terminal device to the second earbud, and the second earbud plays the voice signal sent by the peer device, so as to complete the voice call. Optionally, the terminal device may further store the first sound signal and the voice signal that is sent by the peer device on the call, to complete a call recording function.

Optionally, the first earbud may perform sound effect processing on the first sound signal and then send a sound signal obtained after the sound effect processing to the terminal device. A signal sent by the terminal device to the peer device on the call is the sound signal obtained after the sound effect processing. Certainly, the terminal device may alternatively perform sound effect processing on the first sound signal.

If the terminal device does not deliver accompaniment audio, the second earbud does not need to perform audio mixing processing, and the second earbud directly plays the second sound signal after receiving the second sound signal sent by the first earbud.

In the method in this embodiment, the terminal device controls the TWS Bluetooth headset to be in the first mode, and in the first mode, the first earbud is used to collect a sound signal, and the second earbud is used to play a sound signal. When the audio playback app on the terminal device is started, the first earbud collects the first sound signal, performs sound effect processing on the first sound signal to obtain the second sound signal, and sends the second sound signal to the second earbud. The terminal device sends the accompaniment audio to the second earbud, and the second earbud performs audio mixing processing on the accompaniment audio and the second sound signal for playing. The user may hold the first earbud on a hand to pick up sound, and wear the second earbud on an ear of the user to listen back. In one aspect, the first earbud held by the user on the hand can be closer to the mouth of the user, so that a high requirement of the user for sound detail pickup can be met. In another aspect, the hand-held earbud is specially used for sound pickup, and the earbud worn on the ear is specially used for listen back, which conforms to a behavior habit of holding a microphone by the user in a normal karaoke situation, and can implement a real-time in-ear monitoring function.

Figure 11:
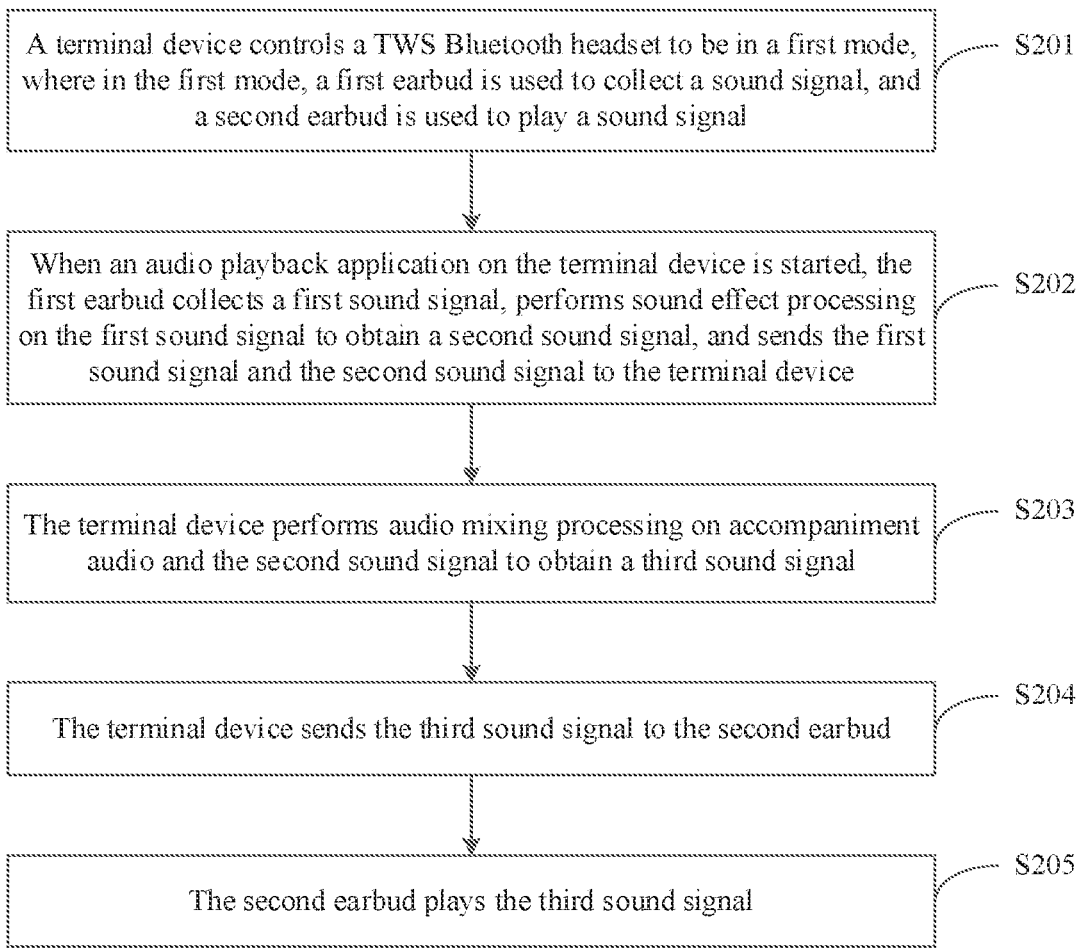
FIG. 11 is a schematic flowchart of a Bluetooth communication method according to Embodiment 2 of this application.
Figure 12:
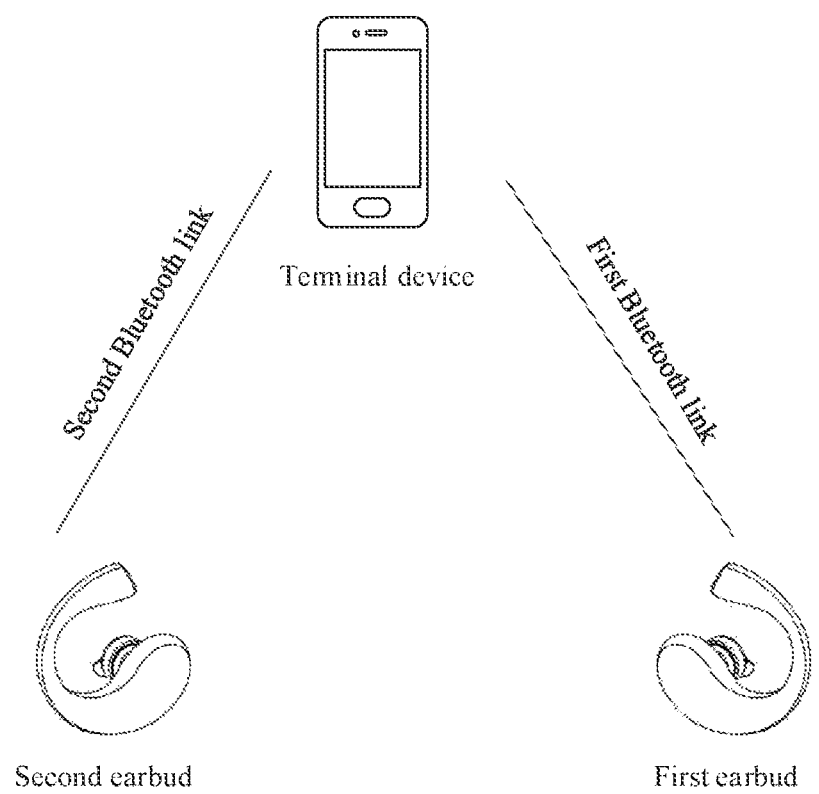
FIG. 12 is a schematic diagram of Bluetooth links between a terminal device and a TWS Bluetooth headset to which the Bluetooth communication method according to Embodiment 2 of this application is applicable.
Figure 13:
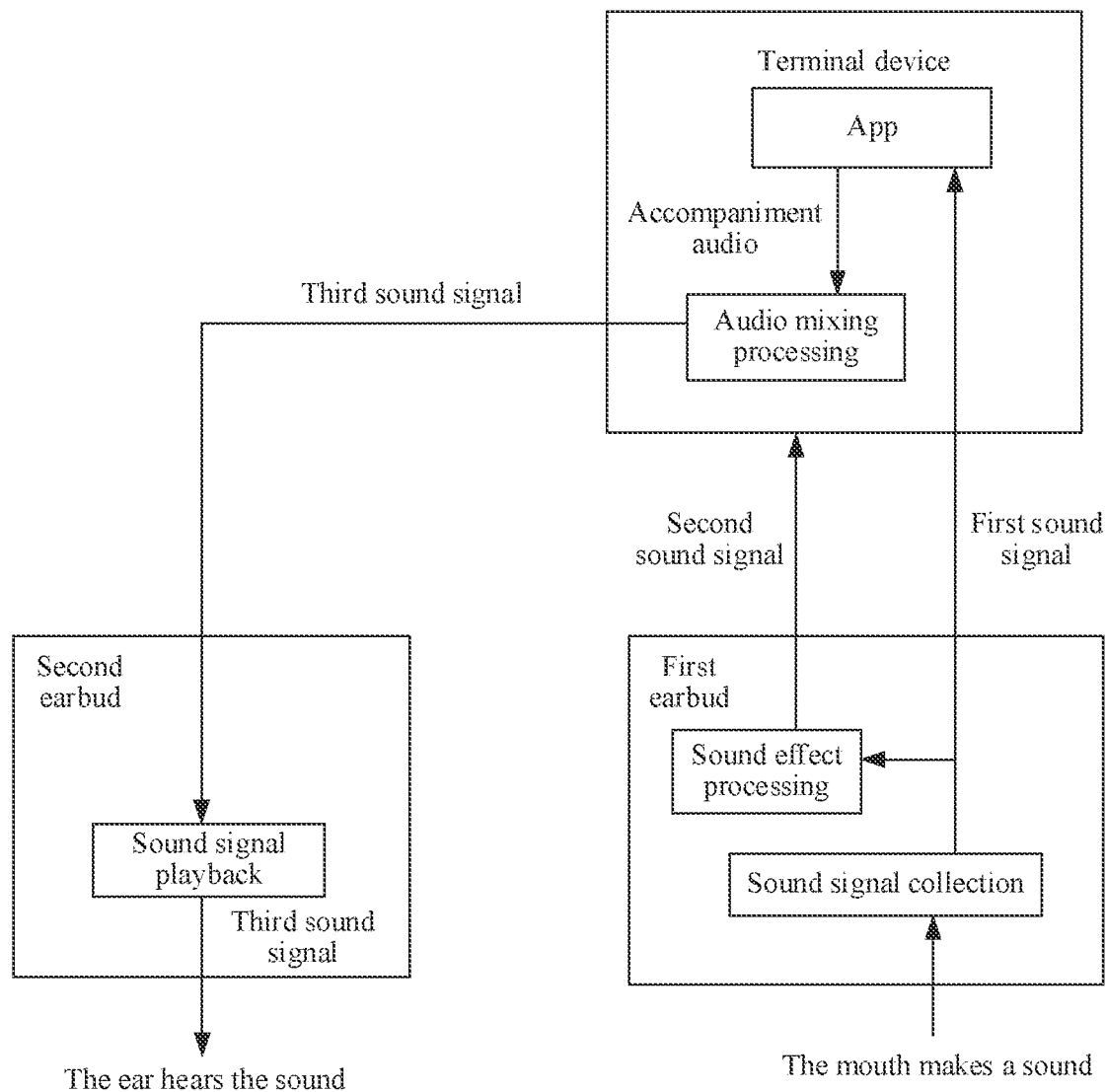
FIG. 13 is a schematic diagram of data transmission between a terminal device and a TWS Bluetooth headset to which the Bluetooth communication method according to Embodiment 2 of this application is applicable.

FIG. 11 is a schematic flowchart of a Bluetooth communication method according to Embodiment 2 of this application. FIG. 12 is a schematic diagram of Bluetooth links between a terminal device and a TWS Bluetooth headset to which the Bluetooth communication method according to Embodiment 2 of this application is applicable. FIG. 13 is a schematic diagram of data transmission between the terminal device and the TWS Bluetooth headset to which the Bluetooth communication method according to Embodiment 2 of this application is applicable. The data transmission process shown in FIG. 13 is performed on the Bluetooth links shown in FIG. 12. Referring to FIG. 11 to FIG. 13, the method includes the following steps.

S201: The terminal device controls the TWS Bluetooth headset to be in a first mode, where in the first mode, a first earbud is used to collect a sound signal, and a second earbud is used to play a sound signal.

Referring to FIG. 12, in this embodiment, a first Bluetooth link is established between the terminal device and the first earbud, a second Bluetooth link is established between the terminal device and the second earbud, and no Bluetooth link needs to be established between the first earbud and the second Bluetooth.

For a specific implementation in which the terminal device controls the TWS Bluetooth headset to be in the first mode, refer to related descriptions of step S101 in Embodiment 1. Details are not described herein again.

S202: When an audio playback application on the terminal device is started, the first earbud collects a first sound signal, performs sound effect processing on the first sound signal to obtain a second sound signal, and sends the first sound signal and the second sound signal to the terminal device.

The first earbud sends the first sound signal and the second sound signal to the terminal device through the first Bluetooth link. The first sound signal is an optional signal, and if recording is not required, the first earbud does not need to send the first sound signal to the terminal device.

S203: The terminal device performs audio mixing processing on accompaniment audio and the second sound signal to obtain a third sound signal.

S204: The terminal device sends the third sound signal to the second earbud.

The terminal device sends the second sound signal to the second earbud through the second Bluetooth link.

S205: The second earbud plays the third sound signal.

A difference between this embodiment and Embodiment 1 lies in: In this embodiment, audio mixing processing on the accompaniment audio and the second sound signal is performed on the terminal device side, and in Embodiment 1, audio mixing processing is performed by the second earbud. Other implementations and technical effects in this embodiment are the same as those in Embodiment 1, and details are not described herein again.

Figure 14:
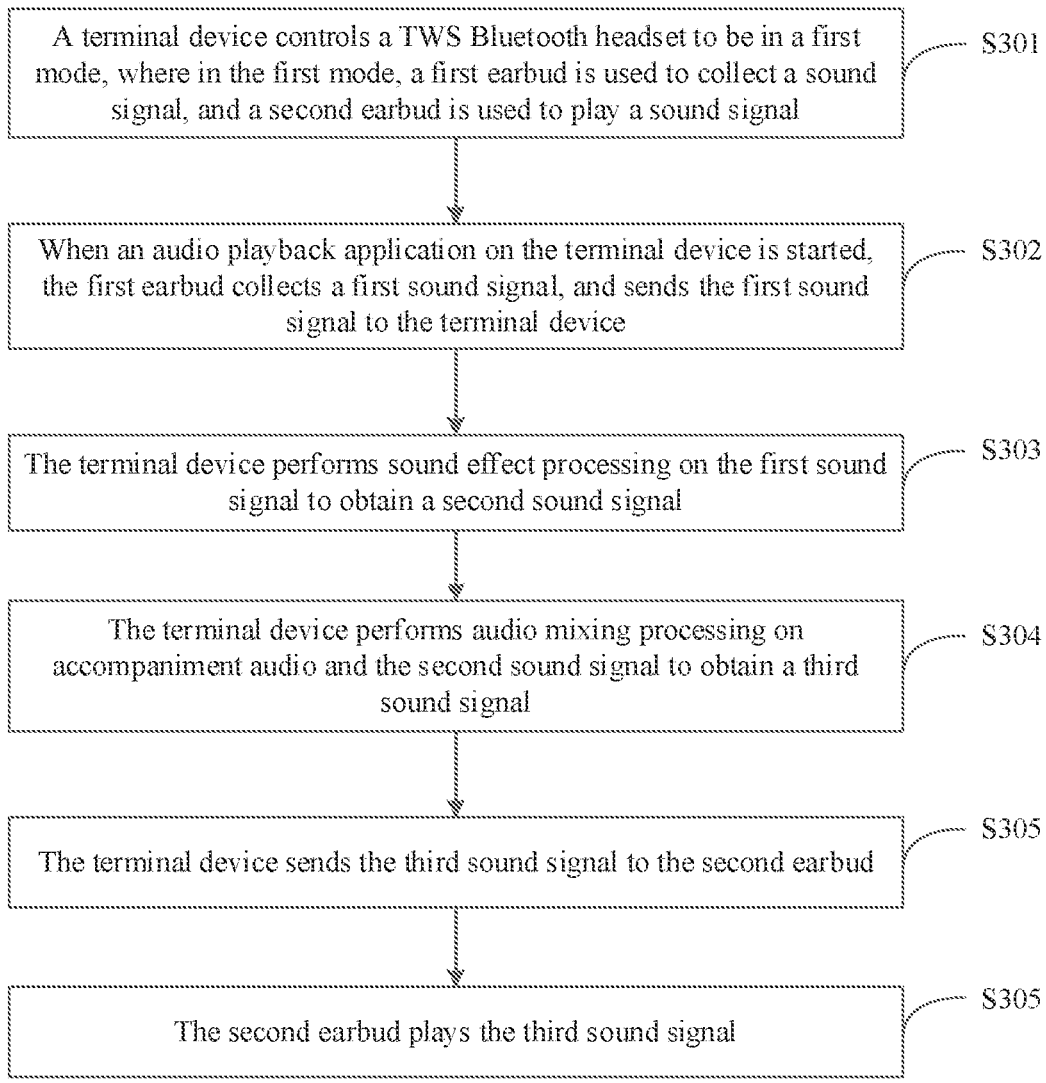
FIG. 14 is a schematic flowchart of a Bluetooth communication method according to Embodiment 3 of this application.
Figure 15:
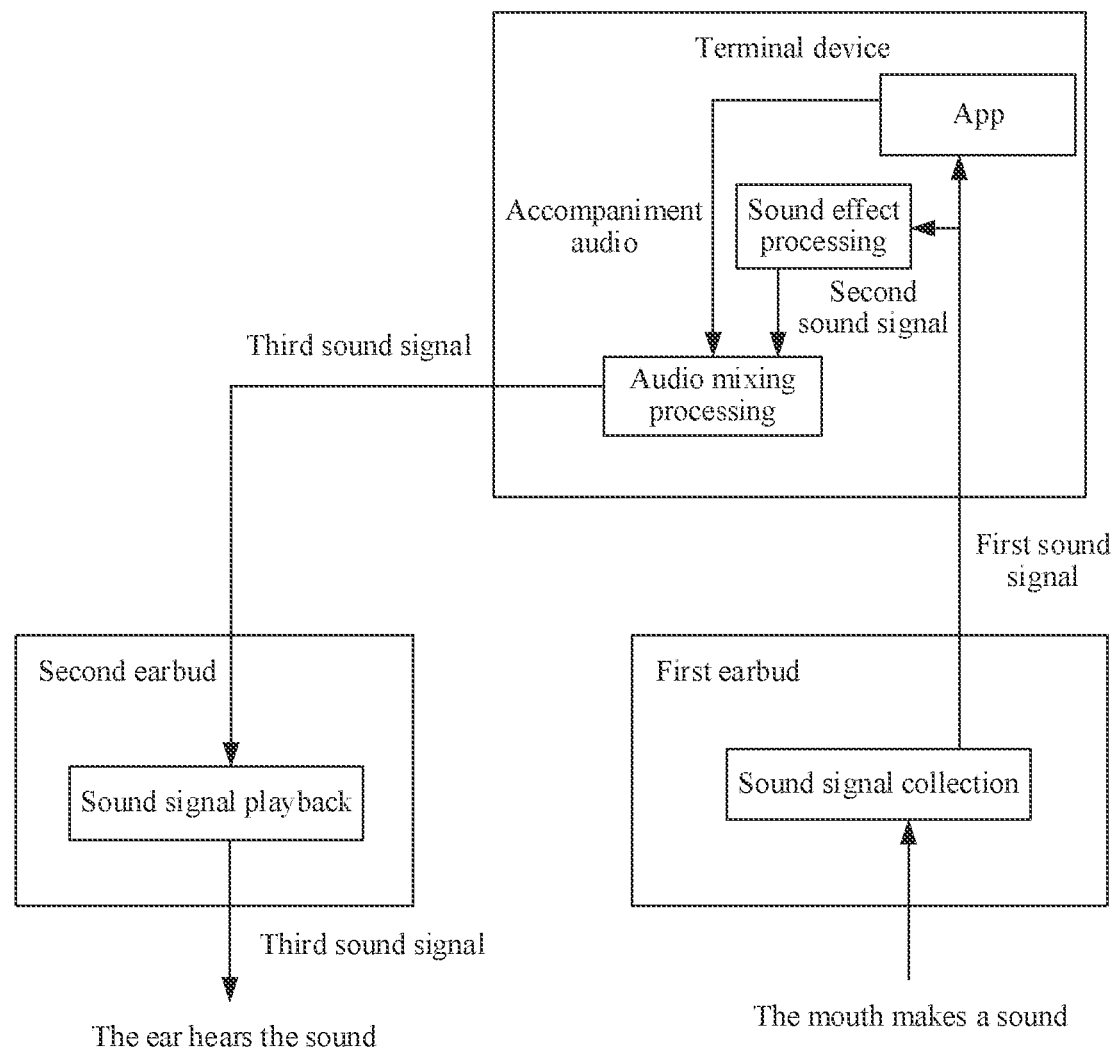
FIG. 15 is a schematic diagram of data transmission between a terminal device and a TWS Bluetooth headset to which the Bluetooth communication method according to Embodiment 3 of this application is applicable.

FIG. 14 is a schematic flowchart of a Bluetooth communication method according to Embodiment 3 of this application. FIG. 15 is a schematic diagram of data transmission between a terminal device and a TWS Bluetooth headset to which the Bluetooth communication method according to Embodiment 3 of this application is applicable. For Bluetooth links used in the data transmission process shown in FIG. 15, refer to the Bluetooth links shown in FIG. 12. Referring to FIG. 12, FIG. 14, and FIG. 15, the method includes the following steps.

S301: The terminal device controls the TWS Bluetooth headset to be in a first mode, where in the first mode, a first earbud is used to collect a sound signal, and a second earbud is used to play a sound signal.

Referring to FIG. 12, in this embodiment, a first Bluetooth link is established between the terminal device and the first earbud, a second Bluetooth link is established between the terminal device and the second earbud, and no Bluetooth link needs to be established between the first earbud and the second Bluetooth.

For a specific implementation in which the terminal device controls the TWS Bluetooth headset to be in the first mode, refer to related descriptions of step S101 in Embodiment 1. Details are not described herein again.

S302: When an audio playback application on the terminal device is started, the first earbud collects a first sound signal, and sends the first sound signal to the terminal device.

S303: The terminal device performs sound effect processing on the first sound signal to obtain a second sound signal.

Optionally, after receiving the first sound signal, the terminal device may further store the first sound signal, so as to complete a recording function.

S304: The terminal device performs audio mixing processing on accompaniment audio and the second sound signal to obtain a third sound signal.

S305: The terminal device sends the third sound signal to the second earbud.

S306: The second earbud plays the third sound signal.

A difference between this embodiment and Embodiment 1 lies in: In this embodiment, audio mixing processing on the accompaniment audio and the second sound signal is performed on the terminal device side, and sound effect processing on the first sound signal is also performed on the terminal device side. In Embodiment 1, audio mixing processing is performed by the second earbud, and sound effect processing on the first sound signal is performed by the first earbud. Other implementations and technical effects in this embodiment are the same as those in Embodiment 1, and details are not described herein again.

Figure 16:
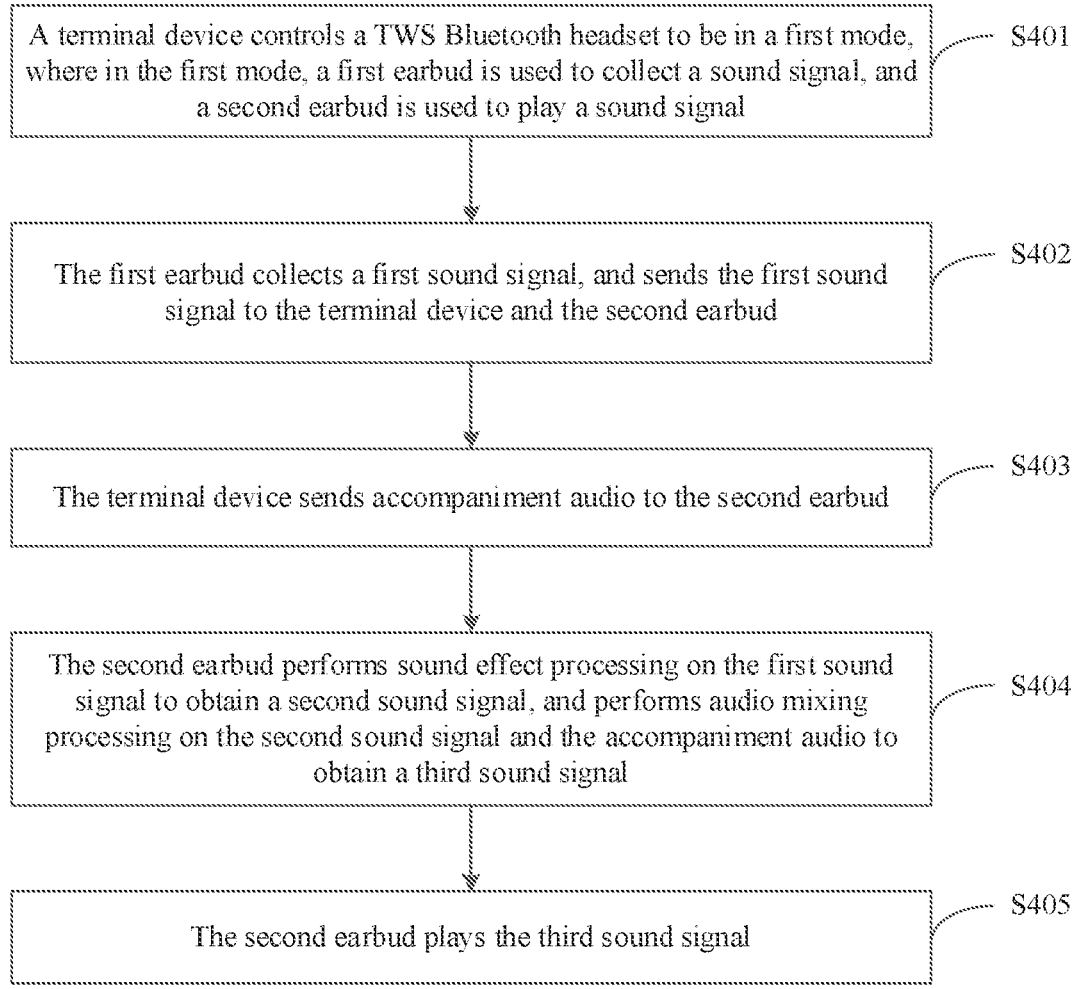
FIG. 16 is a schematic flowchart of a Bluetooth communication method according to Embodiment 4 of this application.
Figure 17:
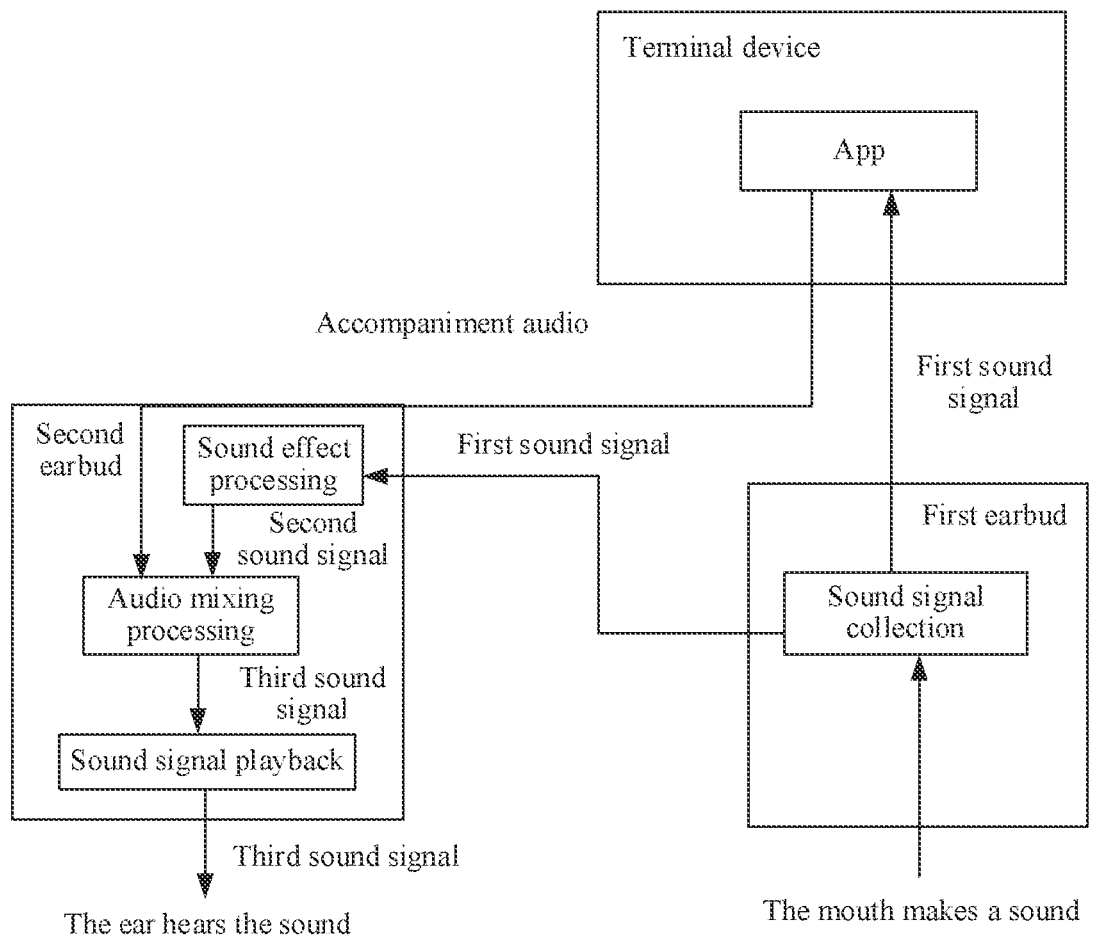
FIG. 17 is a schematic diagram of data transmission between a terminal device and a TWS Bluetooth headset to which the Bluetooth communication method according to Embodiment 4 of this application is applicable.

FIG. 16 is a schematic flowchart of a Bluetooth communication method according to Embodiment 4 of this application. FIG. 17 is a schematic diagram of data transmission between a terminal device and a TWS Bluetooth headset to which the Bluetooth communication method according to Embodiment 4 of this application is applicable. For Bluetooth links used in the data transmission process shown in FIG. 17, refer to the Bluetooth links shown in FIG. 5. Referring to FIG. 5, FIG. 16, and FIG. 17, the method includes the following steps.

S401: The terminal device controls the TWS Bluetooth headset to be in a first mode, where in the first mode, a first earbud is used to collect a sound signal, and a second earbud is used to play a sound signal.

In this embodiment, a first Bluetooth link is established between the terminal device and the first earbud, a second Bluetooth link is established between the terminal device and the second earbud, and a third Bluetooth link is established between the first earbud and the second Bluetooth.

For a specific implementation in which the terminal device controls the TWS Bluetooth headset to be in the first mode, refer to related descriptions of step S101 in Embodiment 1. Details are not described herein again.

S402: The first earbud collects a first sound signal, and sends the first sound signal to the terminal device and the second earbud.

The first earbud sends the first sound signal to the terminal device through the first Bluetooth link, and sends the first sound signal to the second earbud through the third Bluetooth link.

That the first earbud sends the first sound signal to the terminal device is an optional step. If recording is not required, the first earbud does not need to send the first sound signal to the terminal device.

S403: The terminal device sends accompaniment audio to the second earbud.

S404: The second earbud performs sound effect processing on the first sound signal to obtain a second sound signal, and performs audio mixing processing on the second sound signal and the accompaniment audio to obtain a third sound signal.

Optionally, in this embodiment, the second earbud can also be configured to collect a sound signal. In other words, the first earbud and the second earbud collect sound signals at the same time, and the sound signal collected by the second earbud is referred to as a fourth sound signal.

After receiving the first sound signal, the second earbud verifies, based on the fourth sound signal, whether the first sound signal is valid. If the first sound signal is invalid, the second earbud discards the first sound signal, and performs sound effect processing on the fourth sound signal to obtain the second sound signal. Alternatively, the first sound signal is corrected by using the fourth sound signal to obtain a corrected signal, and sound effect processing is performed on the corrected signal to obtain the second sound signal.

S405: The second earbud plays the third sound signal.

A difference between this embodiment and Embodiment 1 lies in: In this embodiment, audio mixing processing on the accompaniment audio and the second sound signal is performed on the second earbud side, and sound effect processing on the first sound signal is also performed on the second earbud side. In Embodiment 1, audio mixing processing is performed by the second earbud, and sound effect processing on the first sound signal is performed by the first earbud. Other implementations and technical effects in this embodiment are the same as those in Embodiment 1, and details are not described herein again.

Figure 18:
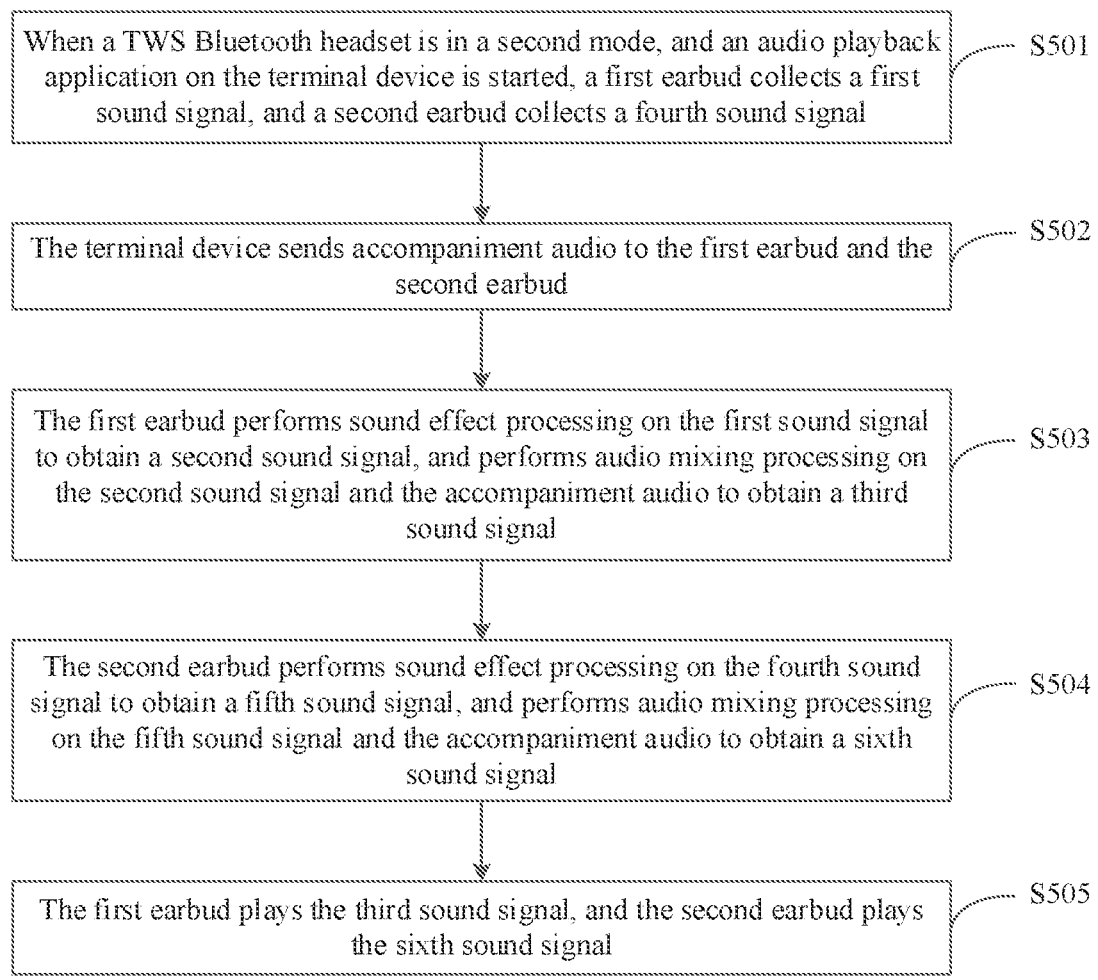
FIG. 18 is a schematic flowchart of a Bluetooth communication method according to Embodiment 5 of this application.
Figure 19:
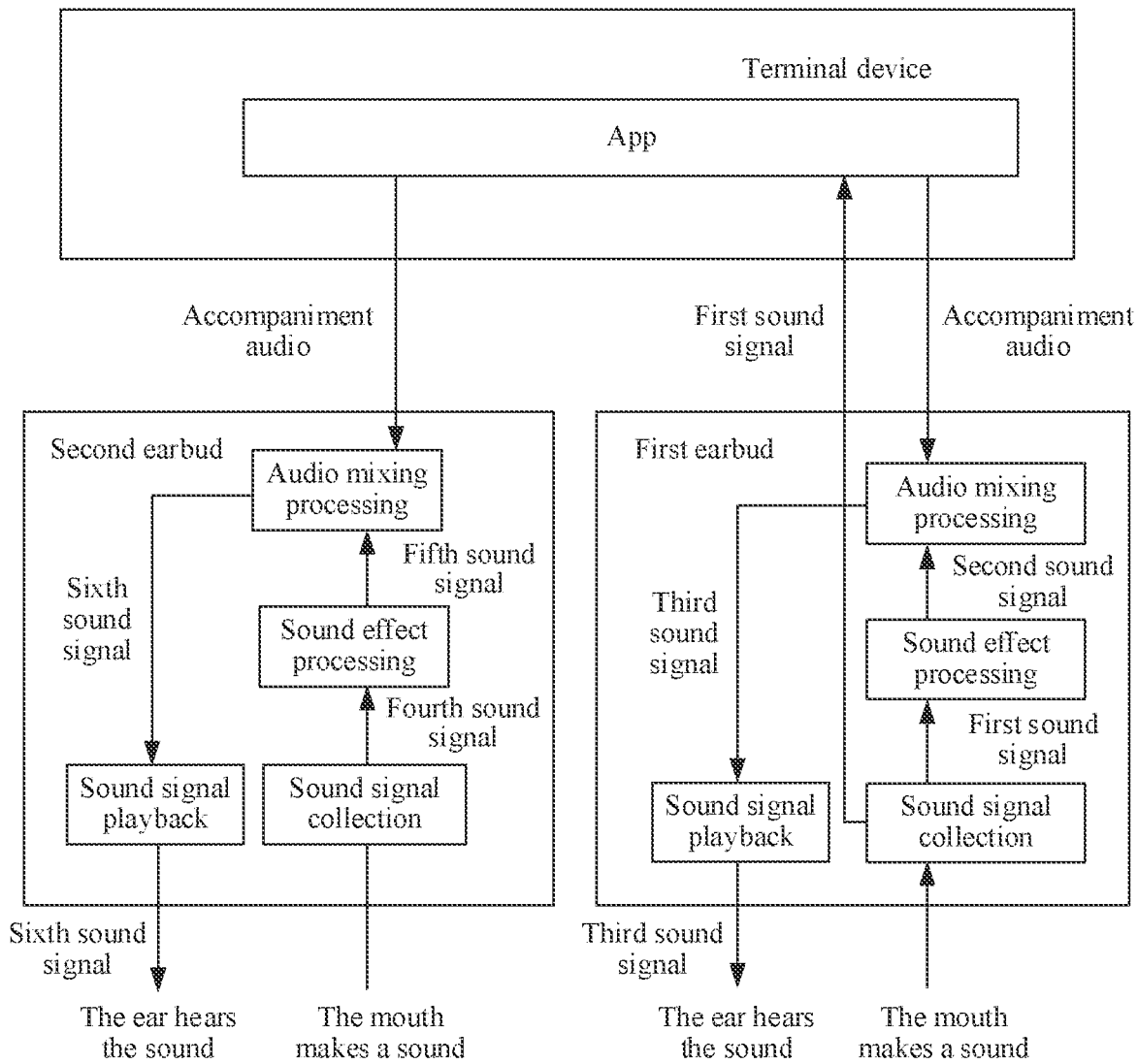
FIG. 19 is a schematic diagram of data transmission between a terminal device and a TWS Bluetooth headset to which the Bluetooth communication method according to Embodiment 5 of this application is applicable.

FIG. 18 is a schematic flowchart of a Bluetooth communication method according to Embodiment 5 of this application. FIG. 19 is a schematic diagram of data transmission between a terminal device and a TWS Bluetooth headset to which the Bluetooth communication method according to Embodiment 5 of this application is applicable. For Bluetooth links used in the data transmission process shown in FIG. 18, refer to the Bluetooth links shown in FIG. 12. In this embodiment, the terminal device and a first earbud communicate through a first Bluetooth link, and the terminal device and a second earbud communicate through a second Bluetooth link. Referring to FIG. 12, FIG. 18, and FIG. 19, the method includes the following steps.

S501: When the TWS Bluetooth headset is in a second mode, and an audio playback application on the terminal device is started, the first earbud collects a first sound signal, and the second earbud collects a fourth sound signal.

In this embodiment, after the TWS Bluetooth headset establishes a Bluetooth connection to the terminal device, the TWS Bluetooth headset is in the second mode. The second mode may also be applied to a karaoke scenario, a live broadcast scenario, a recording model video recording scenario, and/or an audio recording scenario. A difference between the first mode and the second mode lies in: In the second mode, one or two earbuds are used to pick up sound, and both the earbuds are used to listen back; and in the first mode, one earbud is used to pick up sound, and the other earbud is used to listen back.

When the TWS Bluetooth headset establishes a Bluetooth connection to the terminal device for the first time, the user may manually enable the second mode, or a system may enable the second mode by default. After the user manually enables the second mode for the first time, after the TWS Bluetooth headset establishes the Bluetooth connection to the terminal device subsequently, the second mode is enabled by default, and the user does not need to manually enable the second mode each time.

Figure 20:
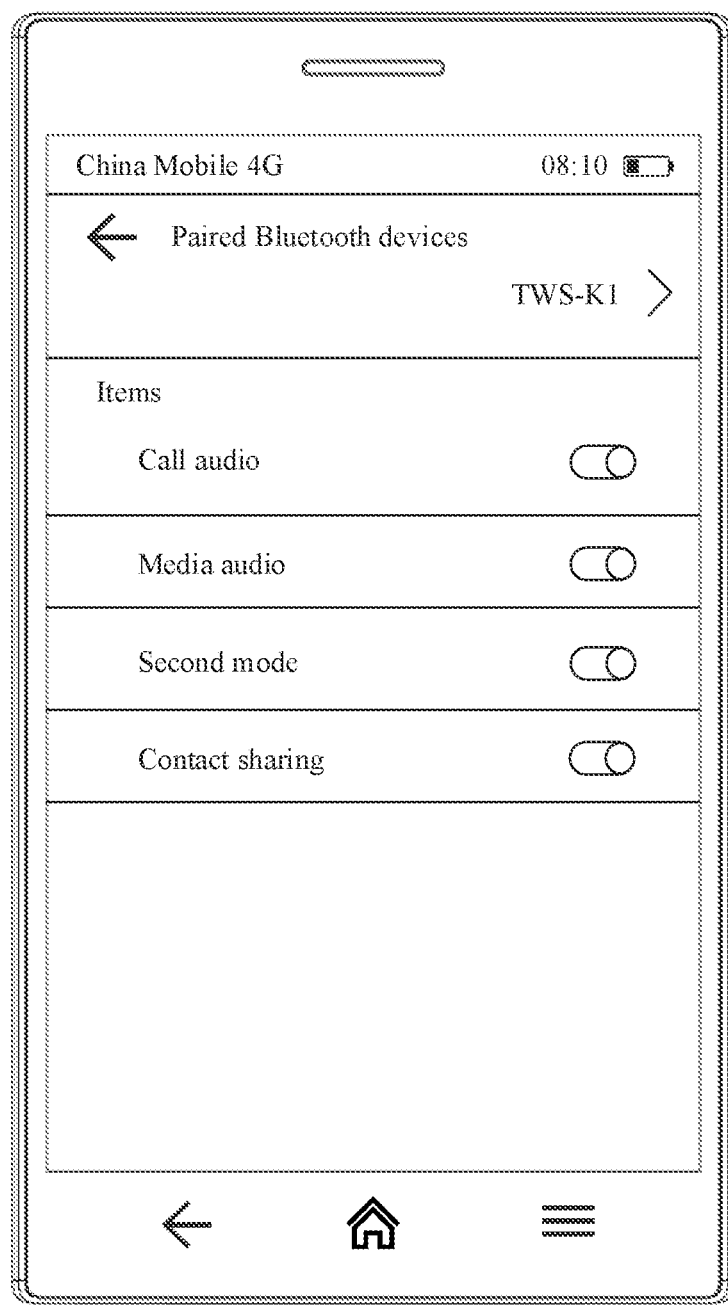
FIG. 20 is a schematic diagram of a setting interface of a TWS Bluetooth headset.

The second mode is displayed in a setting interface of the TWS Bluetooth headset. The TWS Bluetooth headset may support only one of the first mode and the second mode, or may support both the first mode and the second mode. When the TWS Bluetooth headset supports only the second mode and does not support the first mode, a setting interface of TWS-K1 is shown in FIG. 20. The setting interface of TWS-K1 includes a plurality of configuration items: a call item, Media audio, Contact sharing, and Second mode. An on/off key is correspondingly provided on a right side of each configuration item, and the user may perform a sliding operation on an on/off key corresponding to a configuration item, to enable or disable the configuration item.

In this embodiment, after the TWS Bluetooth headset establishes the Bluetooth connection to the terminal device for the first time, the second mode may be enabled by default, or may be disabled by default. When the second mode is disabled by default, the user enables the second mode by tapping or sliding the on/off key corresponding to Second mode.

In this embodiment, in the second mode, two earbuds are used to collect sound signals.

S502: The terminal device sends accompaniment audio to the first earbud and the second earbud.

The terminal device sends the accompaniment audio to the first earbud through the first Bluetooth link, and sends the accompaniment audio to the second earbud through the second Bluetooth link.

S503: The first earbud performs sound effect processing on the first sound signal to obtain a second sound signal, and performs audio mixing processing on the second sound signal and the accompaniment audio to obtain a third sound signal.

S504: The second earbud performs sound effect processing on the fourth sound signal to obtain a fifth sound signal, and performs audio mixing processing on the fifth sound signal and the accompaniment audio to obtain a sixth sound signal.

S505: The first earbud plays the third sound signal, and the second earbud plays the sixth sound signal.

In this embodiment, the two earbuds perform sound effect processing on the collected sound signals and perform audio mixing processing, and each of the two earbuds completes a listen back function.

Optionally, the first earbud sends the first sound signal to the terminal device, and the terminal device stores the first sound signal. Alternatively, the second earbud sends the fourth sound signal to the terminal device, and the terminal device stores the fourth sound signal. The first earbud or the second earbud is a primary earbud of the TWS Bluetooth headset, that is, only the primary earbud of the TWS Bluetooth headset sends a collected sound signal to the terminal device, to complete a recording function.

Optionally, both the first earbud and the second earbud send the collected sound signals to the terminal device, and the terminal device selects one sound signal from the first sound signal sent by the first earbud and the second sound signal sent by the second earbud for storage. For example, the terminal device selects the sound signal of the primary earbud for storage, or the terminal device selects a sound signal with good signal quality from the two sound signals for storage.

In this embodiment, in the second mode, the TWS Bluetooth headset can separately collect sound signals by using the two earbuds, perform audio mixing processing on the accompaniment audio delivered by the terminal device, and then separately play sound signals, so that a real-time in-ear monitoring function can be implemented in scenarios such as karaoke and live broadcast. The second mode may also be applied to a video recording scenario and/or an audio recording scenario. In the video recording scenario and/or the audio recording scenario, both the two earbuds can be used to collect sound signals. The terminal device may deliver accompaniment audio, or may not deliver accompaniment audio. The user may choose whether accompaniment audio is required. In the video recording scenario and/or the audio recording scenario, if the terminal device does not deliver accompaniment, the first earbud and the second earbud do not need to perform audio mixing processing, but directly play sound signals collected by the first earbud and the second earbud.

It should be noted that, in this embodiment of this application, the user may further perform a voice call in the second mode. In a call process, the first earbud and the second earbud may be used to collect sound signals, and send the collected sound signals to the terminal device. The terminal device transmits the sound signal collected by the first earbud or the second earbud to a peer device on the call, a voice signal sent by the peer device on the call is sent by the terminal device to the first earbud and the second earbud, and the first earbud and the second earbud simultaneously play the voice signal sent by the peer device, so as to complete the voice call. Optionally, the terminal device may further store the sound signals collected by the first earbud and the second earbud and the voice signal that is sent by the peer device on the call, to complete a call recording function.

Optionally, the first earbud and the second earbud may perform sound effect processing on the collected sound signals and then send sound signals obtained after the sound effect processing to the terminal device. A signal sent by the terminal device to the peer device on the call is a sound signal obtained after sound effect processing. Certainly, the terminal device may alternatively perform sound effect processing on the sound signal collected by the first earbud or the second earbud.

Figure 21:
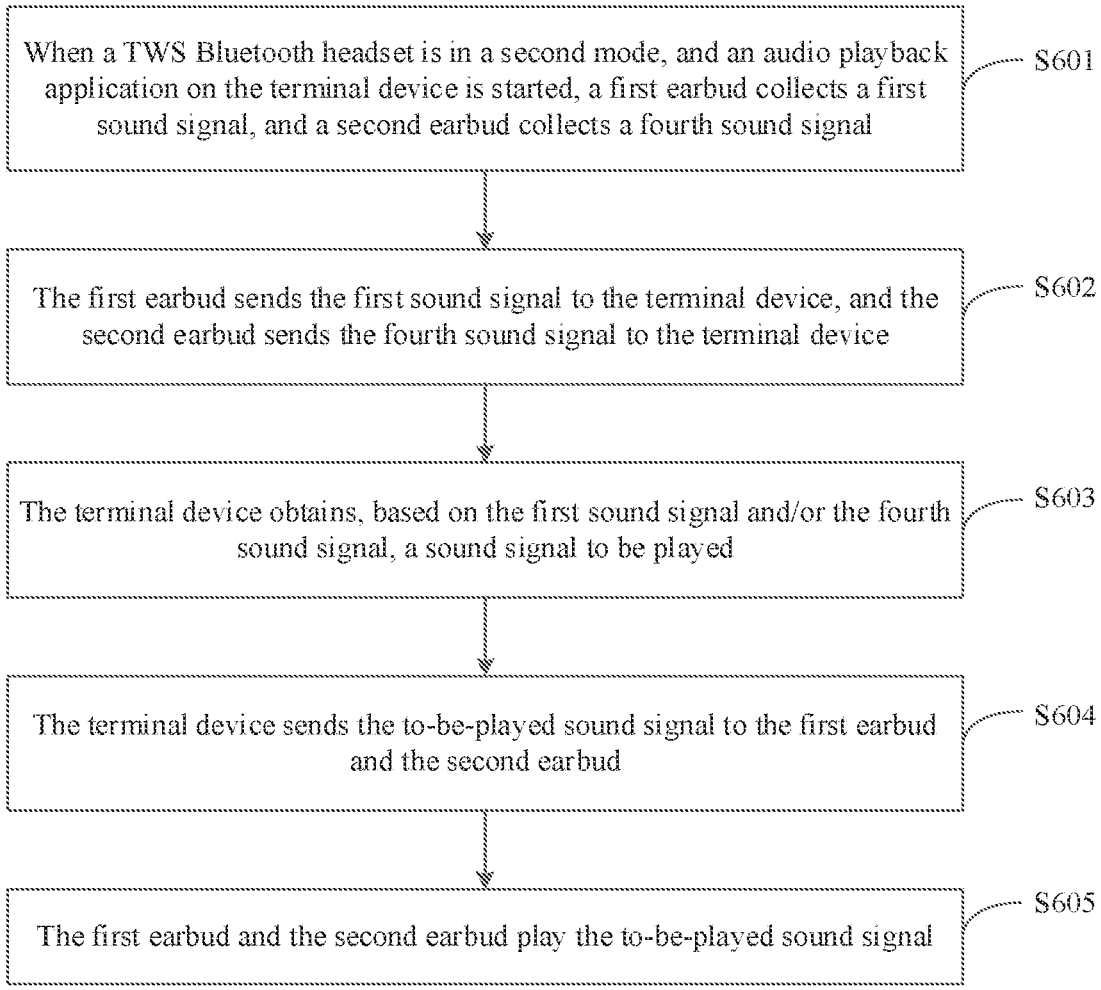
FIG. 21 is a schematic flowchart of a Bluetooth communication method according to Embodiment 6 of this application.
Figure 22:
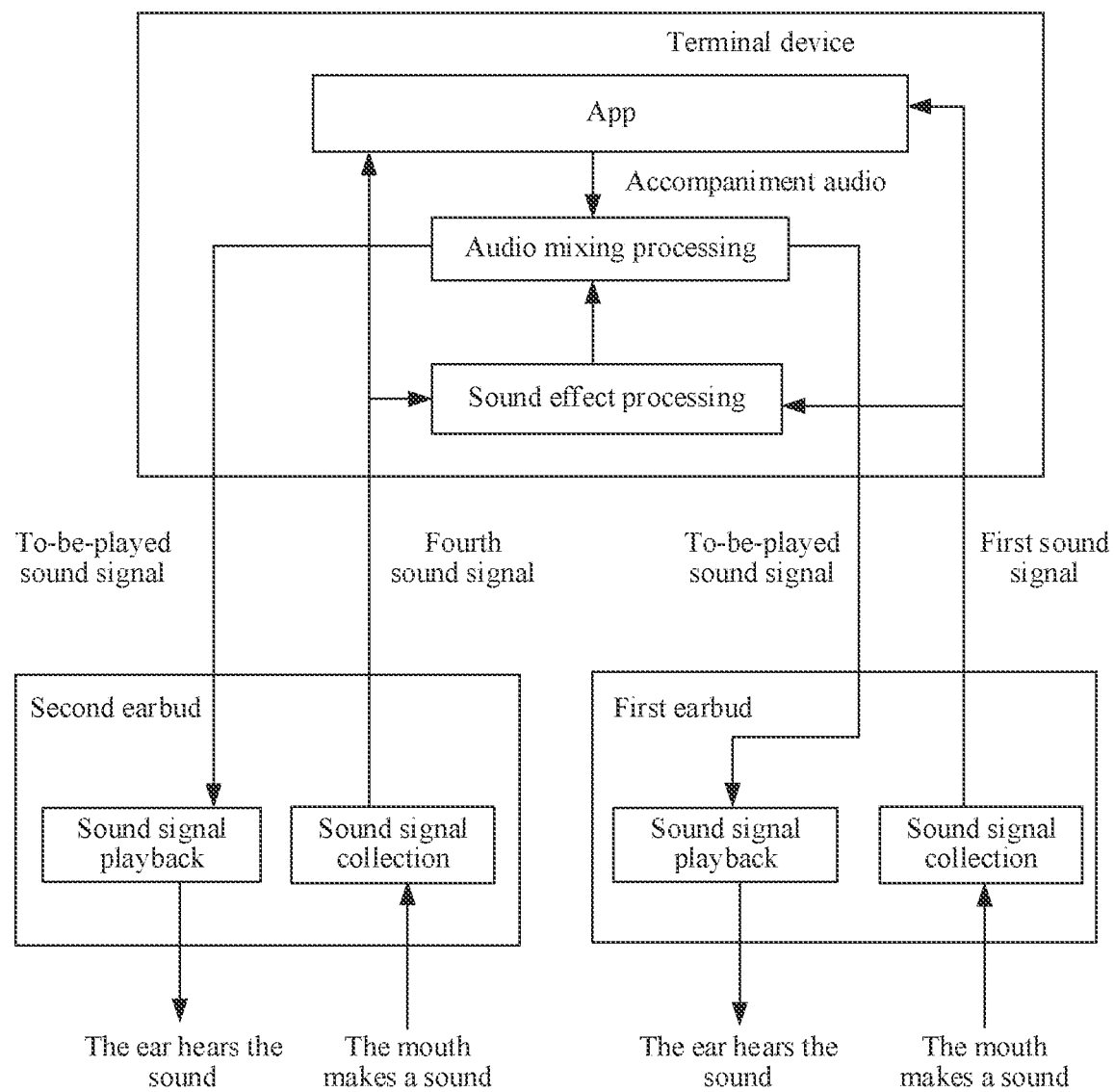
FIG. 22 is a schematic diagram of data transmission between a terminal device and a TWS Bluetooth headset to which the Bluetooth communication method according to Embodiment 6 of this application is applicable.

FIG. 21 is a schematic flowchart of a Bluetooth communication method according to Embodiment 6 of this application. FIG. 22 is a schematic diagram of data transmission between a terminal device and a TWS Bluetooth headset to which the Bluetooth communication method according to Embodiment 6 of this application is applicable. For Bluetooth links used in the data transmission process shown in FIG. 22, refer to the Bluetooth links shown in FIG. 12. In this embodiment, the terminal device and a first earbud communicate through a first Bluetooth link, and the terminal device and a second earbud communicate through a second Bluetooth link. Referring to FIG. 12, FIG. 21, and FIG. 22, the method includes the following steps.

S601: When the TWS Bluetooth headset is in a second mode, and an audio playback application on the terminal device is started, the first earbud collects a first sound signal, and the second earbud collects a fourth sound signal.

S602: The first earbud sends the first sound signal to the terminal device, and the second earbud sends the fourth sound signal to the terminal device.

The first earbud sends the first sound signal to the terminal device through the first Bluetooth link, and the second earbud sends the fourth sound signal to the terminal device through the second Bluetooth link.

S603: The terminal device obtains, based on the first sound signal and/or the fourth sound signal, a sound signal to be played.

In an implementation, the terminal device performs sound effect processing on the first sound signal to obtain a second sound signal, performs audio mixing processing on the second sound signal and accompaniment audio to obtain a to-be-played third sound signal, and sends the to-be-played third sound signal to the first earbud. The terminal device performs sound effect processing on the fourth sound signal to obtain a fifth sound signal, performs audio mixing processing on the fifth sound signal and accompaniment audio to obtain a to-be-played sixth sound signal, and sends the to-be-played sixth sound signal to the second earbud.

In another manner, the terminal device selects one signal from the first sound signal and the fourth sound signal as a to-be-processed signal, performs sound effect processing on the to-be-processed signal to obtain the second sound signal, and performs audio mixing processing on the second sound signal and accompaniment audio to obtain a to-be-played sound signal.

Optionally, the terminal device may select, from the first sound signal and the fourth sound signal, a sound signal collected by a primary earbud as the to-be-processed signal. It may be understood that the terminal device may alternatively select one signal as the to-be-processed signal in another manner. For example, a sound signal with relatively good signal quality is selected from the two signals as the to-be-processed signal.

S604: The terminal device sends the to-be-played sound signal to the first earbud and the second earbud.

The terminal device sends the to-be-played sound signal to the first earbud through the first Bluetooth link, and sends the to-be-played sound signal to the second earbud through the second Bluetooth link.

S605: The first earbud and the second earbud play the to-be-played sound signal.

Optionally, the terminal device stores the first sound signal or the fourth sound signal. The terminal device may select, from the first sound signal and the fourth sound signal, a sound signal corresponding to the primary earbud for storage, or may select a sound signal with relatively good signal quality for storage.

A difference between this embodiment and Embodiment 5 lies in: In this embodiment, sound effect processing and audio mixing are completed on the terminal device side, and in Embodiment 5, sound effect processing and audio mixing are completed on the earbud side.

Figure 23:
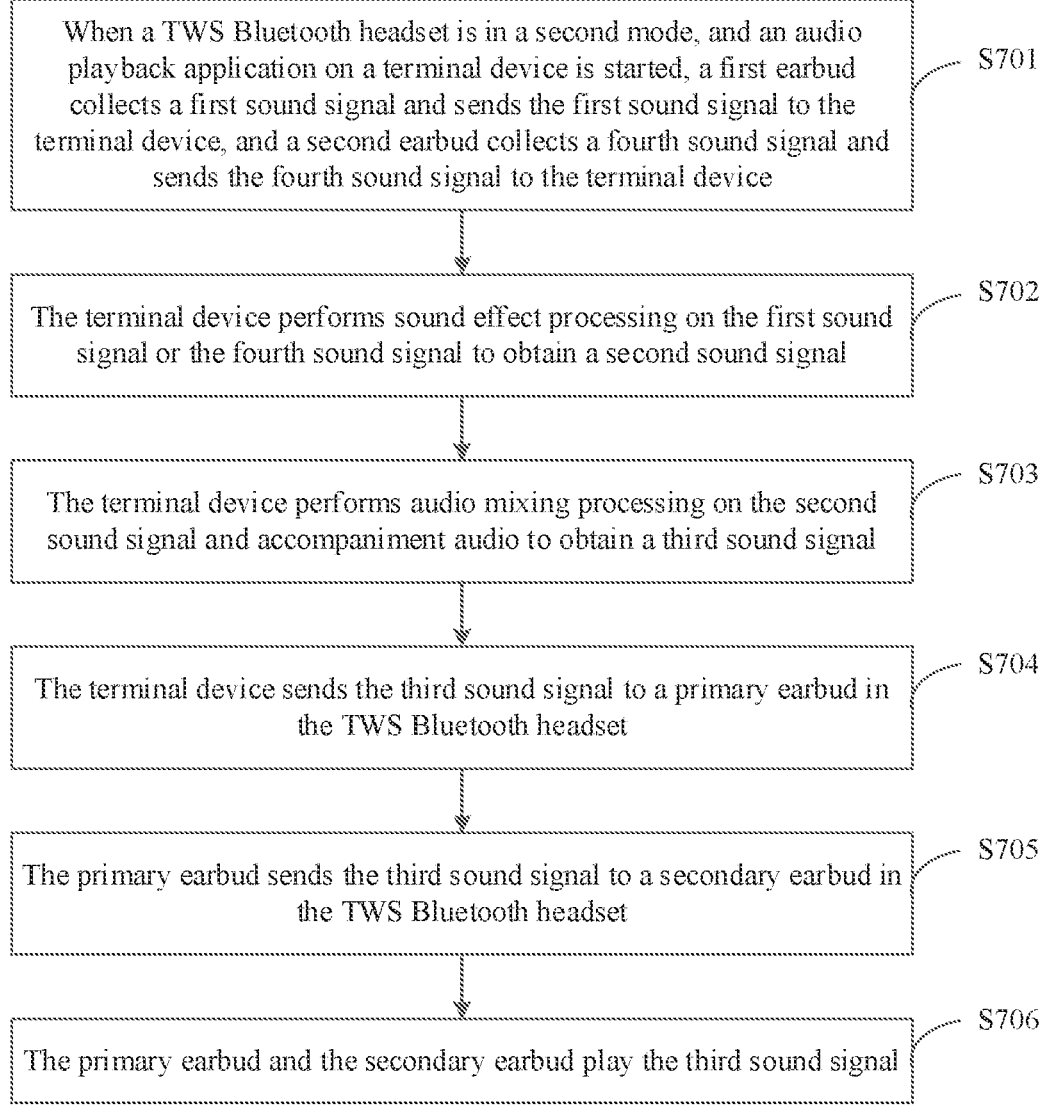
FIG. 23 is a schematic flowchart of a Bluetooth communication method according to Embodiment 7 of this application.
Figure 24:
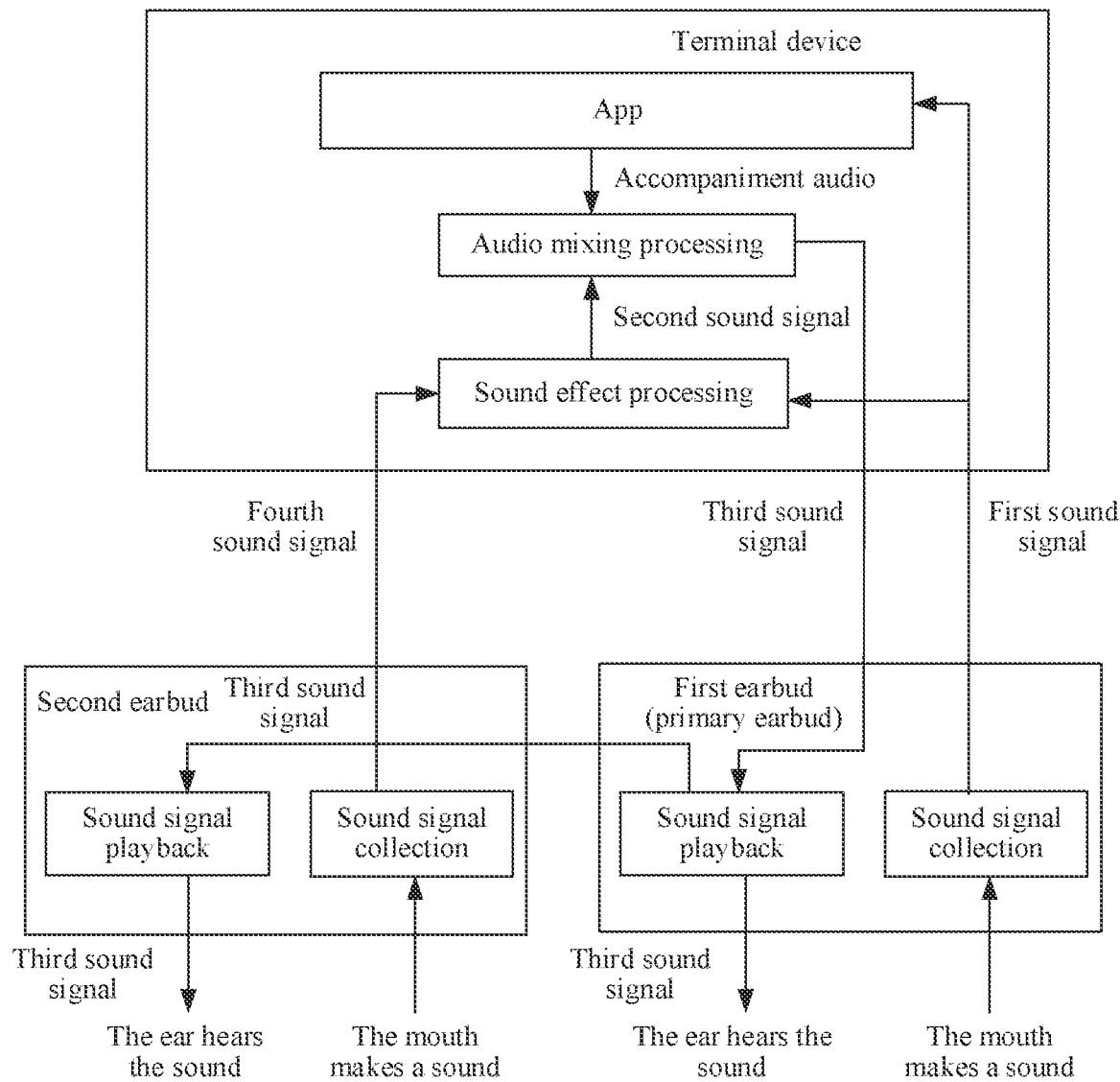
FIG. 24 is a schematic diagram of data transmission between a terminal device and a TWS Bluetooth headset to which the Bluetooth communication method according to Embodiment 7 of this application is applicable.

FIG. 23 is a schematic flowchart of a Bluetooth communication method according to Embodiment 7 of this application. FIG. 24 is a schematic diagram of data transmission between a terminal device and a TWS Bluetooth headset to which the Bluetooth communication method according to Embodiment 7 of this application is applicable. For Bluetooth links used in the data transmission process shown in FIG. 24, refer to the Bluetooth links shown in FIG. 6. In this embodiment, the terminal device and a first earbud communicate through a first Bluetooth link, the terminal device and a second earbud communicate through a second Bluetooth link, and the first earbud and the second earbud communicate through a third Bluetooth link. Referring to FIG. 6, FIG. 21, and FIG. 22, the method includes the following steps.

S701: When the TWS Bluetooth headset is in a second mode, and an audio playback application on the terminal device is started, the first earbud collects a first sound signal and sends the first sound signal to the terminal device, and the second earbud collects a fourth sound signal and sends the fourth sound signal to the terminal device.

The first earbud sends the first sound signal to the terminal device through the first Bluetooth link, and the second earbud sends the fourth sound signal to the terminal device through the second Bluetooth link.

S702: The terminal device performs sound effect processing on the first sound signal or the fourth sound signal to obtain a second sound signal.

Optionally, the terminal device may select, from the first sound signal and the fourth sound signal, a sound signal collected by a primary earbud as a to-be-processed signal, and performs sound effect processing on the to-be-processed signal to obtain the second sound signal. It may be understood that the terminal device may alternatively select one signal as the to-be-processed signal in another manner. For example, a sound signal with relatively good signal quality is selected from the two signals as the to-be-processed signal.

S703: The terminal device performs audio mixing processing on the second sound signal and accompaniment audio to obtain a third sound signal.

S704: The terminal device sends the third sound signal to the primary earbud of the TWS Bluetooth headset.

S705: The primary earbud sends the third sound signal to a secondary earbud of the TWS Bluetooth headset.

S706: The primary earbud and the secondary earbud play the third sound signal.

In this embodiment, the primary earbud is the first earbud or the second earbud. When the primary earbud is the first earbud, the second earbud is the secondary earbud. When the primary earbud is the second earbud, the first earbud is the secondary earbud. In an example shown in FIG. 24, the first earbud is the primary earbud. The terminal device sends the third sound signal to the first earbud, the first earbud sends the third sound signal to the second earbud through the third Bluetooth link, and the first earbud and the second earbud play the third sound signal at the same time.

Optionally, the terminal device stores the first sound signal or the fourth sound signal. The terminal device may select, from the first sound signal and the fourth sound signal, a sound signal corresponding to the primary earbud for storage, or may select a sound signal with relatively good signal quality for storage.

Figure 25:
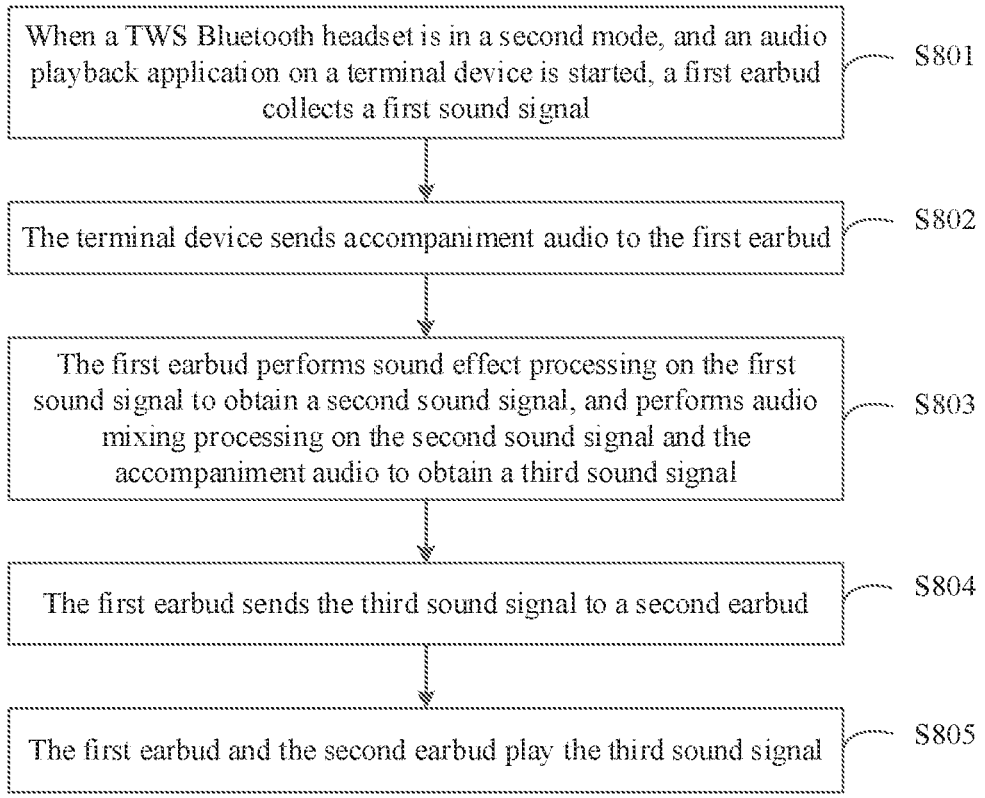
FIG. 25 is a schematic flowchart of a Bluetooth communication method according to Embodiment 8 of this application.
Figure 26:
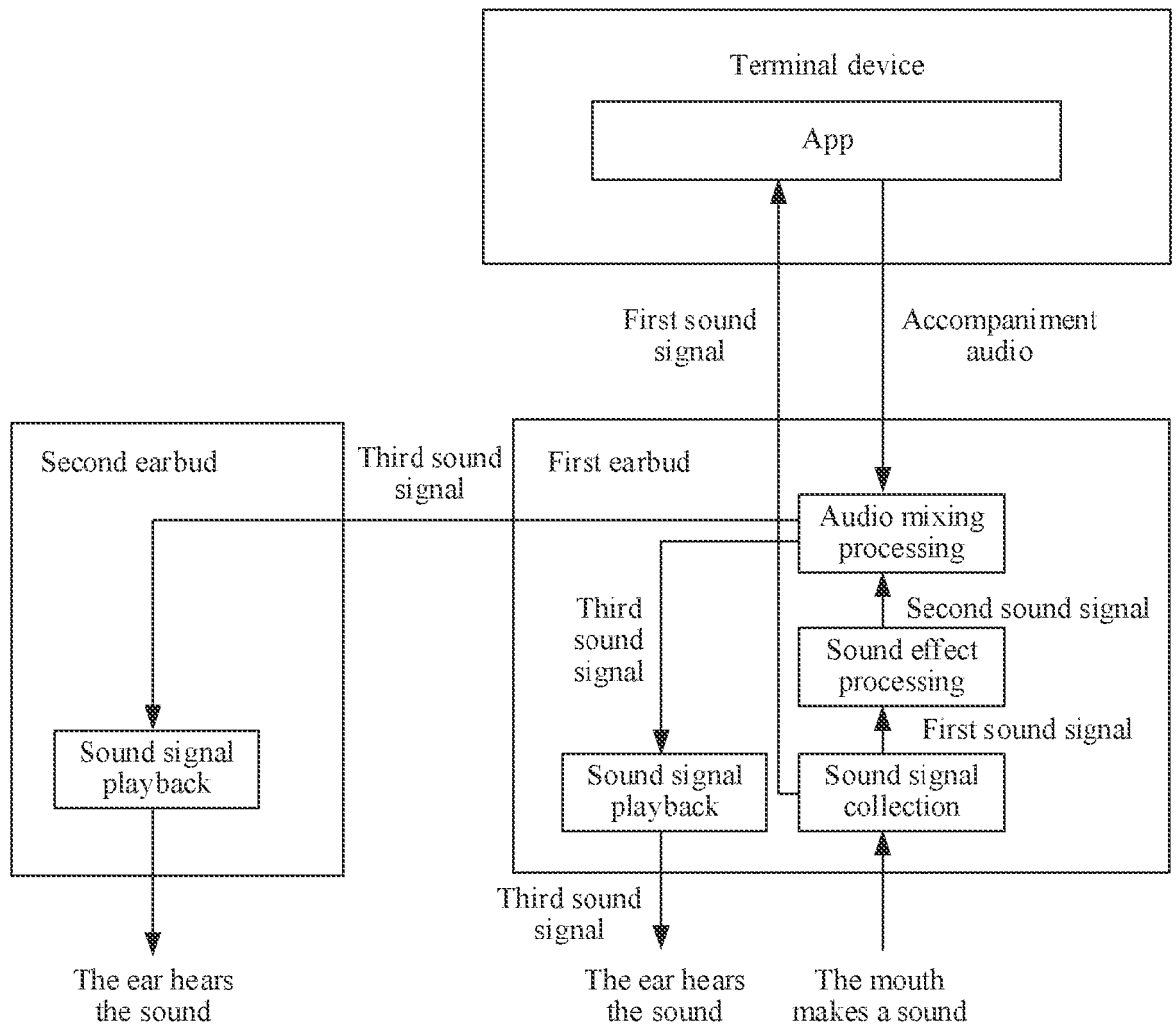
FIG. 26 is a schematic diagram of data transmission between a terminal device and a TWS Bluetooth headset to which the Bluetooth communication method according to Embodiment 8 of this application is applicable.

FIG. 25 is a schematic flowchart of a Bluetooth communication method according to Embodiment 8 of this application. FIG. 26 is a schematic diagram of data transmission between a terminal device and a TWS Bluetooth headset to which the Bluetooth communication method according to Embodiment 8 of this application is applicable. For Bluetooth links used in the data transmission process shown in FIG. 26, refer to the Bluetooth links shown in FIG. 6. In this embodiment, the terminal device and a first earbud communicate through a first Bluetooth link, the terminal device and a second earbud communicate through a second Bluetooth link, and the first earbud and the second earbud communicate through a third Bluetooth link. Referring to FIG. 6, FIG. 25, and FIG. 26, the method includes the following steps.

S801: When the TWS Bluetooth headset is in a second mode, and an audio playback application on the terminal device is started, the first earbud collects a first sound signal.

In this embodiment, in the second mode, only one earbud is used to collect a sound signal. The earbud that collects a sound signal is determined by a system, and a user does not need to choose which earbud is used to collect a sound signal. For example, a primary earbud is used by default to collect a sound signal. In this case, the first earbud is the primary earbud of the TWS Bluetooth headset. Certainly, a secondary earbud may also be used by default to collect a sound signal, which is not limited in this embodiment.

S802: The terminal device sends accompaniment audio to the first earbud.

The terminal device sends the accompaniment audio to the first earbud through the first communication link.

S803: The first earbud performs sound effect processing on the first sound signal to obtain a second sound signal, and performs audio mixing processing on the second sound signal and the accompaniment audio to obtain a third sound signal.

S804: The first earbud sends the third sound signal to the second earbud.

The first earbud sends the third sound signal to the second earbud through the third Bluetooth link.

S805: The first earbud and the second earbud play the third sound signal.

Optionally, the first earbud sends the first sound signal to the terminal device, and the terminal device stores the first sound signal, to complete a recoding function.

In this embodiment, in the second mode, the TWS Bluetooth headset can use one earbud (for example, the primary earbud) of the TWS Bluetooth headset to collect a sound signal, and use the earbud to perform audio mixing processing on the accompaniment audio delivered by the terminal device. The earbud sends a sound signal obtained after audio mixing processing to the other earbud, and the two earbuds play the sound signal obtained after audio mixing at the same time, so that a real-time in-ear monitoring function in scenarios such as karaoke and live broadcast can be implemented.

Figure 27:
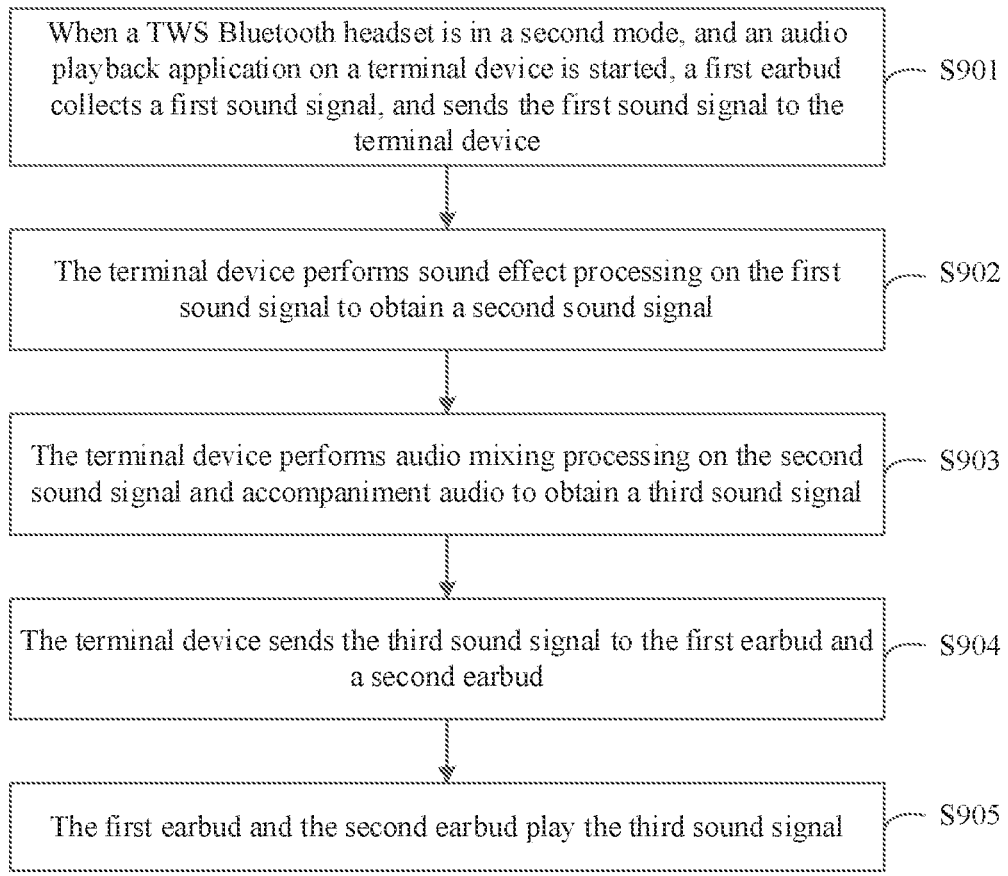
FIG. 27 is a schematic flowchart of a Bluetooth communication method according to Embodiment 9 of this application.
Figure 28:
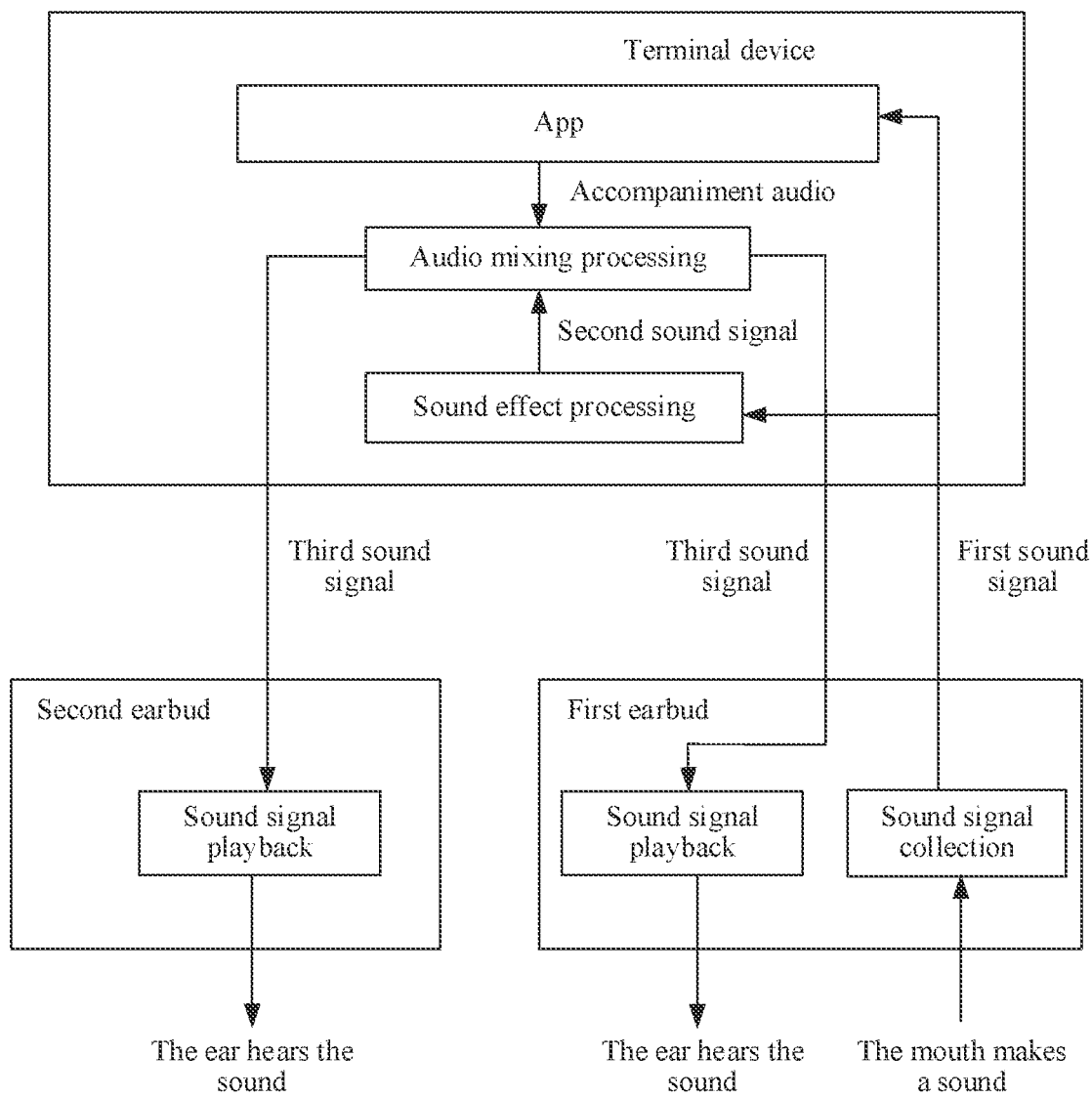
FIG. 28 is a schematic diagram of data transmission between a terminal device and a TWS Bluetooth headset to which the Bluetooth communication method according to Embodiment 9 of this application is applicable.

FIG. 27 is a schematic flowchart of a Bluetooth communication method according to Embodiment 9 of this application. FIG. 28 is a schematic diagram of data transmission between a terminal device and a TWS Bluetooth headset to which the Bluetooth communication method according to Embodiment 9 of this application is applicable. For Bluetooth links used in the data transmission process shown in FIG. 28, refer to the Bluetooth links shown in FIG. 12. In this embodiment, the terminal device and a first earbud communicate through a first Bluetooth link, and the terminal device and a second earbud communicate through a second Bluetooth link. Referring to FIG. 6, FIG. 27, and FIG. 28, the method includes the following steps.

S901: When the TWS Bluetooth headset is in a second mode, and an audio playback application on the terminal device is started, the first earbud collects a first sound signal, and sends the first sound signal to the terminal device.

Optionally, the first earbud is a primary earbud in the TWS Bluetooth headset. The first earbud sends the first sound signal to the terminal device through the first Bluetooth link.

Optionally, after receiving the first sound signal, the terminal device stores the first sound signal, so as to complete a recording function.

S902: The terminal device performs sound effect processing on the first sound signal to obtain a second sound signal.

S903: The terminal device performs audio mixing processing on the second sound signal and accompaniment audio to obtain a third sound signal.

S904: The terminal device sends the third sound signal to the first earbud and the second earbud.

The terminal device sends the third sound signal to the first earbud through the first Bluetooth link, and sends the third sound signal to the second earbud through the second Bluetooth link.

S905: The first earbud and the second earbud play the third sound signal.

After receiving the third sound signal, the two earbuds simultaneously play the third sound signal, to implement a real-time in-ear monitoring function.

A difference between this embodiment and Embodiment 8 lies in: In Embodiment 8, sound effect processing and audio mixing processing are completed on the first earbud side, but in this embodiment, sound effect processing and audio mixing processing are completed on the terminal device side.

Figure 29:
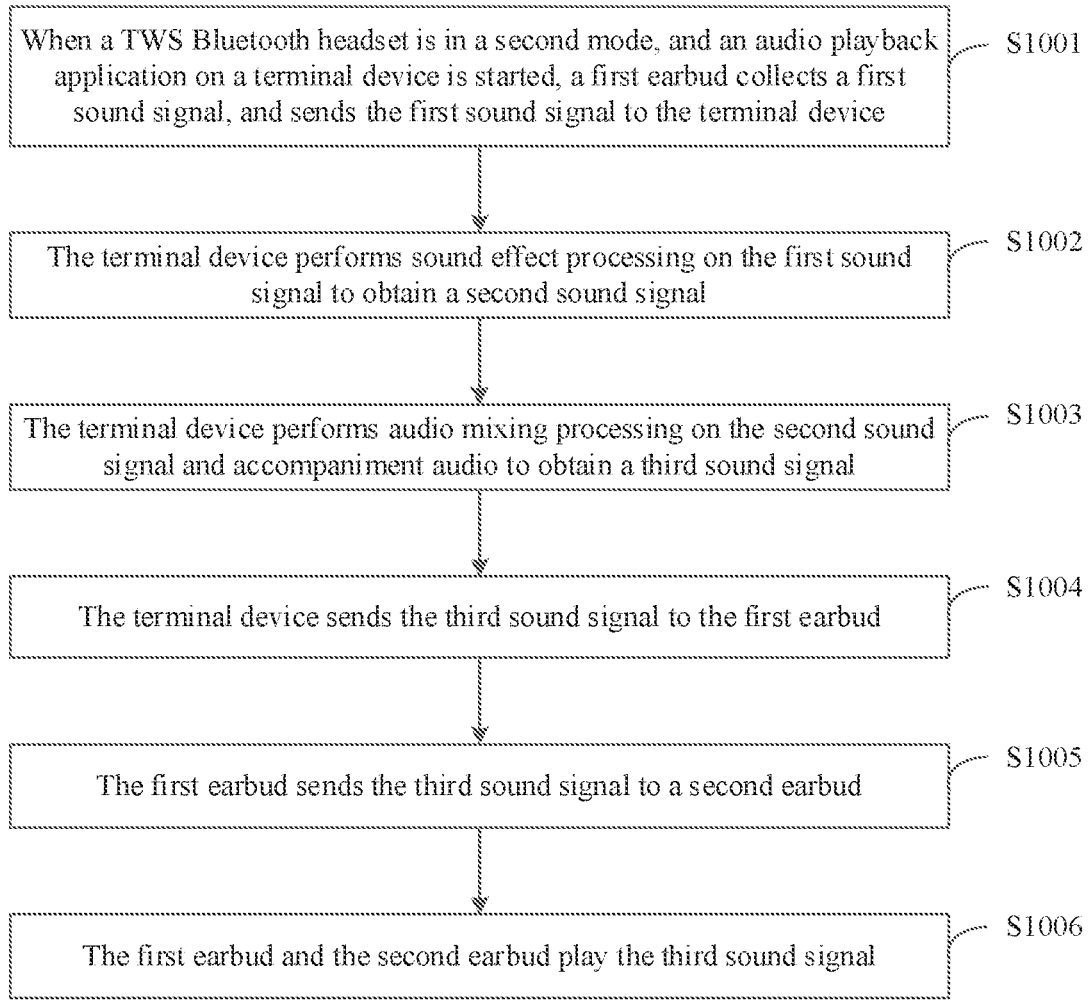
FIG. 29 is a schematic flowchart of a Bluetooth communication method according to Embodiment 10 of this application.
Figure 30:
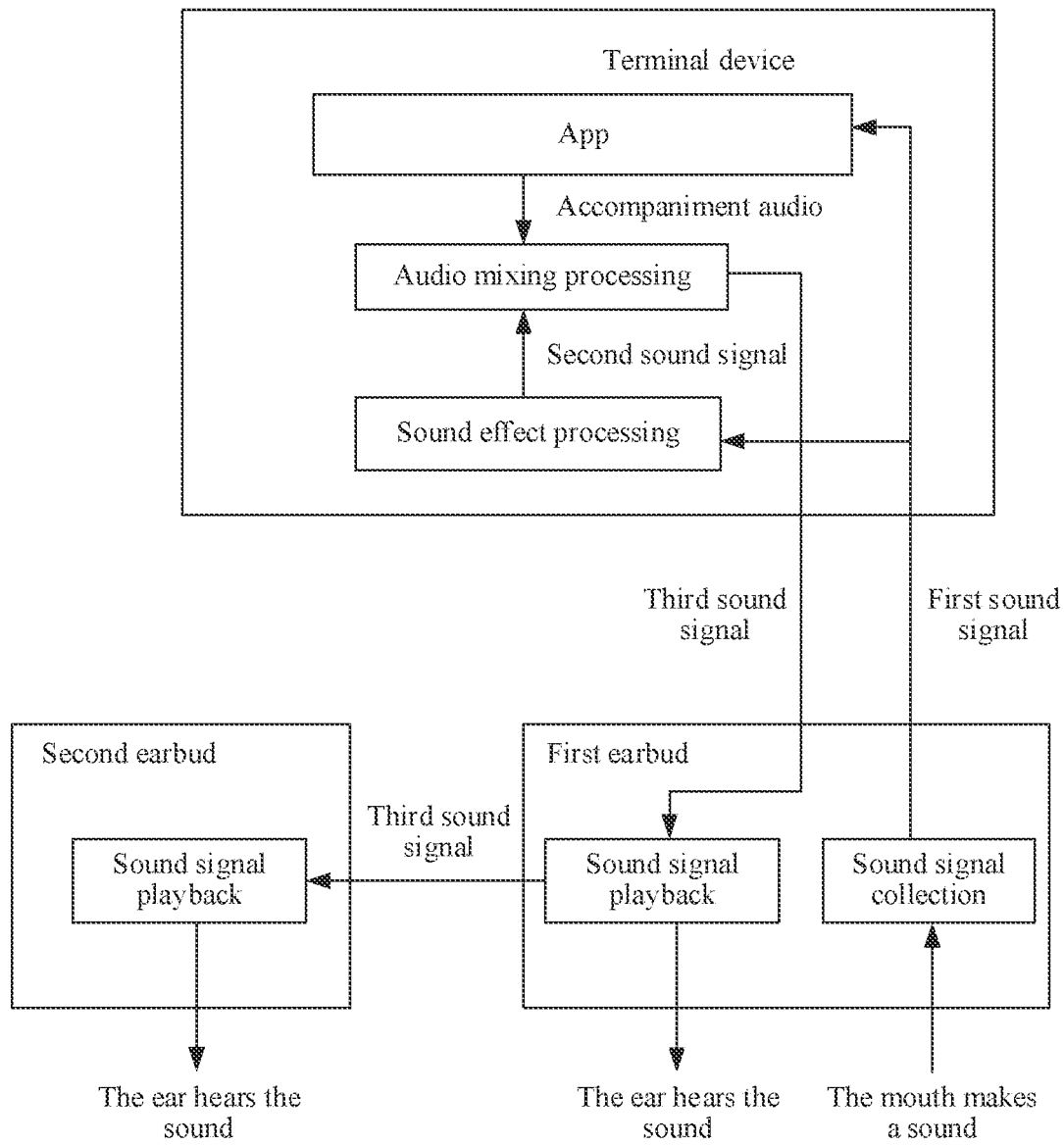
FIG. 30 is a schematic diagram of data transmission between a terminal device and a TWS Bluetooth headset to which the Bluetooth communication method according to Embodiment 10 of this application is applicable.

FIG. 29 is a schematic flowchart of a Bluetooth communication method according to Embodiment 10 of this application. FIG. 30 is a schematic diagram of data transmission between a terminal device and a TWS Bluetooth headset to which the Bluetooth communication method according to Embodiment 10 of this application is applicable. For Bluetooth links used in the data transmission process shown in FIG. 30, refer to the Bluetooth links shown in FIG. 16. In this embodiment, the terminal device and a first earbud communicate through a first Bluetooth link, the terminal device and a second earbud communicate through a second Bluetooth link, and the first earbud and the second earbud communicate through a third Bluetooth link. Referring to FIG. 6, FIG. 29, and FIG. 30, the method includes the following steps.

S1001: When the TWS Bluetooth headset is in a second mode, and an audio playback application on the terminal device is started, the first earbud collects a first sound signal, and sends the first sound signal to the terminal device.

Optionally, the first earbud is a primary earbud in the TWS Bluetooth headset. The first earbud sends the first sound signal to the terminal device through the first Bluetooth link.

Optionally, after receiving the first sound signal, the terminal device stores the first sound signal, so as to complete a recording function.

S1002: The terminal device performs sound effect processing on the first sound signal to obtain a second sound signal.

S1003: The terminal device performs audio mixing processing on the second sound signal and accompaniment audio to obtain a third sound signal.

S1004: The terminal device sends the third sound signal to the first earbud.

The terminal device sends the third sound signal to the first earbud through the first Bluetooth link.

S1005: The first earbud sends the third sound signal to the second earbud.

The first earbud sends the third sound signal to the second earbud through the third Bluetooth link.

S1006: The first earbud and the second earbud play the third sound signal.

The two earbuds simultaneously play the third sound signal, to implement a real-time in-ear monitoring function.

A difference between this embodiment and Embodiment 9 lies in: In Embodiment 8, after obtaining the third sound signal through audio mixing, the terminal sends the third sound signal to the first earbud and the second earbud; however, in this embodiment, after obtaining the third sound signal through audio mixing, the terminal device sends the third sound signal only to the first earbud, and the first earbud forwards the third sound signal to the second earbud.

Figure 31:
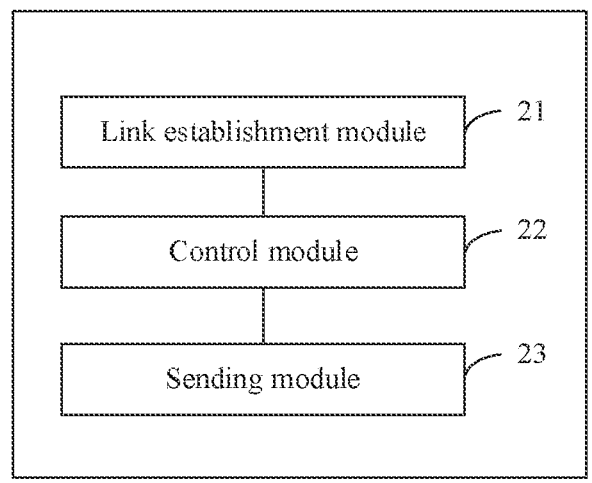
FIG. 31 is a schematic structural diagram of a terminal device according to Embodiment 11 of this application.

FIG. 31 is a schematic structural diagram of a terminal device according to Embodiment 11 of this application. As shown in FIG. 31, the terminal device provided in this embodiment includes a link establishment module 21, a control module 22, and a sending module 23.

The link establishment module 21 is configured to establish a first Bluetooth link with a first earbud, and establish a second Bluetooth link with a second earbud, where the first earbud and the second earbud are single earbuds in a true wireless stereo TWS Bluetooth headset, and a third Bluetooth link is established between the first earbud and the second earbud.

The control module 22 is configured to control the TWS Bluetooth headset to be in a first mode, where in the first mode, the first earbud is used to collect a sound signal, and the second earbud is used to play a sound signal.

The sending module 23 is configured to: when an audio playback application on the terminal device is started, send accompaniment audio to the second earbud through the second Bluetooth link.

Optionally, the terminal device further includes a receiving module and a storage module. The receiving module is configured to receive a first sound signal sent by the first earbud through the first Bluetooth link, where the first sound signal is collected by the first earbud. The storage module is configured to store the first sound signal.

Optionally, the control module 22 is specifically configured to: when the first mode is enabled, allocate audio roles to the first earbud and the second earbud, where an audio role of the first earbud is a sound collection role, and an audio role of the second earbud is a sound playback role.

Optionally, the terminal device further includes a receiving module and an enabling module. The receiving module is configured to receive an instruction for enabling the first mode. The enabling module is configured to enable the first mode according to the enable instruction.

Optionally, the control module 22 is specifically configured to: detect wearing status information of the TWS Bluetooth headset, where the wearing status information is used to indicate whether the TWS Bluetooth headset is in a worn state or an unworn state; and allocate the audio roles to the second earbud and the second earbud based on the wearing status information, where an audio role of an earbud in the unworn state is the sound collection role, and an audio role of an earbud in the worn state is the sound playback role.

Optionally, the control module 22 is specifically configured to: display a role selection interface, where audio role options for the first earbud and the second earbud are displayed in the role selection interface, and the audio role options include a sound collection option and a sound playback option; receive a selection instruction entered by a user in the role selection interface; and allocate the audio roles to the first earbud and the second earbud according to the selection instruction.

Optionally, the control module 22 is specifically configured to: display a role selection interface, where audio role options for the first earbud or the second earbud are displayed in the role selection interface, and the audio role options include a sound collection option and a sound playback option; receive a selection instruction entered by a user in the role selection interface; allocate an audio role to the first earbud or the second earbud according to the selection instruction; and allocate an audio role to the other earbud in the TWS Bluetooth headset based on the audio role allocated to the first earbud or the second earbud.

Optionally, the control module 22 is specifically configured to: allocate the audio roles to the first earbud and the second earbud based on stored historical data of audio roles of the TWS Bluetooth headset.

Optionally, the control module 22 is specifically configured to: allocate the audio roles to the first earbud and the second earbud based on audio roles, configured by a system, of the TWS Bluetooth headset in the first mode.

The terminal device in this embodiment may be configured to perform the method in Embodiment 1. Specific implementations and technical effects are similar, and details are not described herein again.

Figure 32:
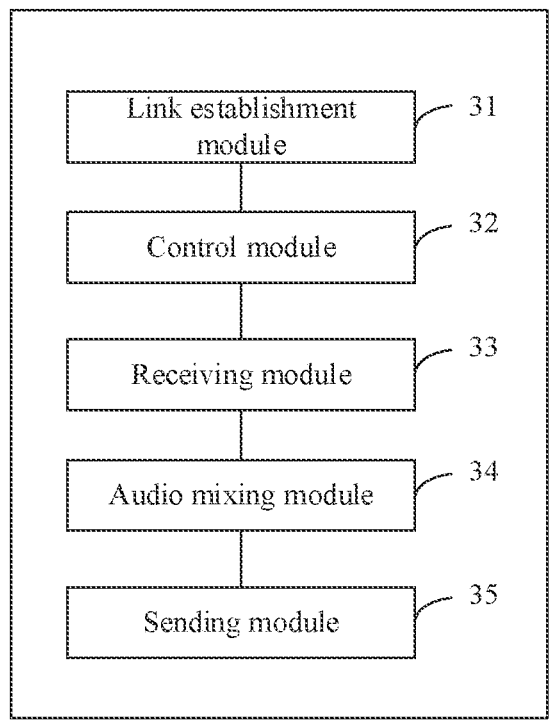
FIG. 32 is a schematic structural diagram of a terminal device according to Embodiment 12 of this application.

FIG. 32 is a schematic structural diagram of a terminal device according to Embodiment 12 of this application. As shown in FIG. 32, the terminal device provided in this embodiment includes a link establishment module 31, a control module 32, a receiving module 33, an audio mixing module 34, and a sending module 35.

The link establishment module 31 is configured to establish a first Bluetooth link with a first earbud, and establish a second Bluetooth link with a second earbud, where the first earbud and the second earbud are single earbuds in a true wireless stereo TWS Bluetooth headset.

The control module 32 is configured to control the TWS Bluetooth headset to be in a first mode, where in the first mode, the first earbud is used to collect a sound signal, and the second earbud is used to play a sound signal.

The receiving module 33 is configured to: when an audio playback application on the terminal device is started, receive a second sound signal sent by the first earbud through the first Bluetooth link, where the second sound signal is obtained by the first earbud by performing sound effect processing on a collected first sound signal.

The audio mixing module 34 is configured to perform audio mixing processing on accompaniment audio and the second sound signal to obtain a third sound signal.

The sending module 35 is configured to send the third sound signal to the second earbud through the second Bluetooth link.

Optionally, the terminal device further includes a storage module. The receiving module 33 is further configured to receive the first sound signal sent by the first earbud through the first Bluetooth link, where the first sound signal is collected by the first earbud. The storage module is configured to store the first sound signal.

Optionally, the control module 32 is specifically configured to: when the first mode is enabled, allocate audio roles to the first earbud and the second earbud, where an audio role of the first earbud is a sound collection role, and an audio role of the second earbud is a sound playback role.

Optionally, the terminal device further includes an enabling module. The receiving module 33 is further configured to receive an instruction for enabling the first mode. The enabling module is configured to enable the first mode according to the enable instruction.

Optionally, the control module 32 is specifically configured to: detect wearing status information of the TWS Bluetooth headset, where the wearing status information is used to indicate whether the TWS Bluetooth headset is in a worn state or an unworn state; and allocate the audio roles to the second earbud and the second earbud based on the wearing status information, where an audio role of an earbud in the unworn state is the sound collection role, and an audio role of an earbud in the worn state is the sound playback role.

Optionally, the control module 32 is specifically configured to: display a role selection interface, where audio role options for the first earbud and the second earbud are displayed in the role selection interface, and the audio role options include a sound collection option and a sound playback option; receive a selection instruction entered by a user in the role selection interface; and allocate the audio roles to the first earbud and the second earbud according to the selection instruction.

Optionally, the control module 32 is specifically configured to: display a role selection interface, where audio role options for the first earbud or the second earbud are displayed in the role selection interface, and the audio role options include a sound collection option and a sound playback option; receive a selection instruction entered by a user in the role selection interface; allocate an audio role to the first earbud or the second earbud according to the selection instruction; and allocate an audio role to the other earbud in the TWS Bluetooth headset based on the audio role allocated to the first earbud or the second earbud.

Optionally, the control module 32 is specifically configured to: allocate the audio roles to the first earbud and the second earbud based on stored historical data of audio roles of the TWS Bluetooth headset.

Optionally, the control module 32 is specifically configured to: allocate the audio roles to the first earbud and the second earbud based on audio roles, configured by a system, of the TWS Bluetooth headset in the first mode.

The terminal device in this embodiment may be configured to perform the method in Embodiment 2. Specific implementations and technical effects are similar, and details are not described herein again.

Figure 33:
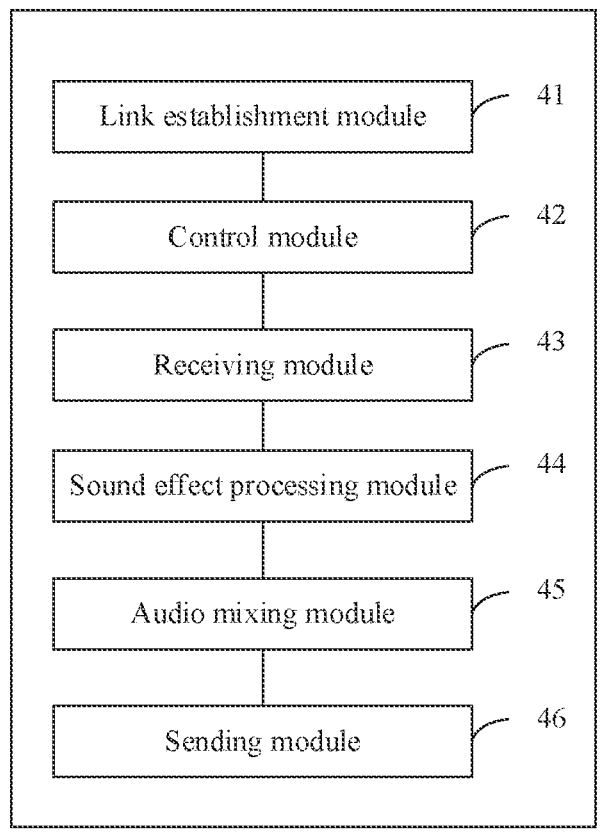
FIG. 33 is a schematic structural diagram of a terminal device according to Embodiment 13 of this application.

FIG. 33 is a schematic structural diagram of a terminal device according to Embodiment 13 of this application. As shown in FIG. 33, the terminal device provided in this embodiment includes a link establishment module 41, a control module 42, a receiving module 43, a sound effect processing module 44, an audio mixing module 45, and a sending module 46.

The link establishment module 41 is configured to establish a first Bluetooth link with a first earbud, and establish a second Bluetooth link with a second earbud, where the first earbud and the second earbud are single earbuds in a true wireless stereo TWS Bluetooth headset.

The control module 42 is configured to control the TWS Bluetooth headset to be in a first mode, where in the first mode, the first earbud is used to collect a sound signal, and the second earbud is used to play a sound signal.

The receiving module 43 is configured to: when an audio playback application on the terminal device is started, receive a first sound signal sent by the first earbud through the first Bluetooth link, where the first sound signal is collected by the first earbud.

The sound effect processing module 44 is configured to perform sound effect processing on the first sound signal to obtain a second sound signal.

The audio mixing module 45 is configured to perform audio mixing processing on accompaniment audio and the second sound signal to obtain a third sound signal.

The sending module 46 is configured to send the third sound signal to the second earbud through the second Bluetooth link.

Optionally, the terminal device further includes a storage module. The receiving module 43 is further configured to receive the first sound signal sent by the first earbud through the first Bluetooth link, where the first sound signal is collected by the first earbud. The storage module is configured to store the first sound signal.

Optionally, the control module 42 is specifically configured to: when the first mode is enabled, allocate audio roles to the first earbud and the second earbud, where an audio role of the first earbud is a sound collection role, and an audio role of the second earbud is a sound playback role.

Optionally, the terminal device further includes an enabling module. The receiving module 43 is further configured to receive an instruction for enabling the first mode. The enabling module is configured to enable the first mode according to the enable instruction.

Optionally, the control module 42 is specifically configured to: detect wearing status information of the TWS Bluetooth headset, where the wearing status information is used to indicate whether the TWS Bluetooth headset is in a worn state or an unworn state; and allocate the audio roles to the second earbud and the second earbud based on the wearing status information, where an audio role of an earbud in the unworn state is the sound collection role, and an audio role of an earbud in the worn state is the sound playback role.

Optionally, the control module 42 is specifically configured to: display a role selection interface, where audio role options for the first earbud and the second earbud are displayed in the role selection interface, and the audio role options include a sound collection option and a sound playback option; receive a selection instruction entered by a user in the role selection interface; and allocate the audio roles to the first earbud and the second earbud according to the selection instruction.

Optionally, the control module 42 is specifically configured to: display a role selection interface, where audio role options for the first earbud or the second earbud are displayed in the role selection interface, and the audio role options include a sound collection option and a sound playback option; receive a selection instruction entered by a user in the role selection interface; allocate an audio role to the first earbud or the second earbud according to the selection instruction; and allocate an audio role to the other earbud in the TWS Bluetooth headset based on the audio role allocated to the first earbud or the second earbud.

Optionally, the control module 42 is specifically configured to: allocate the audio roles to the first earbud and the second earbud based on stored historical data of audio roles of the TWS Bluetooth headset.

Optionally, the control module 42 is specifically configured to: allocate the audio roles to the first earbud and the second earbud based on audio roles, configured by a system, of the TWS Bluetooth headset in the first mode.

The terminal device in this embodiment may be configured to perform the method in Embodiment 3. Specific implementations and technical effects are similar, and details are not described herein again.

Figure 34:
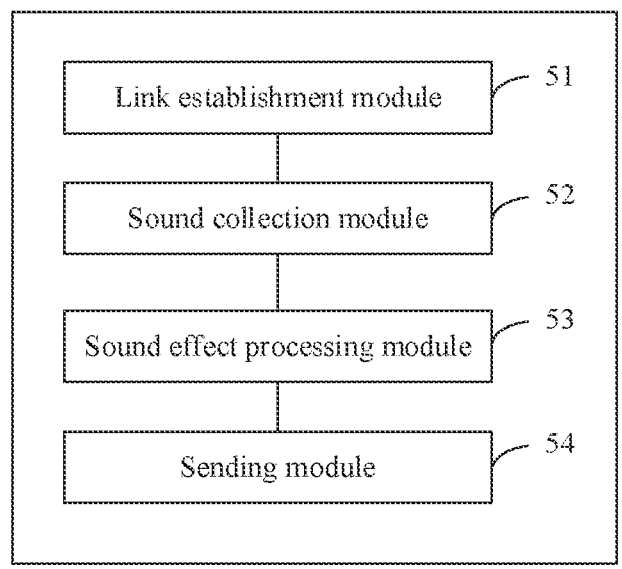
FIG. 34 is a schematic structural diagram of a TWS Bluetooth headset according to Embodiment 14 of this application.

FIG. 34 is a schematic structural diagram of a TWS Bluetooth headset according to Embodiment 14 of this application. As shown in FIG. 34, a single earbud (a first earbud or a second earbud) in the TWS Bluetooth headset provided in this embodiment includes a link establishment module 51, a sound collection module 52, a sound effect processing module 53, and a sending module 54.

The link establishment module 51 is configured to establish a first Bluetooth link with a terminal device.

The sound collection module 52 is configured to collect a first sound signal.

The sound effect processing module 53 is configured to perform sound effect processing on the first sound signal to obtain a second sound signal.

The sending module 54 is configured to send the second sound signal to the other earbud in the TWS headset or the terminal device.

Optionally, the sending module 54 is further configured to send the first sound signal to the terminal device.

Figure 35:
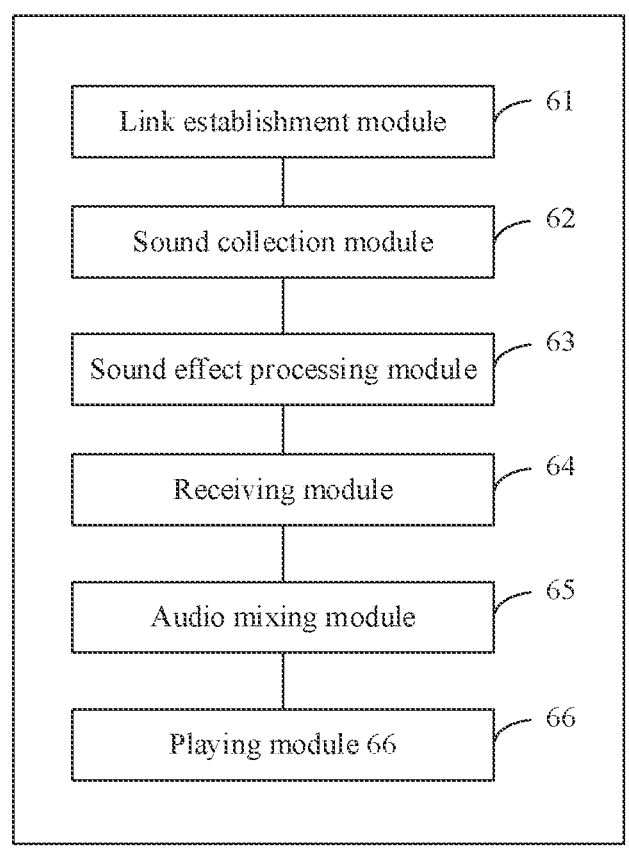
FIG. 35 is a schematic structural diagram of a TWS Bluetooth headset according to Embodiment 15 of this application.

FIG. 35 is a schematic structural diagram of a TWS Bluetooth headset according to Embodiment 15 of this application. As shown in FIG. 35, a single earbud (a first earbud or a second earbud) in the TWS Bluetooth headset provided in this embodiment includes a link establishment module 61, a sound collection module 62, a sound effect processing module 63, a receiving module 64, an audio mixing module 65, and a playing module 66.

The link establishment module 61 is configured to establish a first Bluetooth link with a terminal device.

The sound collection module 62 is configured to collect a first sound signal.

The sound effect processing module 63 is configured to perform sound effect processing on the first sound signal to obtain a second sound signal.

The receiving module 64 is configured to receive accompaniment audio sent by the terminal device.

The audio mixing module 65 is configured to perform audio mixing processing on the accompaniment audio and the second sound signal to obtain a third sound signal.

The playing module 66 is configured to play the third sound signal.

Optionally, the earbud further includes a sending module. The sending module is configured to send the third sound signal to the other earbud in the TWS headset.

Optionally, the sending module is further configured to send the first sound signal to the terminal device.

Figure 36:
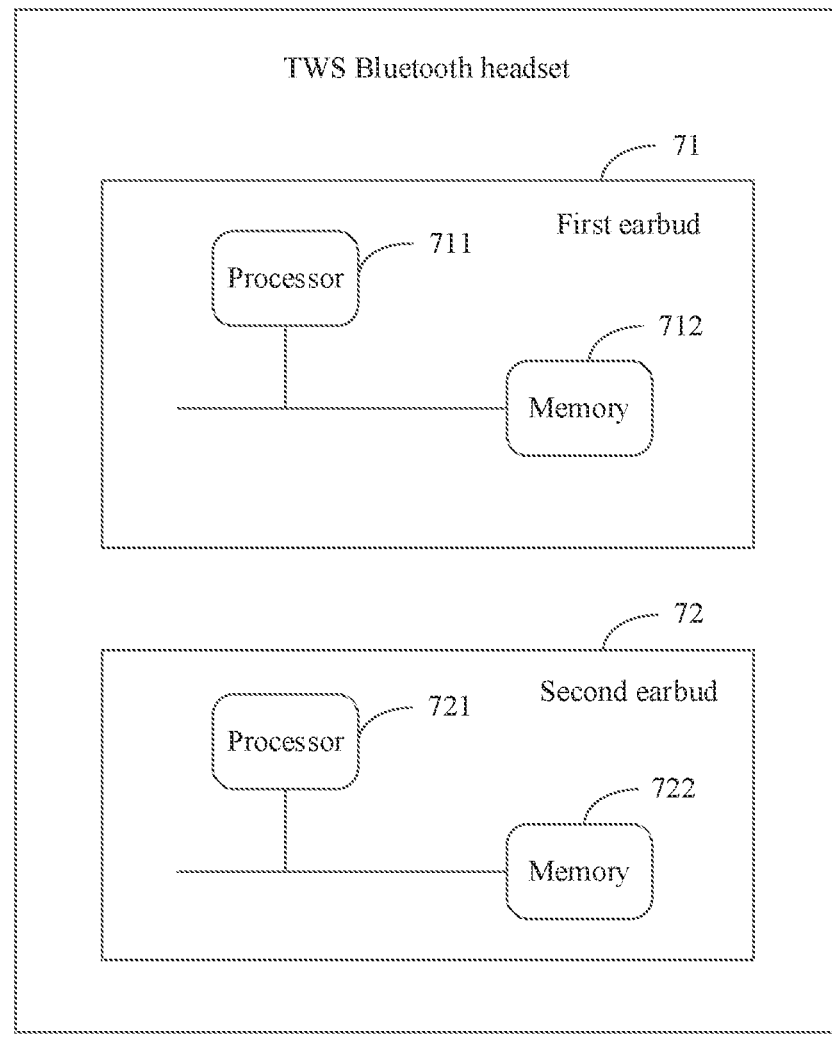
FIG. 36 is a schematic structural diagram of a TWS Bluetooth headset according to Embodiment 16 of this application.

FIG. 36 is a schematic structural diagram of a TWS Bluetooth headset according to Embodiment 16 of this application. As shown in FIG. 36, the TWS Bluetooth headset in this embodiment includes a first earbud 71 and a second earbud 72. The first earbud 71 includes a processor 711, a memory 712, and a computer program that is stored in the memory 712 and that can run on the processor 711. The second earbud 72 includes a processor 721, a memory 722, and a computer program that is stored in the memory 722 and that can run on the processor 221. For example, the memory 711 and the processor 712 may communicate through a communications bus. When executing the computer program, the processor 711 executes the technical solution of the first earbud 71 in the foregoing embodiment. For example, the memory 722 and the processor 721 may communicate through a communications bus. When executing the computer program, the processor 721 executes the technical solution of the second earbud 72 in the foregoing embodiment. Implementation principles and technical effects of the computer program product are similar to those in the method embodiments, and details are not described herein again.

Figure 37:
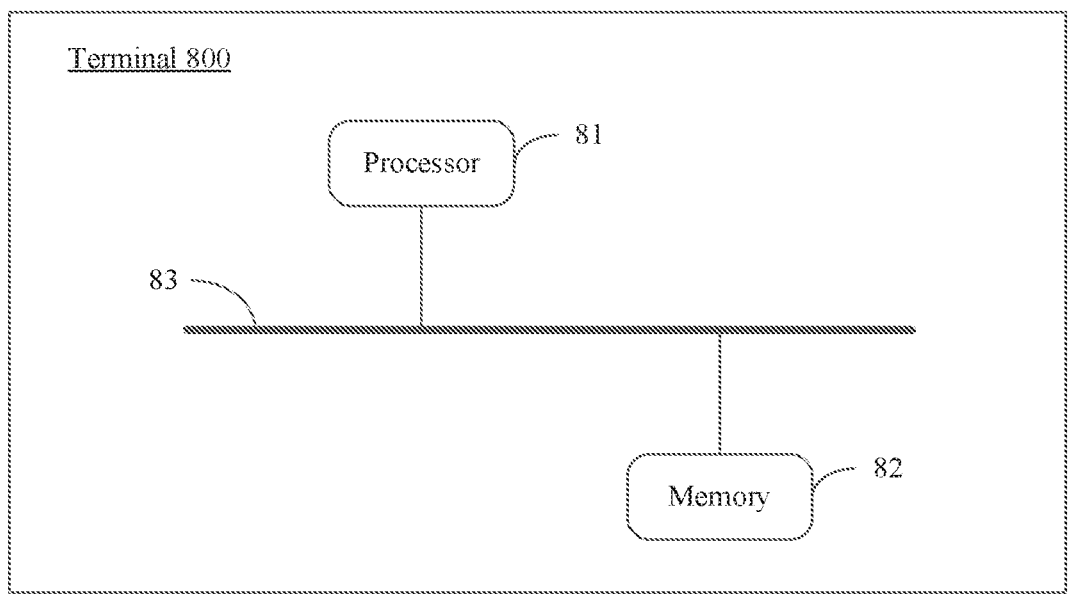
FIG. 37 is a schematic structural diagram of a terminal according to Embodiment 17 of this application.

FIG. 37 is a schematic structural diagram of a terminal according to Embodiment 17 of this application. As shown in FIG. 37, the terminal 800 in this embodiment includes a processor 81, a memory 82, and a computer program that is stored in the memory 82 and that can run on the processor 81. For example, the memory 82 and the processor 81 may communicate through a communications bus 83. When executing the computer program, the processor 81 performs the technical solution on the terminal side in any one of the foregoing method embodiments. Implementation principles and technical effects thereof are similar, and details are not described herein again.

An embodiment of this application provides a storage medium. The storage medium is configured to store a computer program. When the computer program is executed by a computer or a processor, the computer program is used to implement the Bluetooth communication method on the TWS Bluetooth headset side, or implement the Bluetooth communication method on the terminal side.

An embodiment of this application provides a computer program product. The computer program product includes instructions. When the instructions are executed, a computer is enabled to perform the foregoing Bluetooth communication method on the TWS Bluetooth headset side, or implement the Bluetooth communication method on the terminal side.

An embodiment of this application provides a chip. The chip may be applied to a terminal or a TWS Bluetooth headset. The chip includes at least one communications interface, at least one processor, and at least one memory. The communications interface, the memory, and the processor are interconnected through a bus. The processor executes instructions stored in the memory, so that the terminal can perform the foregoing Bluetooth communication method, or the TWS Bluetooth headset can perform the foregoing Bluetooth communication method.

In the embodiments of this application, the processor may be a general purpose processor, a digital signal processor, an application-specific integrated circuit, a field programmable gate array or another programmable logic device, a discrete gate or a transistor logic device, or a discrete hardware component, and may implement or execute the methods, steps, and logical block diagrams disclosed in the embodiments of this application. The general purpose processor may be a microprocessor, any conventional processor, or the like. The steps of the methods disclosed with reference to the embodiments of this application may be directly performed by a hardware processor, or may be performed by a combination of hardware and software modules in the processor.

In this embodiment of this application, the memory may be a non-volatile memory, a hard disk drive (hard disk drive, HDD) or a solid-state drive (solid-state drive, SSD), or may be a volatile memory (volatile memory), for example, a random access memory (random-access memory. RAM). The memory is any other medium that can be used to carry or store expected program code in a form of an instruction or a data structure and that can be accessed by a computer. However, this is not limited thereto. The memory in the embodiments of this application may alternatively be a circuit or any other apparatus that can implement a storage function, and is configured to store a program instruction and/or data.

All or some of the foregoing methods in the embodiments of this application may be implemented by using software, hardware, firmware, or any combination thereof. When software is used to implement the methods, the methods may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, a network device, user equipment, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD)), a semiconductor medium (for example, an SSD), or the like.

Obviously, a person skilled in the art can make various modifications and variations to this application without departing from the scope of this application. This application is intended to cover these modifications and variations of this application provided that they fall within the scope of the claims of this application and their equivalent technologies.

What is claimed is:

1. A method comprising:
controlling, by a terminal device of a BLUETOOTH communications system, true wireless stereo (TWS) BLUETOOTH headset of the BLUETOOTH communications system to be in a first mode, wherein, in the first mode, a first earbud of the TWS BLUETOOTH headset is configured to collect a sound signal and a second earbud of the TWS BLUETOOTH headset is configured to play the sound signal;
starting, by the terminal device, an audio playback application on the terminal device;
collecting, by the first earbud in response to the audio playback application starting, a first sound signal;
performing, by the first earbud, a sound effect processing on the first sound signal to obtain a second sound signal;
sending, by the first earbud, the second sound signal to the second earbud;
sending, by the terminal device, an accompaniment audio to the second earbud;
performing, by the second earbud, an audio mixing processing on the accompaniment audio and the second sound signal to obtain a third sound signal; and
playing, by the second earbud, the third sound signal.

2. The method of claim 1, further comprising:
sending, by the first earbud, the first sound signal to the terminal device; and
storing, by the terminal device, the first sound signal.

3. The method of claim 1, further comprising allocating, by the terminal device when the first mode is enabled, a first audio role to the first earbud and a second audio role to the second earbud, wherein the first audio role of the first earbud is a sound collection role, and the second audio role of the second earbud is a sound playback role.

4. The method of claim 3, wherein before allocating the first audio role to the first earbud and the second audio role to the second earbud, the method further comprises:
receiving, by the terminal device, an enabling instruction for enabling the first mode; and
controlling, by the terminal device in response to the enabling instruction, the BLUETOOTH communications system to be in the first mode.

5. The method of claim 3, wherein allocating, by the terminal device, the first audio role to the first earbud and the second audio role to the second earbud comprises:
detecting, by the terminal device, wearing status information of the TWS BLUETOOTH headset, wherein the wearing status information indicates whether the TWS BLUETOOTH headset is in a worn state or an unworn state; and
allocating, by the terminal device, the first audio role to the first earbud and the second audio role to the second earbud based on the wearing status information, wherein the first earbud is in the unworn state and the first audio role is the sound collection role, and wherein the second earbud is in the worn state and the second audio role is the sound playback role.

6. The method of claim 3, further comprising:
displaying, by the terminal device, a role selection interface displaying audio role options for the first earbud and the second earbud, wherein the audio role options comprise a sound collection option and a sound playback option;
receiving, by the terminal device from a user in the role selection interface, a selection instruction; and
further allocating, by the terminal device according to the selection instruction, the first audio role to the first earbud and the second audio role to the second earbud.

7. The method of claim 3, wherein allocating, by the terminal device, the first audio role to the first earbud and the second audio role to the second earbud comprises:
displaying, by the terminal device, a role selection interface displaying audio role options for the first earbud or the second earbud, wherein the audio role options comprise a sound collection option and a sound playback option;
receiving, by the terminal device from a user in the role selection interface, a selection instruction;

allocating, by the terminal device and according to the selection instruction, an audio role to the first earbud or the second earbud according to the selection instruction.

8. The method of claim 3, wherein allocating, by the terminal device, the first audio role to the first earbud and the second audio role to the second earbud comprises allocating, by the terminal device based on stored historical data of the TWS BLUETOOTH headset, the first audio role to the first earbud and the second audio role to the second earbud.

9. The method of claim 3, wherein allocating, by the terminal device, the first audio role to the first earbud and the second audio role to the second earbud comprises allocating, by the terminal device, the first audio role to the first earbud and the second audio role to the second earbud based on audio roles of the TWS BLUETOOTH headset in the first mode.

10. A terminal device, comprising:
a memory configured to store instructions; and
a processor coupled to the memory, wherein the instructions cause the processor to be configured to:
establish a first BLUETOOTH link with a first earbud of a true wireless stereo (TWS) BLUETOOTH headset;
establish a second BLUETOOTH link with a second earbud of the TWS BLUETOOTH headset, wherein a third BLUETOOTH link comprises between the first earbud and the second earbud;
control the TWS BLUETOOTH headset to be in a first mode, wherein, in the first mode, the first earbud is configured to collect a sound signal and the second earbud is configured to play the sound signal and;
start an audio playback application on the terminal device; and
send, in response to starting the audio playback application, an accompaniment audio to the second earbud through the second BLUETOOTH link.

11. The terminal device of claim 10, wherein the instructions further cause the processor to be configured to:
receive, from the first earbud through the first BLUETOOTH link, a first sound signal; and
store the first sound signal in the memory.

12. The terminal device of claim 10, wherein the instructions further cause the processor to be configured to allocate a first audio role to the first earbud and a second audio role to the second earbud when the first mode is enabled, wherein the first audio role of the first earbud is a sound collection role, and wherein the second audio role of the second earbud is a sound playback role.

13. The terminal device of claim 12, wherein the instructions further cause the processor to be configured to:
receive an enabling instruction for enabling the first mode; and
control, in response to the enabling instruction, the TWS BLUETOOTH headset to be in the first mode.

14. The terminal device of claim 12, wherein the instructions further cause the processor to be configured to:
detect wearing status information of the TWS BLUETOOTH headset, wherein the wearing status information indicates whether the TWS BLUETOOTH headset is in a worn state or an unworn state; and
allocate the first audio role to the first earbud and the second audio role to the second earbud based on the wearing status information, wherein the first earbud is in the unworn state and the first audio role is the sound collection role, and wherein the second earbud is in the worn state and the second audio role is the sound playback role.

15. The terminal device of claim 12, wherein the instructions further cause the processor to be configured to:
display a role selection interface displaying audio role options for the first earbud and the second earbud, wherein the audio role options comprise a sound collection option and a sound playback option;
receive, from a user in the role selection interface, a selection instruction; and
further allocate, according to the selection instruction, the first audio role to the first earbud and the second audio role to the second earbud.

16. The terminal device of claim 12, wherein the instructions further cause the processor to be configured to:
display a role selection interface displaying audio role options for the first earbud or the second earbud, wherein the audio role options comprise a sound collection option and a sound playback option;
receive, from a user in the role selection interface, a selection instruction; and
allocate, according to the selection instruction, an audio role to the first earbud or the second earbud.

17. The terminal device of claim 12, wherein the instructions further cause the processor to be configured to further allocate, based on stored historical data of the TWS BLUETOOTH headset, the first audio role to the first earbud and the second audio role to the second earbud.

18. The terminal device of claim 12, wherein the instructions further cause the processor to be configured to allocate the first audio role to the first earbud and the second audio role to the second earbud based on audio roles of the TWS BLUETOOTH headset in the first mode.

19. A true wireless stereo (TWS) BLUETOOTH headset comprising:
a second earbud configured to establish a second BLUETOOTH link with a terminal device; and
a first earbud configured to:
establish a first BLUETOOTH link with the terminal device; and
establish a third BLUETOOTH link with the second earbud,
wherein when the TWS BLUETOOTH headset is in a first mode and an audio playback application on the terminal device is started:
the first earbud is further configured to:
perform a sound effect processing on the first sound signal to obtain a second sound signal; and
send the second sound signal to the second earbud through the third BLUETOOTH link; and
the second earbud is further configured to:
receive, from the terminal device through the second BLUETOOTH link, an accompaniment audio;
perform an audio mixing processing on the accompaniment audio and the second sound signal to obtain a third sound signal; and
play the third sound signal.

20. The TWS BLUETOOTH headset of claim 19, wherein the first earbud is further configured to send the first sound signal to the terminal device.

* * * * *

UNITED STATES PATENT AND TRADEMARK OFFICE
CERTIFICATE OF CORRECTION

PATENT NO. : 12,047,760 B2
APPLICATION NO. : 17/788892
DATED : July 23, 2024
INVENTOR(S) : Mingjie Yin et al.

It is certified that error appears in the above-identified patent and that said Letters Patent is hereby corrected as shown below:

In the Claims

Claim 1, Column 49, Line 57: "system, true wireless" should read "system, a true wireless"

Claim 10, Column 51, Line 32: "sound signal and;" should read "sound signal;"

Claim 19, Column 52, Line 50: "perform a sound" should read "collect a first sound signal; perform a sound"

Signed and Sealed this
Tenth Day of September, 2024

Katherine Kelly Vidal
*Director of the United States Patent and Trademark Office*